(12) United States Patent
Mannik et al.

(10) Patent No.: US 8,429,005 B2
(45) Date of Patent: *Apr. 23, 2013

(54) METHOD FOR DETERMINING EFFECTIVENESS OF DISPLAY OF OBJECTS IN ADVERTISING IMAGES

(75) Inventors: Peeter Todd Mannik, Roswell, GA (US); Stephen Andrew Hyser, Roswell, GA (US); Kristopher Derek Hutchinson, Atlanta, GA (US); Garland Todd Headrick, Smyrna, GA (US); James Edwin Harris, III, Atlanta, GA (US)

(73) Assignee: Activ8Now, LLC, Atlanta, GA (US)

( * ) Notice: Subject to any disclaimer, the term of this patent is extended or adjusted under 35 U.S.C. 154(b) by 910 days.

This patent is subject to a terminal disclaimer.

(21) Appl. No.: 10/459,397

(22) Filed: Jun. 11, 2003
(Under 37 CFR 1.47)

(65) Prior Publication Data

US 2004/0006509 A1    Jan. 8, 2004

Related U.S. Application Data

(63) Continuation-in-part of application No. 09/526,621, filed on Mar. 16, 2000, now abandoned, which is a continuation-in-part of application No. 09/500,610, filed on Feb. 9, 2000, now abandoned, which is a continuation-in-part of application No. 09/468,687, filed on Dec. 20, 1999, now Pat. No. 6,535,889, which is a continuation-in-part of application No. 09/406,171, filed on Sep. 23, 1999, now Pat. No. 6,557,006, and a continuation-in-part of application No. 09/549,942, filed on Apr. 14, 2000, which is a continuation-in-part of application No. 09/526,621, which is a continuation-in-part of application No. 09/500,610, which is a continuation-in-part of application No. 09/468,687, which is a continuation-in-part of application No. 09/406,171.

(60) Provisional application No. 60/174,331, filed on Jan. 4, 2000.

(51) Int. Cl.
*G06Q 30/00* (2012.01)
*G07G 1/14* (2006.01)

(52) U.S. Cl.
USPC .................................. 705/14.1; 705/14.4

(58) Field of Classification Search ............... 705/14
See application file for complete search history.

(56) References Cited

U.S. PATENT DOCUMENTS 5,251,129 A    10/1993   Jacobs et al.
5,321,841 A     6/1994   East et al.

(Continued)

OTHER PUBLICATIONS

Archive.org screenshots of Narrative.com taken from prior to Sep. 23, 1999 describing the Enliven technology.*

(Continued)

*Primary Examiner* — Arthur Duran
(74) *Attorney, Agent, or Firm* — Hunton & Williams LLP

(57) ABSTRACT

Interactive electronic representations of advertising images published in visual media sources enable data about interest in an object or objects appearing in the advertising images to be collected. From comparing against aggregated data from interactions with interactive electronic representations, the effectiveness of displaying an object, such as representing a product or service, in a particular advertising image can be relatively measured.

21 Claims, 37 Drawing Sheets

U.S. PATENT DOCUMENTS

| | | | |
|---|---|---|---|
| 5,572,643 A | 11/1996 | Judson | |
| 5,640,193 A | 6/1997 | Wellner | |
| 5,684,715 A | 11/1997 | Palmer | |
| 5,708,845 A | 1/1998 | Wistendahl et al. | |
| 5,715,416 A | 2/1998 | Baker | |
| 5,721,832 A | 2/1998 | Westrope et al. | |
| 5,737,619 A | 4/1998 | Judson | |
| 5,740,425 A | 4/1998 | Povilus | |
| 5,748,931 A | 5/1998 | Jones et al. | |
| 5,788,507 A | 8/1998 | Redford et al. | |
| 5,799,157 A | 8/1998 | Escallon | |
| 5,804,803 A | 9/1998 | Cragun et al. | |
| 5,838,906 A | 11/1998 | Doyle et al. | |
| 5,842,218 A * | 11/1998 | Robinson | 707/102 |
| 5,845,284 A * | 12/1998 | Robinson | 707/101 |
| 5,848,396 A * | 12/1998 | Gerace | 705/10 |
| 5,890,135 A | 3/1999 | Powell | |
| 5,895,455 A | 4/1999 | Bellinger et al. | |
| 5,897,639 A | 4/1999 | Greef et al. | |
| 5,913,210 A | 6/1999 | Cal | |
| 5,915,256 A * | 6/1999 | Rogers et al. | 715/501.1 |
| 5,918,214 A | 6/1999 | Perkowski | |
| 5,918,237 A | 6/1999 | Montalbano | |
| 5,932,863 A * | 8/1999 | Rathus et al. | 235/462.15 |
| 5,933,829 A | 8/1999 | Durst et al. | |
| 5,938,727 A | 8/1999 | Ikeda | |
| 5,954,515 A | 9/1999 | Iggulden | |
| 5,957,695 A | 9/1999 | Redford et al. | |
| 5,957,697 A | 9/1999 | Iggulden et al. | |
| 5,963,915 A | 10/1999 | Kirsch | |
| 5,963,964 A | 10/1999 | Nielsen | |
| 5,966,135 A | 10/1999 | Roy et al. | |
| 5,970,471 A | 10/1999 | Hill | |
| 5,978,773 A * | 11/1999 | Hudetz et al. | 705/23 |
| 5,987,256 A | 11/1999 | Wu et al. | |
| 5,991,735 A | 11/1999 | Gerace | |
| 5,991,781 A | 11/1999 | Nielsen | |
| 5,995,976 A | 11/1999 | Walker et al. | |
| 6,006,265 A | 12/1999 | Rangan et al. | |
| 6,009,410 A | 12/1999 | Lemole et al. | |
| 6,009,413 A | 12/1999 | Webber et al. | |
| 6,029,141 A * | 2/2000 | Bezos et al. | 705/27 |
| 6,029,142 A | 2/2000 | Hill | |
| 6,035,330 A | 3/2000 | Astiz et al. | |
| 6,037,934 A | 3/2000 | Himmel et al. | |
| 6,038,598 A | 3/2000 | Danneels | |
| 6,041,360 A | 3/2000 | Himmel et al. | |
| 6,076,091 A | 6/2000 | Fohn et al. | |
| 6,091,956 A | 7/2000 | Hollenberg | |
| 6,097,441 A | 8/2000 | Allport | |
| 6,105,044 A | 8/2000 | DeRose et al. | |
| 6,115,649 A | 9/2000 | Sakata | |
| 6,141,010 A | 10/2000 | Hoyle | |
| 6,154,205 A | 11/2000 | Carroll et al. | |
| 6,154,738 A | 11/2000 | Call | |
| 6,211,871 B1 | 4/2001 | Himmel et al. | |
| 6,211,878 B1 | 4/2001 | Cheng et al. | |
| 6,262,724 B1 | 7/2001 | Crow et al. | |
| 6,271,640 B1 | 8/2001 | Lee | |
| 6,272,672 B1 | 8/2001 | Conway | |
| 6,360,216 B1 * | 3/2002 | Hennessey et al. | 707/3 |
| 6,415,307 B2 | 7/2002 | Jones et al. | |
| 6,418,441 B1 | 7/2002 | Call | |
| 6,421,683 B1 | 7/2002 | Lamburt | |
| 6,430,554 B1 * | 8/2002 | Rothschild | 707/3 |
| 6,448,979 B1 * | 9/2002 | Schena et al. | 715/741 |
| 6,449,616 B1 | 9/2002 | Walker et al. | |
| 6,496,981 B1 | 12/2002 | Wistendahl et al. | |
| 6,519,584 B1 * | 2/2003 | Tognazzini et al. | 707/3 |
| 6,535,889 B1 | 3/2003 | Headrick et al. | |
| 6,557,006 B1 | 4/2003 | Headrick et al. | |
| 6,570,587 B1 | 5/2003 | Efrat et al. | |
| 6,606,603 B1 | 8/2003 | Joseph et al. | |
| 6,714,975 B1 * | 3/2004 | Aggarwal et al. | 709/224 |
| 6,829,650 B1 | 12/2004 | Philyaw et al. | |
| 2001/0020236 A1 * | 9/2001 | Cannon | 707/1 |
| 2001/0027409 A1 | 10/2001 | Sasaki et al. | |
| 2001/0029465 A1 | 10/2001 | Strisower | |
| 2002/0026353 A1 * | 2/2002 | Porat et al. | 705/14 |
| 2002/0035536 A1 | 3/2002 | Gellman | |
| 2002/0075298 A1 * | 6/2002 | Schena et al. | 345/738 |
| 2002/0075332 A1 * | 6/2002 | Geilfuss et al. | 345/859 |
| 2002/0111865 A1 * | 8/2002 | Middleton et al. | 705/14 |
| 2002/0174013 A1 * | 11/2002 | Freeman et al. | 705/14 |
| 2003/0050961 A1 * | 3/2003 | Rodriguez et al. | 709/203 |
| 2005/0071230 A1 * | 3/2005 | Mankoff | 705/14 |
| 2005/0193410 A1 * | 9/2005 | Eldering | 725/34 |
| 2005/0199713 A1 * | 9/2005 | Rathus et al. | 235/382 |
| 2006/0116924 A1 * | 6/2006 | Angles et al. | 705/14 |
| 2006/0212900 A1 * | 9/2006 | Ismail et al. | 725/34 |

OTHER PUBLICATIONS

NPL prior art articles entitled by Examiner as "Magazine" which are dated prior to Sep. 23, 1999 describing how interactive copies or versions of print magazines or newspapers were placed on CD-ROMs or online.*

Marek, Joycelyn, "HoustonChronicle.com Brings Print Circular to the Web," The Digital Edge, Jul. 1999, Online Article, Newspaper Association of America.

Alexander, George, "Infosis repurposes print layouts on the Web: Boston Herald, Christian Science Monitor, Lands' End among clients; Infosis Group Ltd; Company Business and Marketing," Jul. 1, 1999, Online Article, Section No. 11, vol. 3, ISSN 1090-4808, Infosis Corp., New York, NY.

Gallagher, K. et al., "A Framework for Targeting Banner Advertising on the Internet," System Sciences, 1997, Proceedings of the Thirtieth Hawaii International Conference on, Jan. 7-10, 1997, pp. 265-274.

Chang, A. M. et al., "'Goodies' in exchange for Consumer Information on the Internet: the Economics and Issues," System Sciences, 1998, Proceedings of the Thirty-First Hawaii International Conference on, Jan. 6-9, 1998, pp. 533-542.

Search Report issued on PCT/US00/26072, mailed Jan. 12, 2001.

iMedium, "The New Way to See! Commerce™," Company Overview, Feb. 2000, 9 pages.

Clique, "Turning Readers into Buyers™," Mar. 1, 2000, 4 pages.

Amazon, com, "About Amazon.com," May 11, 2000, 3 pages.

AsSeenin.com, May 11, 2000, 1 page.

New-Media,com, May 11, 2000, 4 pages (German).

ShouldExist.com "Divx ;-)+ Image Maps+ Affiliate Programs=Free Movies!," Jun. 2000, 6 pages.

Atimi.com, "Atimi Software Helps Develop Videoclix™ for Eline Technologies Inc.," Nov. 5, 2001, 1 page.

VideoClix.com, VideoClix.TV Showcase and Product Tour, 2002, 7 pages.

Tolva, John, "MediaLoom: An Interactive Authoring Tool for Hypervideo," M.S. Project Paper, http://www.mingspring.com/~jntolva/medialoom/, May 22, 1998, 20 pages.

Catalog City Website, publication date alleged to be 1998 (not admitted).

Shopping Interactive CD by Otto Versand, publication date alleged to be 1994/1995 (not admitted).

United States District Court Southern District of New York, Case No. 05-CV-7516 (KMK), Advance Magazine Publishers, Inc. D/B/A *Condé Nast Publications* (Plaintiff) -v- *ACTIV8NOW, LLC, and ACTIV8MEDIA, LLC* (Defendants & Third-Party Plaintiffs) -v- *Advance Publications, Inc. and Richfx, Inc.* (Third-Party Defendants); Opinion and Order; dated Oct. 28, 2009.

* cited by examiner

FIG. 18A

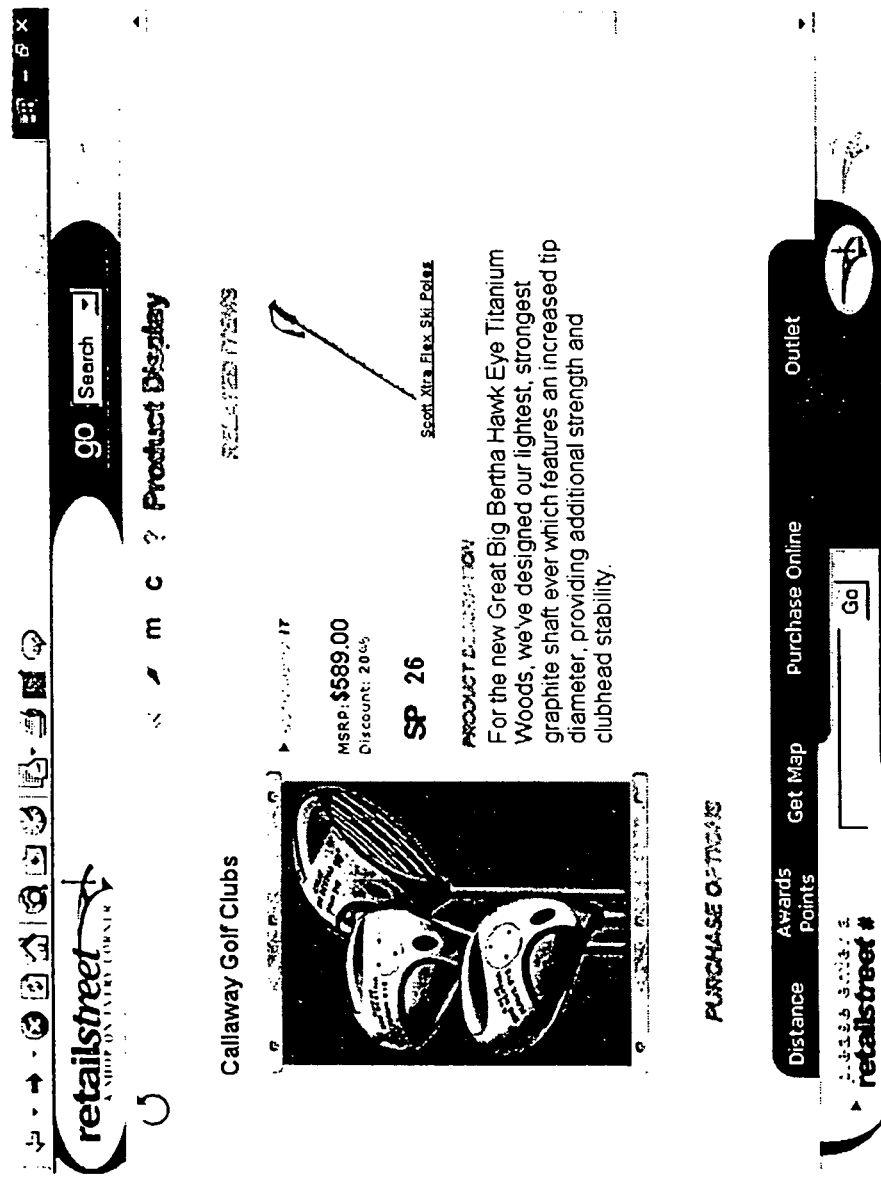

FIG. 20B

METHOD FOR DETERMINING EFFECTIVENESS OF DISPLAY OF OBJECTS IN ADVERTISING IMAGES

CROSS REFERENCE TO RELATED APPLICATIONS

This application is a continuation-in-part of U.S. application Ser. No. 09/526,621, now abandoned filed on Mar. 16, 2000, which is continuation-in-part of U.S. application Ser. No. 09/500,610, filed on Feb. 9, 2000, now abandoned, which claims the benefit of U.S. Provisional Application No. 60/174,331, filed on Jan. 4, 2000, and which is a continuation-in-part of U.S. application Ser. No. 09/468,687, filed on Dec. 20, 1999, U.S. Pat. No. 6,535,889, which is a continuation-in-part of U.S. application Ser. No. 09/406,171, filed on Sep. 23, 1999, U.S. Pat. No. 6,557,006, and is also a continuation-in-part of U.S. application Ser. No. 09/549,942, filed on Apr. 14, 2000, which is a continuation-in-part of U.S. application Ser. No. 09/526,621, filed on Mar. 16, 2000, now abandoned which is continuation-in-part of U.S. application Ser. No. 09/500,610, filed on Feb. 9, 2000, now abandoned, which claims the benefit of U.S. Provisional Application No. 60/174,331, filed on Jan. 4, 2000, and which is a continuation-in-part of U.S. application Ser. No. 09/468,687, filed on Dec. 20, 1999, U.S. Pat. No. 6,535,889, which is a continuation-in-part of U.S. application Ser. No. 09/406,171, filed on Sep. 23, 1999, U.S. Pat. No. 6,557,006, all of which are incorporated herein by reference.

BACKGROUND OF THE INVENTION

Although the Internet is becoming an increasing source of information, entertainment and commerce, traditional visual media, such as print, e.g., magazines, newspapers, catalogs, books, mailings, billboards, signs, paintings, posters and the like, and video sources, e.g., television, motion pictures, video cassettes and discs, and the like, remain an important stimulus in everyday life.

Despite the continued popularity of traditional visual media, the limitations of the medium become apparent when compared to today's Internet-based information sources, like the world-wide-web ("WWW" or "web"). For example, traditional visual media may take much longer to produce than computer network-based content, and may have considerably greater production costs. Moreover, traditional visual media typically does not provide the depth of content permitted by electronic files, because traditional visual media cannot be associated with, or "hot-linked" to, additional sources of information like electronic files. Accordingly, traditional visual media cannot provide the virtually infinite depth of content provided by electronic data on a computer network.

This severe limitation on the depth of content provided by traditional visual media can be very frustrating for readers, viewers, and in particular, shoppers. For example, an article about a celebrity in a traditional print-based magazine or physical publication may show one or more photographs of the celebrity. A reader of the magazine that enjoys the article and wants to learn more about the celebrity may perform a web search for additional information about the celebrity. But, what if the reader desires additional information regarding a parka the celebrity is wearing in one of the magazine photographs? The reader may turn to a web search engine for assistance, but without knowing the manufacturer of the parka or other information, any Internet search by the reader is likely to be futile. Even if the reader knows the name of the manufacturer of the parka, the reader may be unable to locate the manufacturer's web site, and may be unable to determine if the manufacturer has a web site at all. Similarly, the reader may be unable to obtain information regarding furniture or other objects shown in the photographs with the article. By the same token, a viewer of a favorite television program, may see a celebrity wearing clothing during the program, and the viewer is interested in further information regarding the clothing. And also like the reader, the viewer may like further information regarding the furniture or housewares appearing in particular scenes of the program, but lack the ability to determine where to look for further information. This inability to locate additional information about objects shown in traditional visual media sources can be extremely frustrating for a reader or viewer.

As another example of how the limitations of traditional visual media may be frustrating to readers and viewers, consider the reader of a traditional print-based skiing magazine (or a viewer of a skiing program). An article in a skiing magazine (or a scene in the program) may feature pictures of a skier on a beautifully groomed slope with a quaint ski lodge in the background. However, in most cases, all of the objects in the photographs (or scene) will not be identified. Therefore, the reader (or viewer) may have a great degree of difficulty locating the ski resort, the type of ski bindings worn by the skier, or even the exact slope that the skier is on. This inability to locate information related to traditional visual media is extremely frustrating for consumers.

Similar to traditional visual media, conventional visual media present in some electronic publications (including video sources) on the Internet, typically do not provide any detailed information about products shown in digital or electronic images within the electronic publication. While such digital or electronic images may be "hot-linked" to corresponding Internet sites, such conventional visual media do not provide a break down of products forming the digital or electronic image contained within the electronic publication. Conventional electronic publications generally do not provide instantaneous product descriptions and separate enlarged views of each of the products shown within the image. For example, an electronic publication, such as a web page, may provide a graphics image of a skiing scene similar to the one discussed above that shows a skier on a beautifully groomed slope with a quaint ski lodge in the background. If the reader wants more information about the individual objects depicted in the skiing scene, such as an enlarged view of the skis or a complete description as to their identification and possible retail location or both, the reader may need to initiate an Internet or web search to ascertain this type of product or service information. Such an Internet search could be rather time consuming without any guarantee of success.

Visual media sources also present problems to manufacturers, retailers, and advertisers that desire to receive feedback on the effectiveness of their visual media advertisements. Retailers, manufacturers, and advertisers pay substantial funds in placing their advertisements and products (as in television and movies) in an effort to inspire consumers to purchase their goods or services. However, no objective gauge exists to measure the effectiveness of these advertisements relative to their being viewed by potential consumers, to their invoking interest in the goods or services, or in resulting in an actual sale of goods or services shown in the advertisements or resulting from the product placement.

Therefore, in light of these problems, there is a need for a system and method for creating and displaying an interactive electronic representation of a corresponding visual media object that can easily associate a traditional visual media object, or conventional visual media objects, such as digital or electronic images contained within conventional electronic publications, to an interactive electronic representation of a visual media object. There is a further need for a system and method creating an interactive electronic representation of a corresponding traditional visual media object that can "hot-link" objects in printed publications, television and movie scenes, and the like, to related electronic documents. There is an additional need for a system and method for displaying an interactive electronic representation of a corresponding visual media object that can track demographic information regarding consumers of traditional visual media objects, such as magazines, newspapers, television programs and movies, and conventional visual media objects, such as electronic publications (including video sources) containing digital images. There is a further need for a system and business method for using interactive electronic representations of media objects to provide advertising management services to manufacturers, retailers, catalog retailers, service providers, advertisers, broadcasters, producers and publishers. There is also a need for a system and business method for using interactive electronic representations of media objects to measure the effectiveness of advertisements in visual media relative to their being viewed by potential consumers, to their invoking interest in the goods or services, or in resulting in an actual sale of goods or services shown in the advertisements.

SUMMARY OF THE INVENTION

The present invention solves the problems described above by displaying an interactive electronic representation of a visual media object (an "IER"), such as a page in a magazine, newspaper, a digital image contained within an electronic publication, a still frame, particular image or clip from a television program, a frame, image or clip from a motion picture scene, or similar video sources, etc., that associates a visual media object with a unique identifier. The present invention advantageously allows a consumer of the visual media object, i.e., the viewer or reader, to utilize the unique identifier to easily access the corresponding IER. The present invention also allows the consumer to quickly locate additional information regarding aspects of the visual media object by interacting with the IER using a computing device, like a personal computer or personal digital assistant.

Generally described, the present invention permits access to an IER by associating a unique identification tag with a visual media object. The unique identification tag is also associated with the IER, which is stored in a computer database. In this manner, an application process for retrieving the IER embodying aspects of the present invention may receive the unique identification tag and, based upon the unique identification tag, locate and display the corresponding IER. A user of the application process may then interact with the IER by selecting a portion of the IER, such as a depiction of a product. When a portion of the IER is selected, such as the product of interest, additional information regarding the selected portion of the IER may be displayed to the user.

More specifically described, the present invention associates a visual media object with a unique identification tag. For traditional visual media objects, the unique identification tag may be displayed on or adjacent to the visual media object, preferably in a conspicuous location. For conventional visual media objects, such as electronic publications containing digital images, a visual media object in the form of a digital image (including video sources) may automatically pass a hidden unique identification tag to the application process when the user "clicks on" or activates the visual media object. Alternatively, the unique identification tag may be displayed adjacent to or in connection with the visual media object, as for example before, during or after a playing of a video source such as a television program, so that the user understands the tag to be associated with the object.

The unique identification tag is associated with an IER corresponding to the visual media object in a relational database such that the appropriate IER corresponding to the visual media object is displayed when the unique identification tag is received by the application process. Portions of the IER may be "hot-linked" to other electronic documents, web sites, or other IERs.

The present invention also provides an application process that may be utilized to create and permit interaction with IERs corresponding to visual media objects. According to an aspect of the present invention, a user may utilize a computing device equipped with a standard web browser to visit a web site embodying the application process. The user may provide a unique identification tag corresponding to a visual media object at the web site or the web site can receive the unique identification tag from a digital image of an electronic publication which may be "hot-linked" to the web site containing the application process. The application process may then locate the IER corresponding to the visual media object based upon the provided unique identification tag. Once the IER has been located, the IER is transmitted to the web browser for display to the user.

Once the IER has been displayed to the user, the user may interact with the IER by selecting a portion of the IER. In response to the selection of a portion of the IER, additional information regarding the selected portion of the IER may be displayed. For instance, if the IER contains a photograph or similar still image (e.g. a representation of an image from a video source) of a skier on a snowy mountain slope, selecting the portion of the IER containing the skier may display additional information regarding the skier's identity, equipment, or location. Additionally, the user may be permitted to purchase items shown in portions of the IER on-line, or may be provided directions to a brick-and-mortar retailer that sells the item. The user's interaction with the IER may be monitored, and detailed demographic information about the user may be compiled. The demographic information may be then provided to the supplier of the IER, such as a manufacturer, ad agency, or publisher.

According to another aspect of the present invention, a user without the aid of a computing device may access an interactive electronic representation of a corresponding media object via a voice network. The user of the voice system may use a telephone to dial into a system for interacting with an interactive electronic representation of the visual media object. The user may provide a unique identification tag corresponding to a visual media object using dual-tone multi-frequency (DTMF) codes. In response to receiving the unique identification tag, the voice system may transmit an interactive aural representation of the visual media object to the user. The user may then select portions of the aural interactive electronic representation of the visual media object using additional DTMF codes. Additional information regarding the selected portion of the IER may be transmitted to the user via the telephone network.

In a further aspect of the present invention, a parent electronic representation of a primary object is created by using a scanner, a digital camera, or software or combinations thereof to capture the primary object into a digital format, including digital video, or any other format, or by importing a JPEG, MPEG, GIF, BMP or any other type of data file. Furthermore, the objects may be captured using other devices or mechanisms. The primary object typically includes several secondary objects that are referred to as child objects. For example, the primary object may take the form of digital image of a clothing model wearing a certain brand name shirt and a top hat. The model, shirt and top hat could then be considered as child objects of the entire parent object.

Next, child electronic representations are then created for each respective child object in a manner similar to how the parent electronic representation is created. After the electronic representations are created, they are sized according to predetermined guidelines. The electronic representations are then uploaded.

The electronic representations are then displayed in a format where child object regions can be identified. Specifically, the parent electronic representation or image is displayed in its entirety while the child electronic representations are displayed at a reduced size or as icons or thumbprints. The user can then move a screen pointer with a user interface device, such as a mouse, to define the child object regions. The child object regions can be geometrical regions that circumscribe each of the child objects present in the parent electronic representation or image. The invention has at least two techniques where the movement of the screen pointer is tracked to capture the coordinates of the child object region. The invention also can display the coordinates that are tracked or a geometrical outline of the child object region or both.

Once the user has identified the child object region, an association or link between the child object region and the child electronic representation or image can be made. The user interface device and screen pointer can be used to create this association or the user can enter text corresponding to the appropriate child electronic representation or image. After the user has created associations for all of the child electronic representations, the user is then prompted to confirm that all of the child object regions are properly sized and correlate to the correct child electronic representations. Once the user confirms that this information is accurate, the electronic representations, the associations therebetween, and any detailed information regarding the child electronic representations are then stored in a relational database. Accordingly, when the parent object image of the interactive electronic representation is displayed, a user can move a screen pointer over child objects within the parent object image and simultaneously, enlarged child electronic representations containing additional information about the child object corresponding to the location of the screen pointer will be displayed. In some embodiments the parent object image and child objects are provided as stationary electrical graphic images, and in other embodiments the parent and child objects are included in electronic video representations, wherein the screen pointer activates the display of the additional information regarding a child object according to the underlying association of the screen regions or "hot links" of the stationary image or video images.

Another embodiment of the present invention enables an aggregated or "closed loop" advertising scheme that delivers enhanced value to all key segments of the advertising, manufacturing, and retail industries, such as advertising agencies, publishers, catalog retailers, retailers, service providers, manufacturers, publishers, broadcasters, producers, payment facilitators, and consumers. The aggregated advertising scheme leverages the power of the Internet to enable consumers to simply and effectively locate and purchase desired products and services observed in visual media, such as newspapers, magazines, catalogs, television, movies, or any similar visual presentation of information, or known by consumers, such as the representation of a hotel room or other real-life images.

This embodiment of the present invention leverages the power of the Internet to resolve the problem of traditional one-way information flow from advertisers to publishers/broadcasters and then to consumers and the consequent inadequacy of feedback to advertisers. These problems are resolved by enhancing the connectivity, the amount of direction of information flow, and the interactivity and speed of communication between advertising agencies, publishers, broadcasters, producers, catalog retailers, retailers, service providers, manufacturers, publishers, payment facilitators, and consumers. The systems and process of the present invention enhance the quality of information available about consumer preferences and buying behavior to advertisers. These systems and methods enable efficient tracking of the effectiveness of advertisements and other presentations of information in visual media to provide maximum value to advertising agencies, publishers, broadcasters, producers, catalog retailers, retailers, service providers, manufacturers, publishers, payment facilitators, and consumers.

The present invention advantageously provides a system and method for displaying and using an interactive electronic representation of a corresponding media object. That the present invention improves over the drawbacks of the prior art and accomplishes the objects of the invention will become apparent from the detailed description of the illustrative embodiments to follow.

BRIEF DESCRIPTION OF THE DRAWINGS

FIG. 18A is a screen shot of a publication webpage for accessing interactive electronic representations of visual media objects according to the present invention.

FIG. 20A is a screen shot of a product identification webpage of the interactive electronic representation shown in FIG. 19E.

FIG. 20B is a screen shot of a product identification webpage of the interactive electronic representation shown in FIG. 19E.

DETAILED DESCRIPTION

Figure 1:
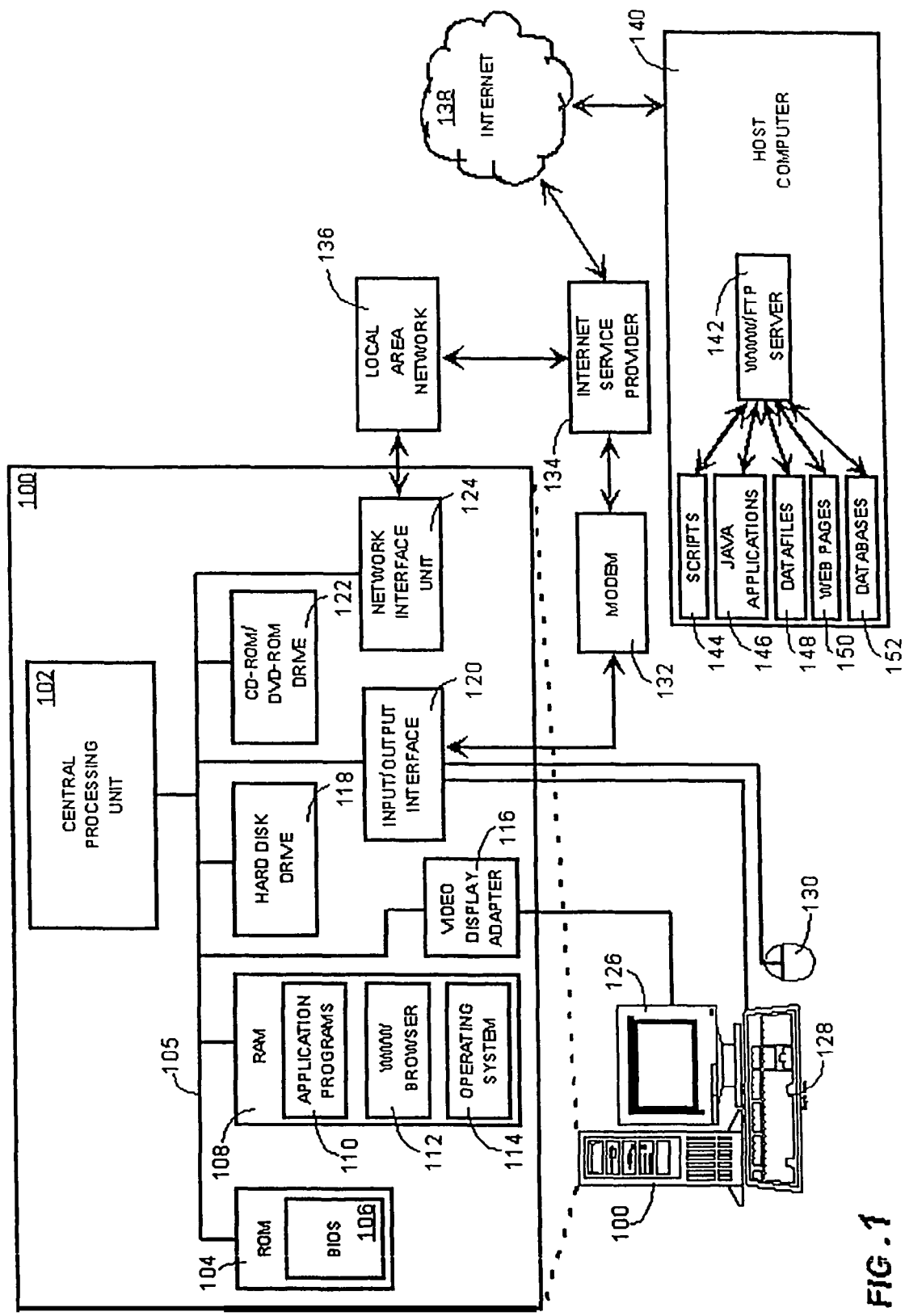
FIG. 1 is a block diagram of a networked personal computer that provides the operating environment for embodiments of the present invention.

According to one aspect, the present invention is directed toward a system and method for displaying an interactive electronic representation of a corresponding visual media object. The present invention may be embodied in an application program or in another type of program module. In an illustrative embodiment, the present invention is embodied in an application program running on a personal computer for displaying an interactive electronic representation of a corresponding visual media object.

Illustrative Operating Environment

Although the illustrative embodiment will be generally described in the context of an application program running on a personal computer, those skilled in the art will recognize that the present invention may be implemented in conjunction with operating system programs or with other types of program modules for other types of computers. Furthermore, those skilled in the art will recognize that the present invention may be implemented in a stand-alone or in a distributed computing environment. In a distributed computing environment, program modules may be physically located in different local and remote memory storage devices. Execution of the program modules may occur locally in a stand-alone manner or remotely in a client server manner. Examples of such distributed computing environments include local area networks and the Internet.

The detailed description that follows is represented largely in terms of processes and symbolic representations of operations by conventional computer components, including a processing unit (a processor), memory storage devices, connected display devices, and input devices. Furthermore, these processes and operations may utilize conventional computer components in a heterogeneous distributed computing environment, including remote file servers, computer servers, and memory storage devices. Each of these conventional distributed computing components is accessible by the processor via a communication network.

The processes and operations performed by the computer include the manipulation of signals by a processor and the maintenance of these signals within data structures resident in one or more memory storage devices. For the purposes of this discussion, a process is generally conceived to be a sequence of computer-executed steps leading to a desired result. These steps usually require physical manipulations of physical quantities. Usually, though not necessarily, these quantities take the form of electrical, magnetic, or optical signals capable of being stored, transferred, combined, compared, or otherwise manipulated. It is convention for those skilled in the art to refer to representations of these signals as bits, bytes, words, information, elements, symbols, characters, numbers, points, data, entries, objects, images, files, or the like. It should be kept in mind, however, that these and similar terms are associated with appropriate physical quantities for computer operations, and that these terms are merely conventional labels applied to physical quantities that exist within and during operation of the computer.

It should also be understood that manipulations within the computer are often referred to in terms such as creating, adding, calculating, comparing, moving, receiving, determining, identifying, populating, loading, executing, etc. that are often associated with manual operations performed by a human operator. The operations described herein are machine operations performed in conjunction with various input provided by a human operator or user that interacts with the computer.

In addition, it should be understood that the programs, processes, methods, etc. described herein are not related or limited to any particular computer or apparatus. Rather, various types of general purpose machines may be used with the program modules constructed in accordance with the teachings described herein. Similarly, it may prove advantageous to construct a specialized apparatus to perform the method steps described herein by way of dedicated computer systems in a specific network architecture with hard-wired logic or programs stored in nonvolatile memory, such as read-only memory.

Referring now to the drawings, in which like numerals represent like elements throughout the several figures, aspects of the present invention and the illustrative operating environment will be described.

FIG. 1 and the following discussion are intended to provide a brief, general description of a suitable computing environment in which the invention may be implemented. Referring now to FIG. 1, an illustrative environment for implementing the invention includes a conventional personal computer 100, including a processing unit 102, a system memory, including read only memory (ROM) 104 and random access memory (RAM) 108, and a system bus 105 that couples the system memory to the processing unit 102. The read only memory (ROM) 104 includes a basic input/output system 106 (BIOS), containing the basic routines that help to transfer information between elements within the personal computer 100, such as during start-up. The personal computer 100 further includes a hard disk drive 118 and an optical disk drive 122, e.g., for reading a CD-ROM disk or DVD disk, or to read from or write to other optical media. The drives and their associated computer-readable media provide nonvolatile storage for the personal computer 100. Although the description of computer-readable media above refers to a hard disk, a removable magnetic disk and a CD-ROM or DVD-ROM disk, it should be appreciated by those skilled in the art that other types of media are readable by a computer, such as magnetic cassettes, flash memory cards, digital video disks, Bernoulli cartridges, and the like, may also be used in the illustrative operating environment.

A number of program modules may be stored in the drives and RAM 108, including an operating system 114 and one or more application programs 110, such as a program for browsing the world-wide-web, such as WWW browser 112. Such program modules may be stored on hard disk drive 118 and loaded into RAM 108 either partially or fully for execution.

A user may enter commands and information into the personal computer 100 through a keyboard 128 and pointing device, such as a mouse 130. Other control input devices (not shown) may include a microphone, joystick, game pad, satellite dish, scanner, or the like. These and other input devices are often connected to the processing unit 100 through an input/output interface 120 that is coupled to the system bus, but may be connected by other interfaces, such as a game port, universal serial bus, or firewire port. A display monitor 126 or other type of display device is also connected to the system bus 105 via an interface, such as a video display adapter 116. In addition to the monitor, personal computers typically include other peripheral output devices (not shown), such as speakers or printers. The personal computer 100 may be capable of displaying a graphical user interface on monitor 126.

The personal computer 100 may operate in a networked environment using logical connections to one or more remote computers, such as a host computer 140. The host computer 140 may be a server, a router, a peer device or other common network node, and typically includes many or all of the elements described relative to the personal computer 100. The LAN 136 may be further connected to an Internet service provider 134 ("ISP") for access to the Internet 138. In this manner, WWW browser 112 may connect to host computer 140 through LAN 136, ISP 134, and the Internet 138. Such networking environments are commonplace in offices, enterprise-wide computer networks, intranets and the Internet.

When used in a LAN networking environment, the personal computer 100 is connected to the LAN 136 through a network interface unit 124. When used in a WAN networking environment, the personal computer 100 typically includes a modem 132 or other means for establishing communications through the Internet service provider 134 to the Internet. The modem 132, which may be internal or external, is connected to the system bus 105 via the input/output interface 120. It will be appreciated that the network connections shown are illustrative and other means of establishing a communications link between the computers may be used.

The operating system 114 generally. controls the operation of the previously discussed personal computer 100, including input/output operations. In the illustrative operating environment, the invention is used in conjunction with Microsoft Corporation's "Windows 98" operating system and a WWW browser 112, such as Microsoft Corporation's Internet Explorer or Netscape Corporation's Internet Navigator, operating under this operating system. However, it should be understood that the invention can be implemented for use in other operating systems, including, but not limited to Microsoft Corporation's "WINDOWS 3.1," "WINDOWS 95", "WINDOWS NT," "WINDOWS 2000" and "WINDOWS XP" operating systems, IBM Corporation's "OS/2" operating system, SunSoft's "SOLARIS" operating system used in workstations manufactured by Sun Microsystems, Linux-based operating systems and the operating systems used in "MACINTOSH" computers manufactured by Apple Computer, Inc. Likewise, the invention may be implemented for use with other WWW browsers known to those skilled in the art.

Host computer 140 is also connected to the Internet 138, and may contain components similar to those contained in personal computer 100 described above. Additionally, host computer 140 may execute an application program for receiving requests for WWW pages, and for serving such pages to the requester, such as WWW server 142. According to an embodiment of the present invention, WWW server 142 may receive requests for WWW pages 150 or other documents from WWW browser 112. In response to these requests, WWW server 142 may transmit WWW pages 150 comprising hyper-text markup language ("HTML") or other markup language files, such as active server pages, to WWW browser 112. Likewise, WWW server 142 may also transmit requested data files 148, such as graphical images or text information, to WWW browser 112. WWW server may also execute scripts 144, such as CGI or PERL scripts, to dynamically produce WWW pages 150 for transmission to WWW browser 112. WWW server 142 may also transmit scripts 144, such as a script written in JavaScript, to WWW browser 112 for execution. Similarly, WWW server 142 may transmit programs written in the Java programming language, developed by Sun Microsystems, Inc., to WWW browser 112 for execution. As will be described in more detail below, aspects of the present invention may be embodied in application programs executed by host computer 142, such as scripts 144, or may be embodied in application programs executed by computer 100, such as Java applications 146. Those skilled in the art will also appreciate that aspects of the invention may also be embodied in a stand-alone application program.

Brief Explanation of Terms

The term "visual media" includes both traditional and conventional publications and video sources. The term "traditional visual media" encompasses physical publications such as magazines, catalogs, newspapers, pamphlets, and other similar physical publications, and video sources, such as television broadcasts, motion pictures, video cassettes and discs, and the like, that do not provide for the reader or viewer to interactively obtain additional electronic information regarding objects appearing in images of the visual media. The term "traditional visual media object" includes parts or portions of physical publications and video sources, such as a photograph, illustration, page of text, still frame, particular image or video clip of a broadcast video or motion picture source, or any combination thereof that may depict goods or services for sale or any other type of information. The term "conventional video media" includes any electronic publication such as web pages on the Internet, publications available on CD-ROM, digital images (including video sources), and other like electronic publications. The term "conventional visual media object" comprises parts or portions of electronic publications, such as digital graphic image (including clips of video images) or screen of text or both or any combination thereof that may depict goods or services for sale or any other type of information. The reader will appreciate that these definitions are intended to be illustrative rather than exhaustive. Other possible embodiments encompassed by these terms will become more apparent from the detailed description of the illustrative embodiments of the present invention as discussed hereinbelow.

Illustrative Embodiments of the Present Invention

With the above preface on the illustrative operating environment for embodiments of the present invention, FIGS. 2-14 which illustrate aspects of several embodiments of the present invention will be described.

Figure 2:
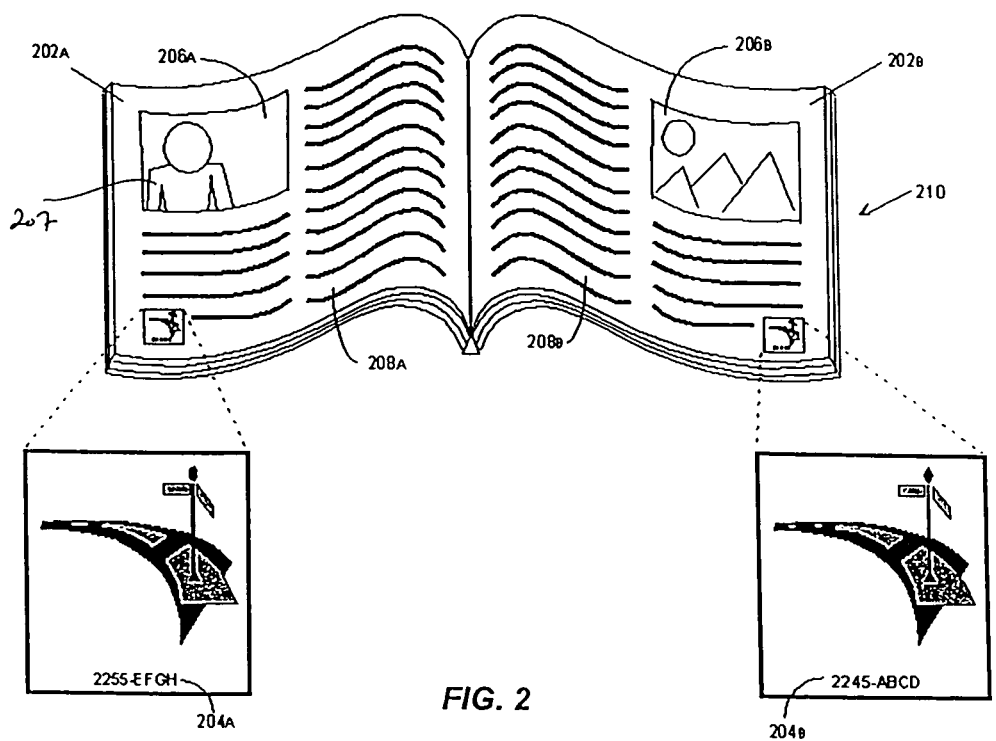
FIG. 2 illustrates a traditional visual media object that has been associated with a unique identifier in a printed publication embodiment of the present invention.
Figure 3A:
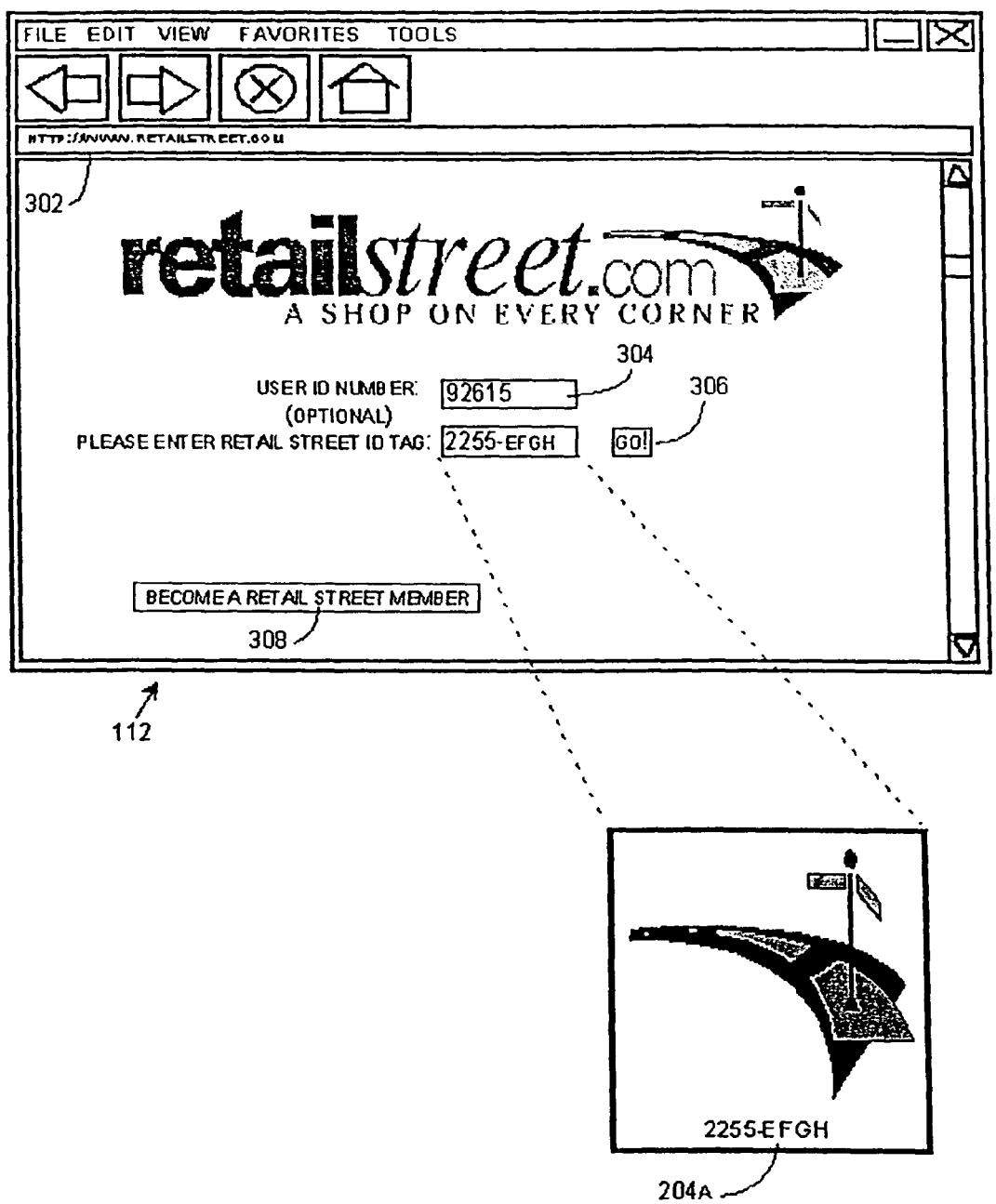
FIG. 3A is a display screen of a software program for prompting input of a unique identification code corresponding to a traditional visual media object.
Figure 4A:
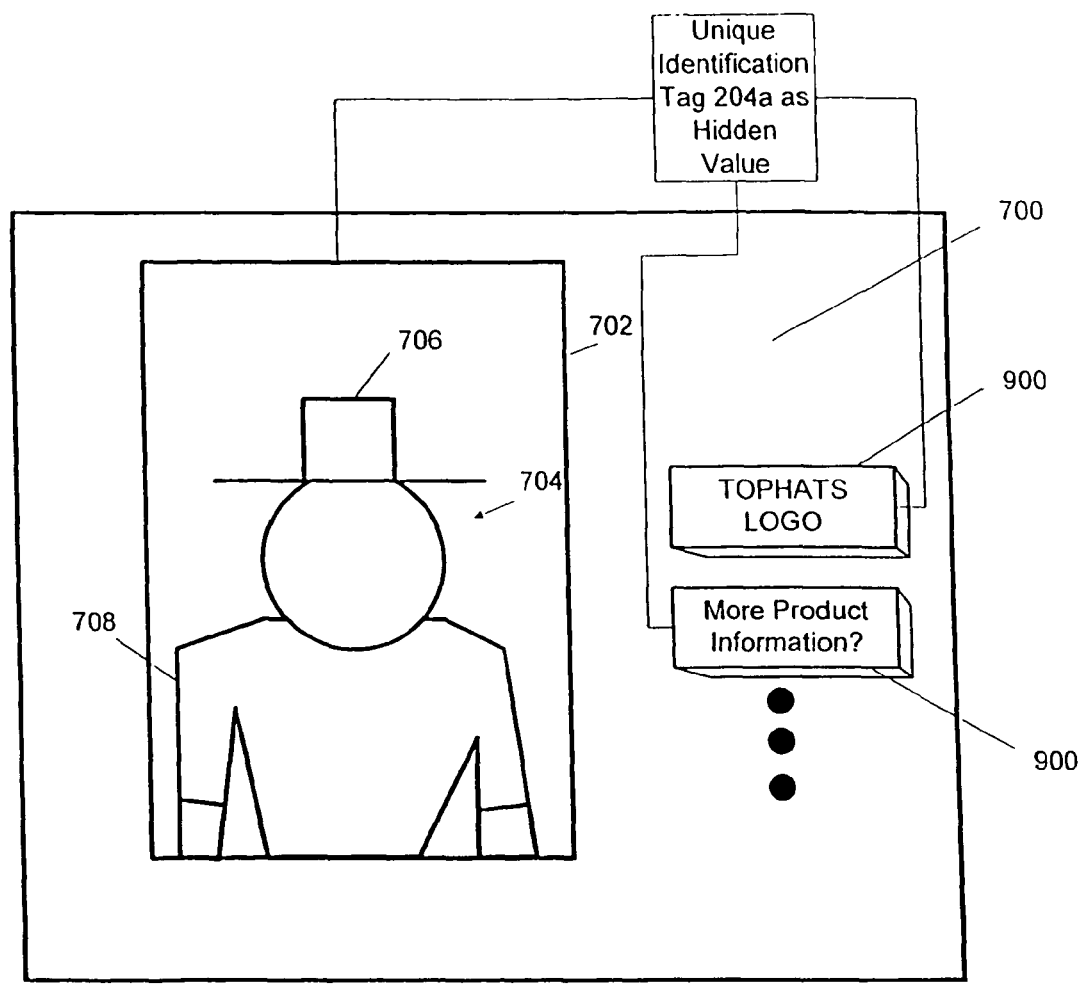
FIG. 4A is a display screen of a conventional visual media object in the form a digital graphic image contained within a portion of an electronic publication which has a hidden unique identification tag.
Figure 4B:
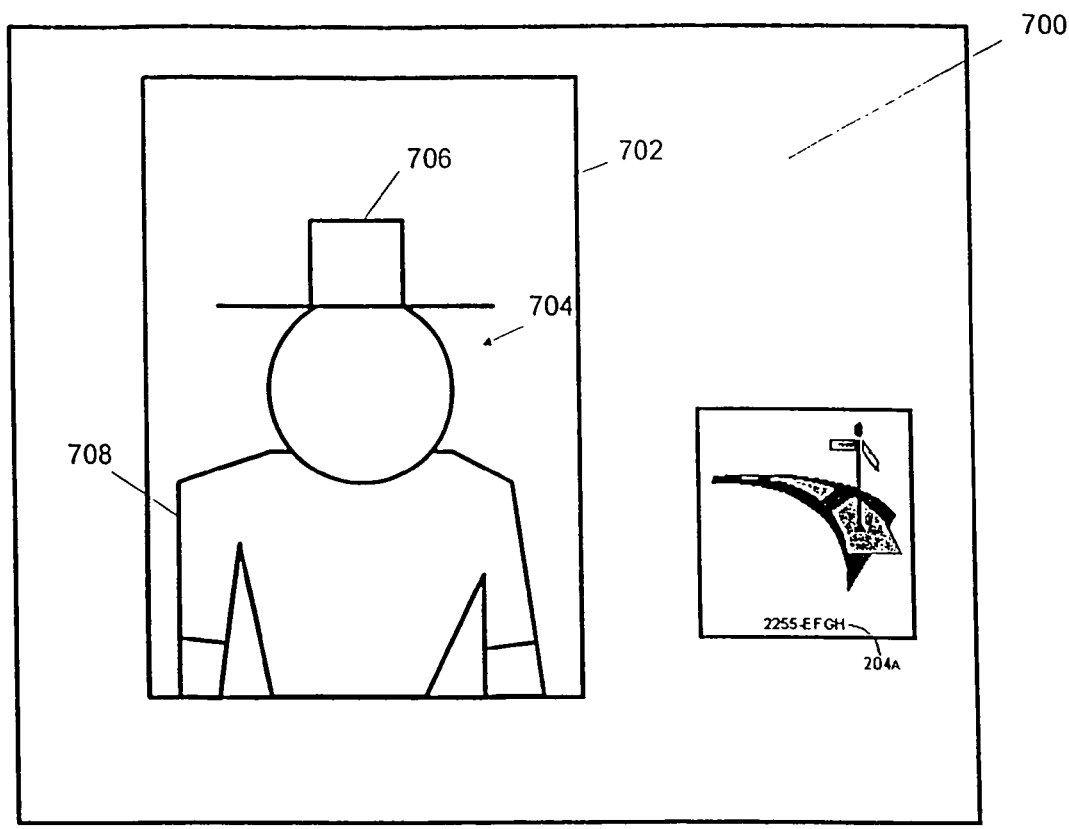
FIG. 4B is a display screen of a conventional visual media object in the form a digital graphic image contained within a portion of an electronic publication which has a unique identification tag displayed adjacent to a digital image.
Figure 5:
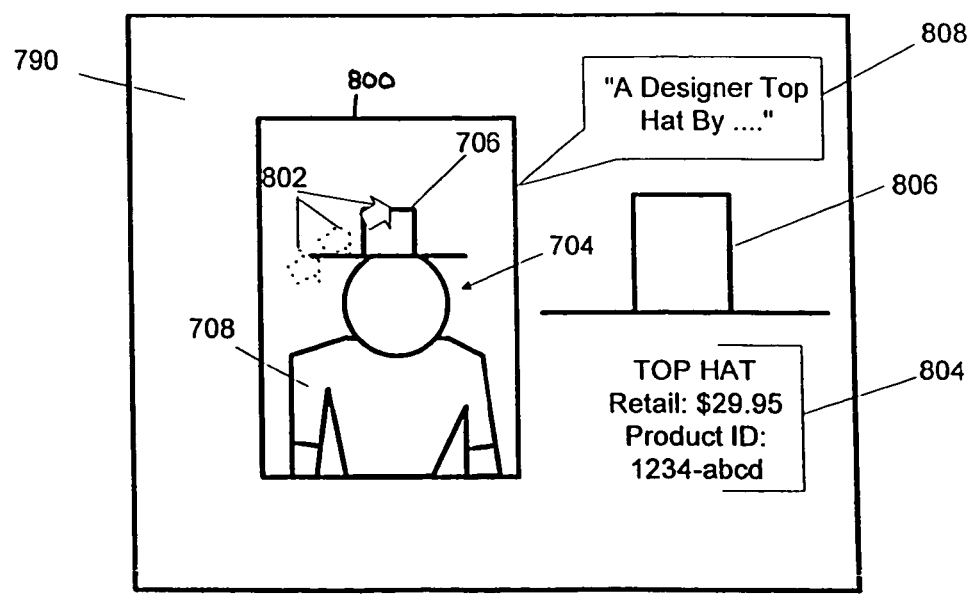
FIG. 5 is a display screen of a software program for displaying an interactive electronic representation of the corresponding conventional visual media object of FIG. 4A or 4B that embodies aspects of the present invention.
Figure 6:
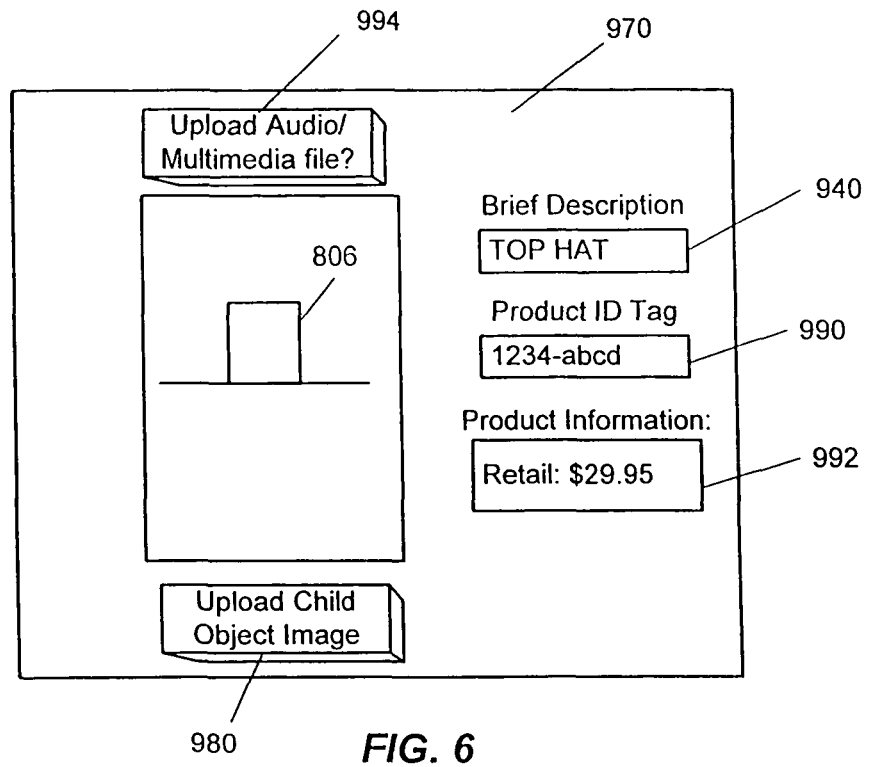
FIG. 6 is a display screen of a software program for displaying an uploaded child object image and for acquiring child object information.

FIG. 2 illustrates a traditional visual media object in the form of a printed publication that has been associated with a unique identifier. FIG. 3A is a display screen of a software program for prompting input of a unique identification code corresponding to a traditional visual media object. FIG. 4A is a display screen of a conventional visual media object in the form of a digital graphic image contained within a portion of an electronic publication which has a hidden unique identification tag. FIG. 4B is a display screen of a software program that displays an electronic representation of a conventional visual media object, such as a digital image contained within an electronic publication. FIG. 5 is a display screen of a software program for displaying an interactive electronic representation of the corresponding conventional visual media object of FIG. 4B that embodies aspects of the present invention. FIG. 6 is a display screen of a software program for displaying an uploaded child object image and for acquiring child object information.

Figure 7:
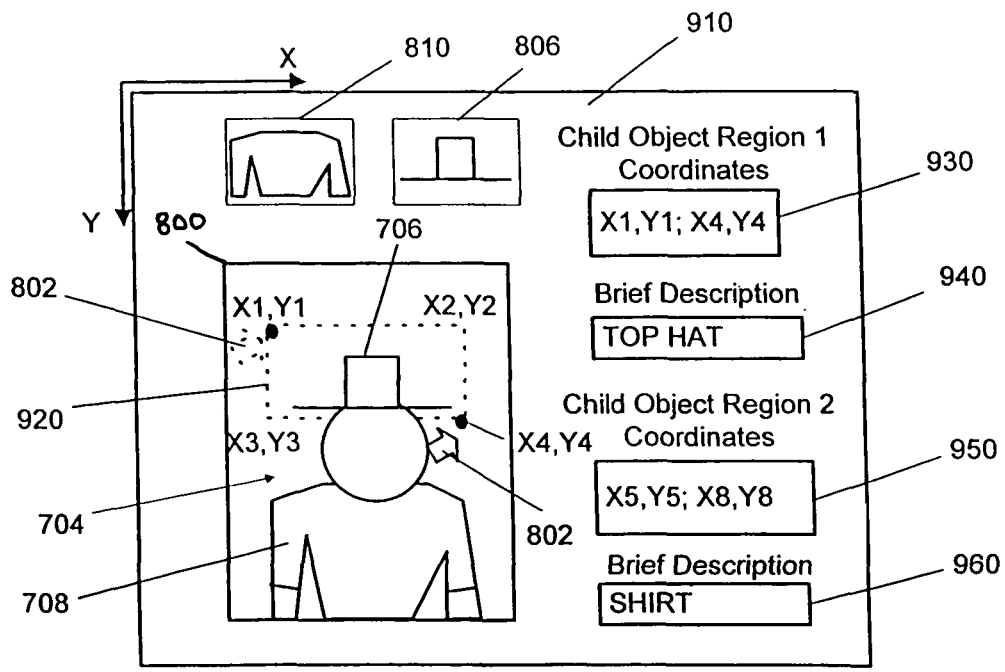
FIG. 7 is a display screen of a software program for identifying regions within a parent object image corresponding with a child object image.
Figure 8:
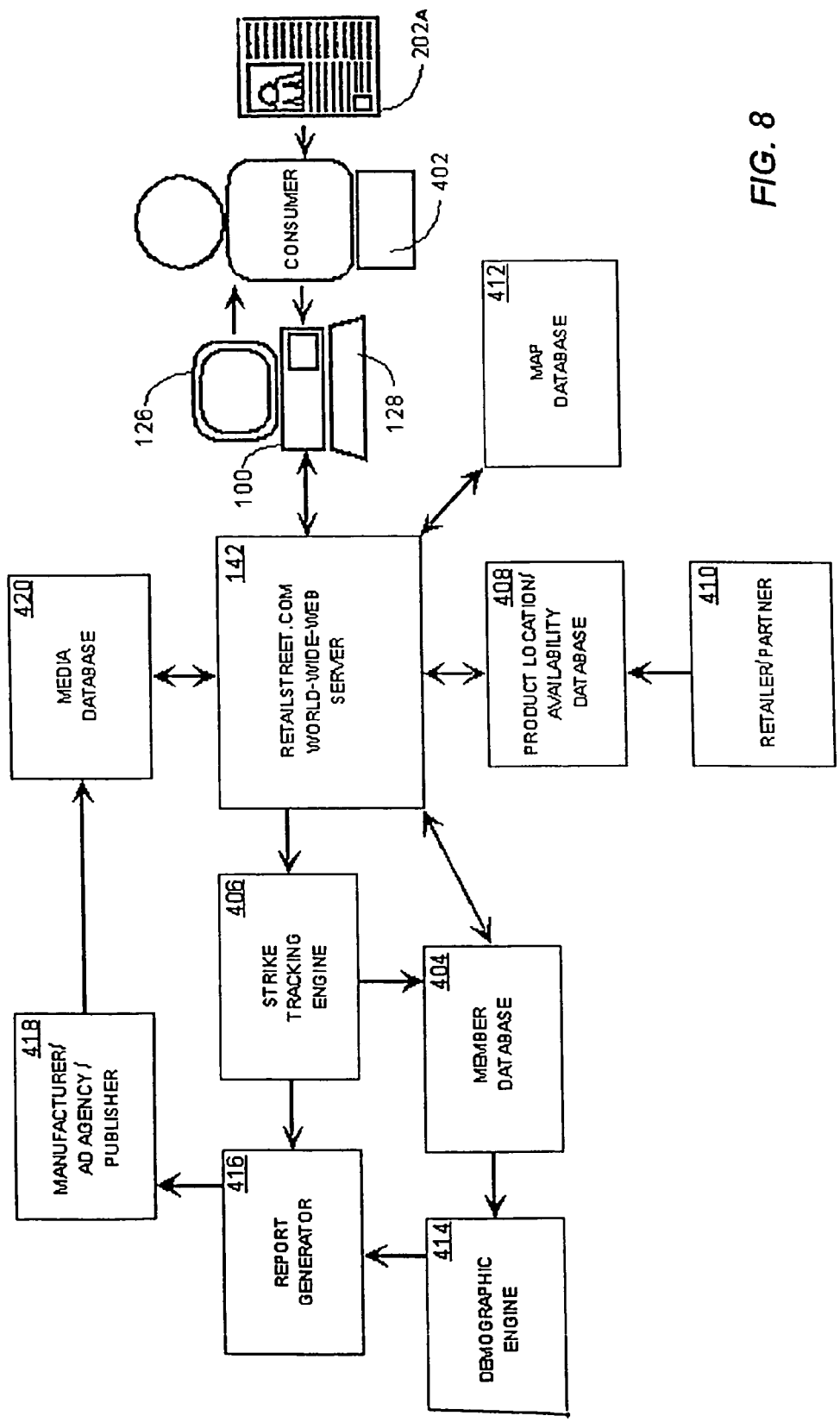
FIG. 8 is a block diagram of a distributed computer system for implementing aspects of the present invention.
Figure 9:
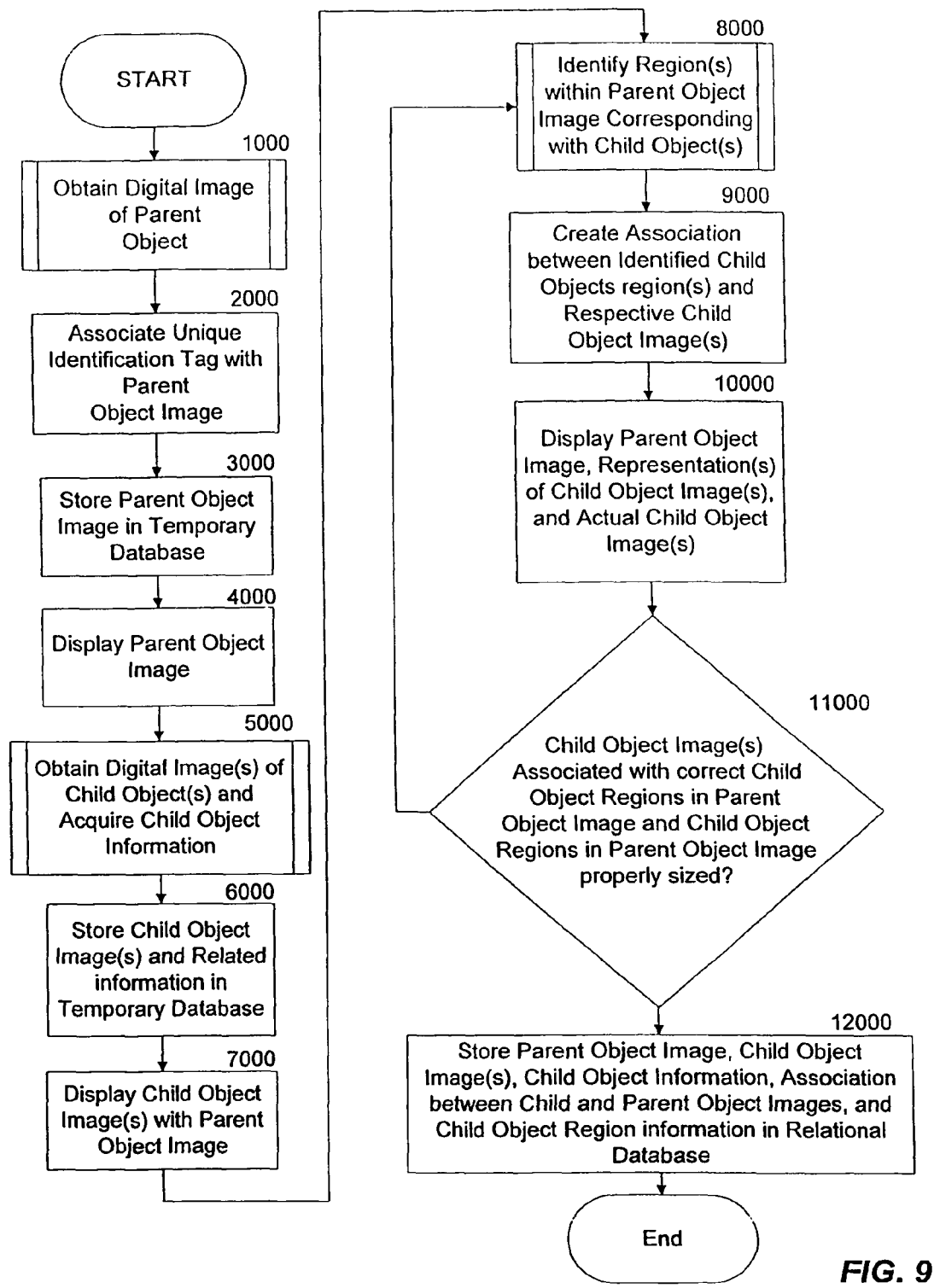
FIG. 9 is a logic flow diagram illustrating an exemplary embodiment of a method for creating an interactive electronic representation of an object.
Figure 10:
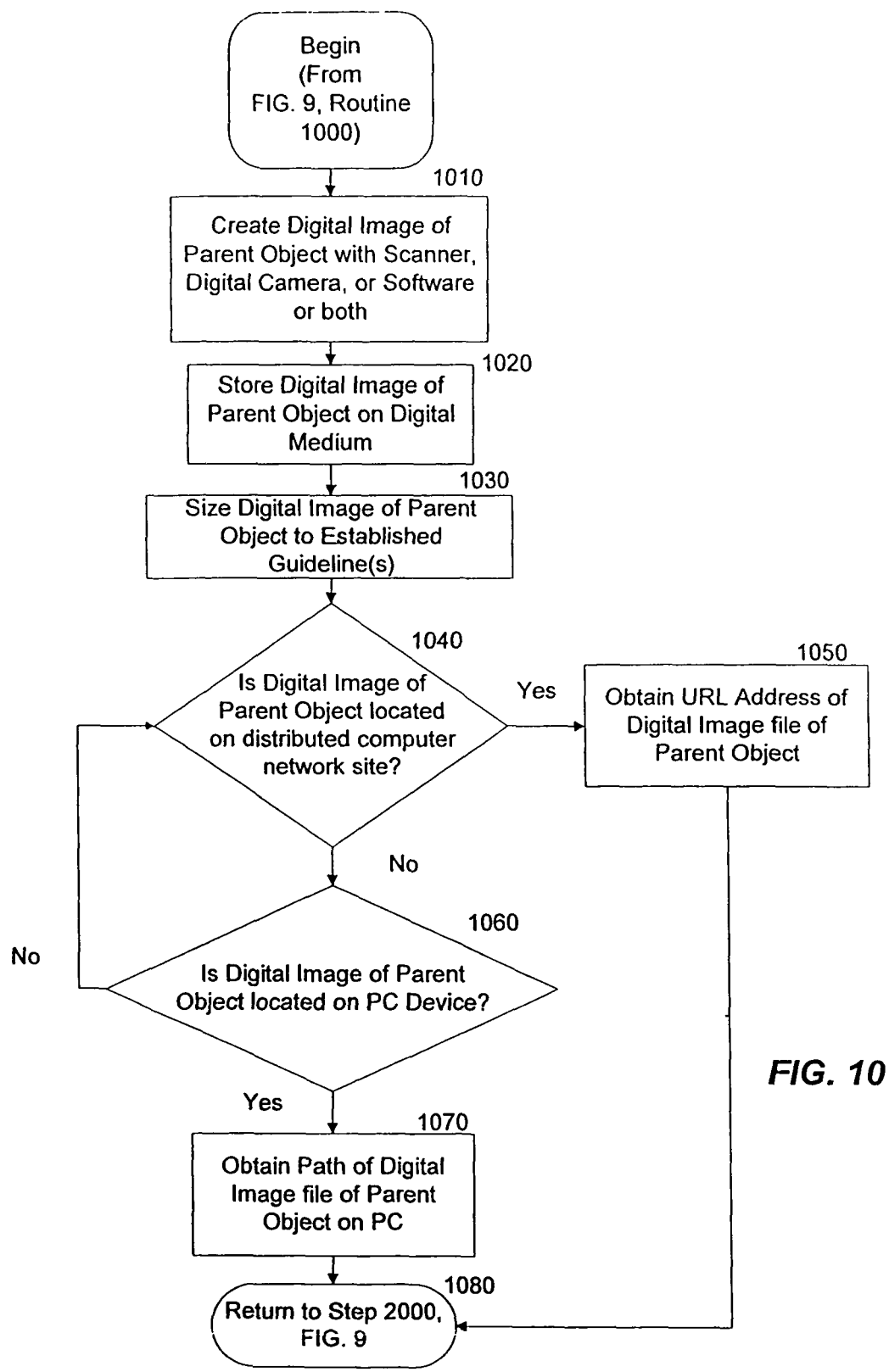
FIG. 10 is a logic flow diagram illustrating a process for obtaining a digital image of a parent object.
Figure 11:
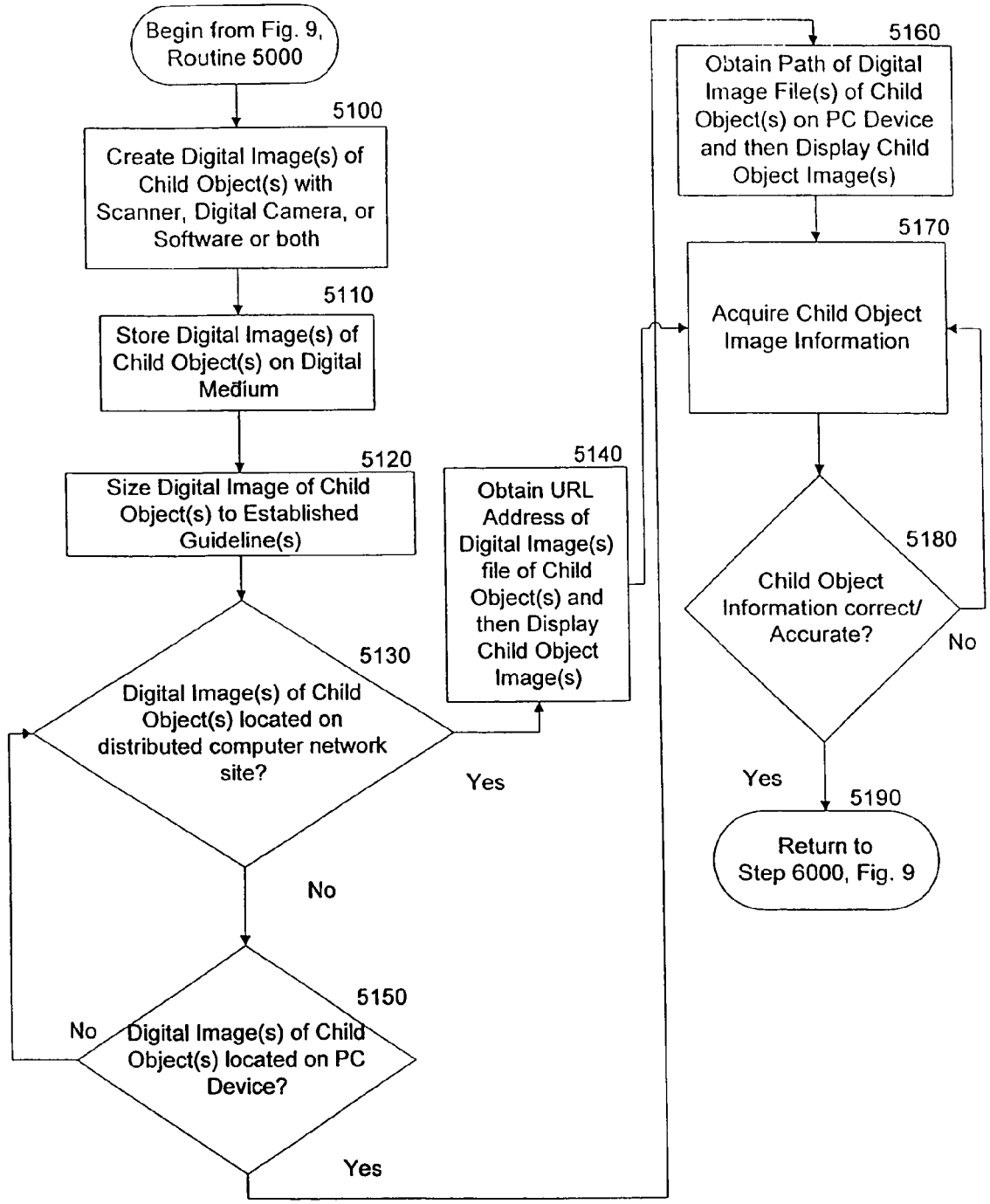
FIG. 11 is a logic flow diagram illustrating a process for obtaining a digital image of a child object and for acquiring child object information.

FIG. 7 is a display screen of a software program for identifying regions within a parent object image corresponding with a child object. FIG. 8 is a block diagram of a distributed computer system that embodies aspects of the present invention. FIG. 9 is a logic flow diagram illustrating an exemplary embodiment of a method for creating an interactive electronic representation of an object. FIG. 10 is a logic flow diagram illustrating a process for obtaining a digital image of a parent object. FIG. 11 is a logic flow diagram illustrating a process for obtaining a digital image of a child object and for acquiring child object information.

Figure 12:
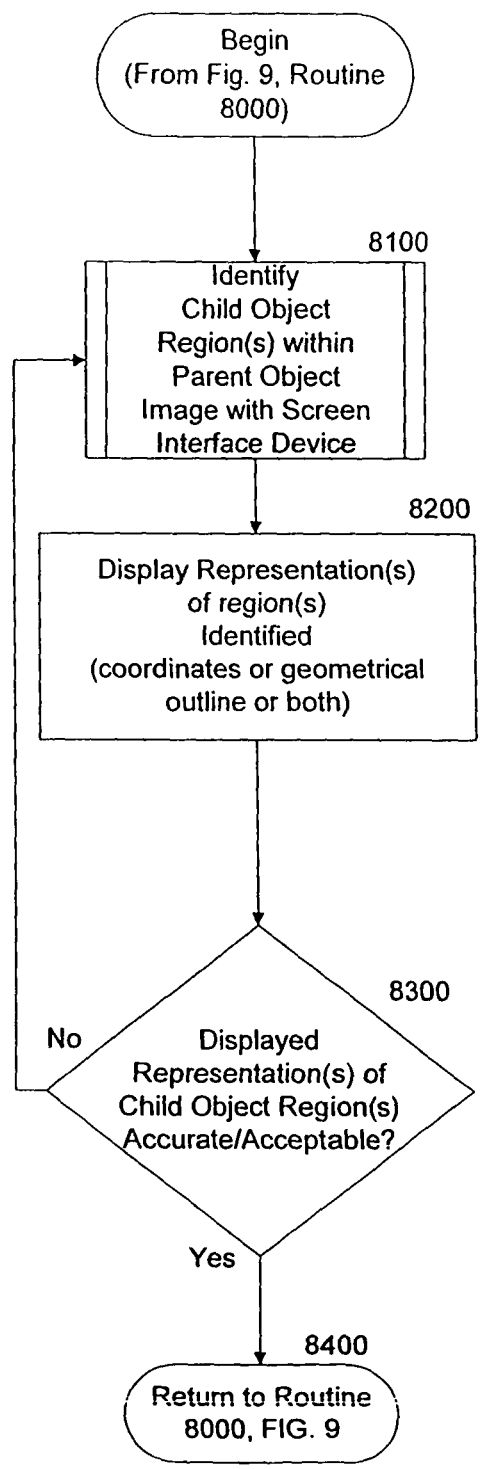
FIG. 12 is a logic flow diagram illustrating a process for identifying regions within a parent object image corresponding to a child object image.
Figure 13:
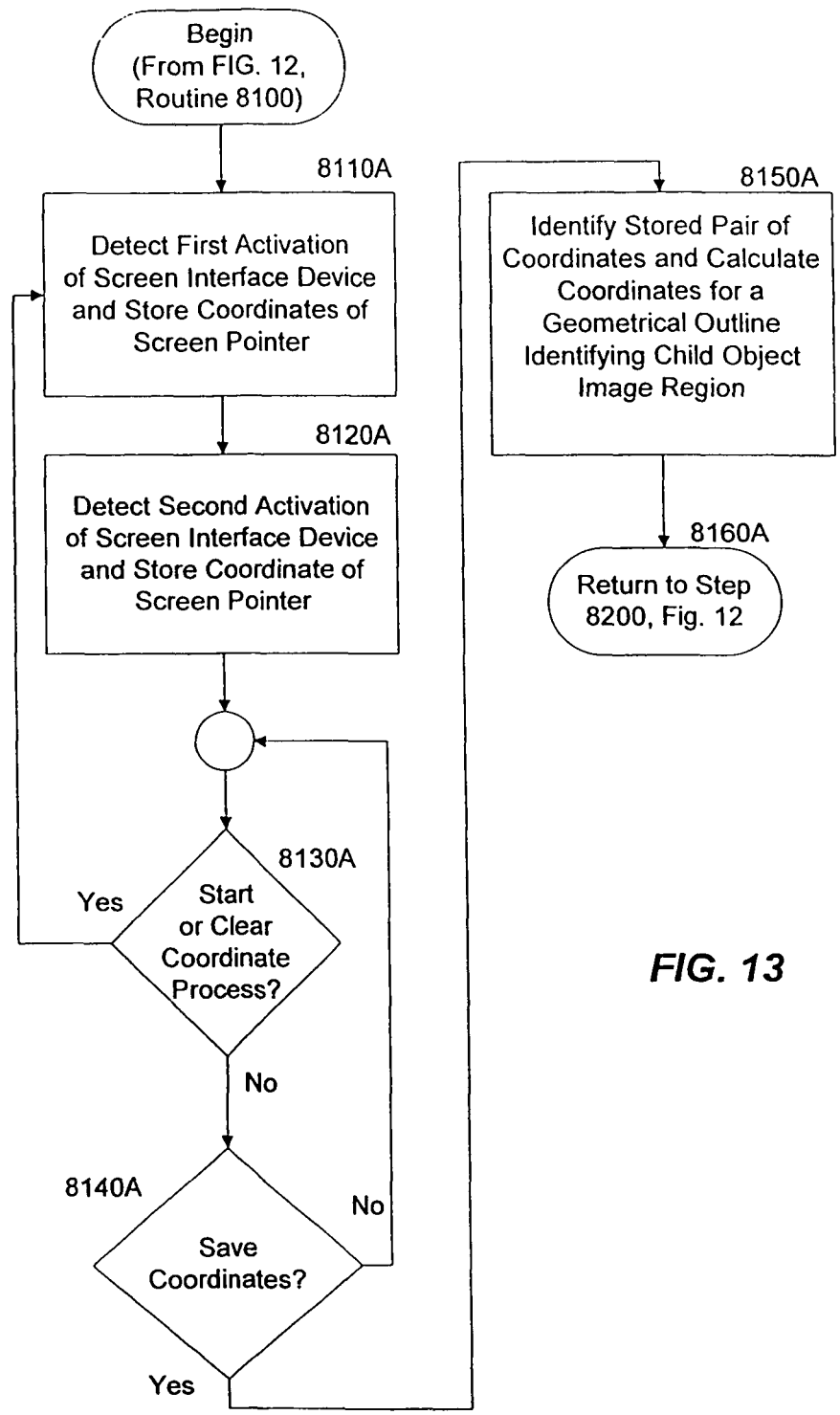
FIG. 13 is a logic flow diagram illustrating a process of a first embodiment for identifying a child object region within a parent object image with a screen interface device.
Figure 14:
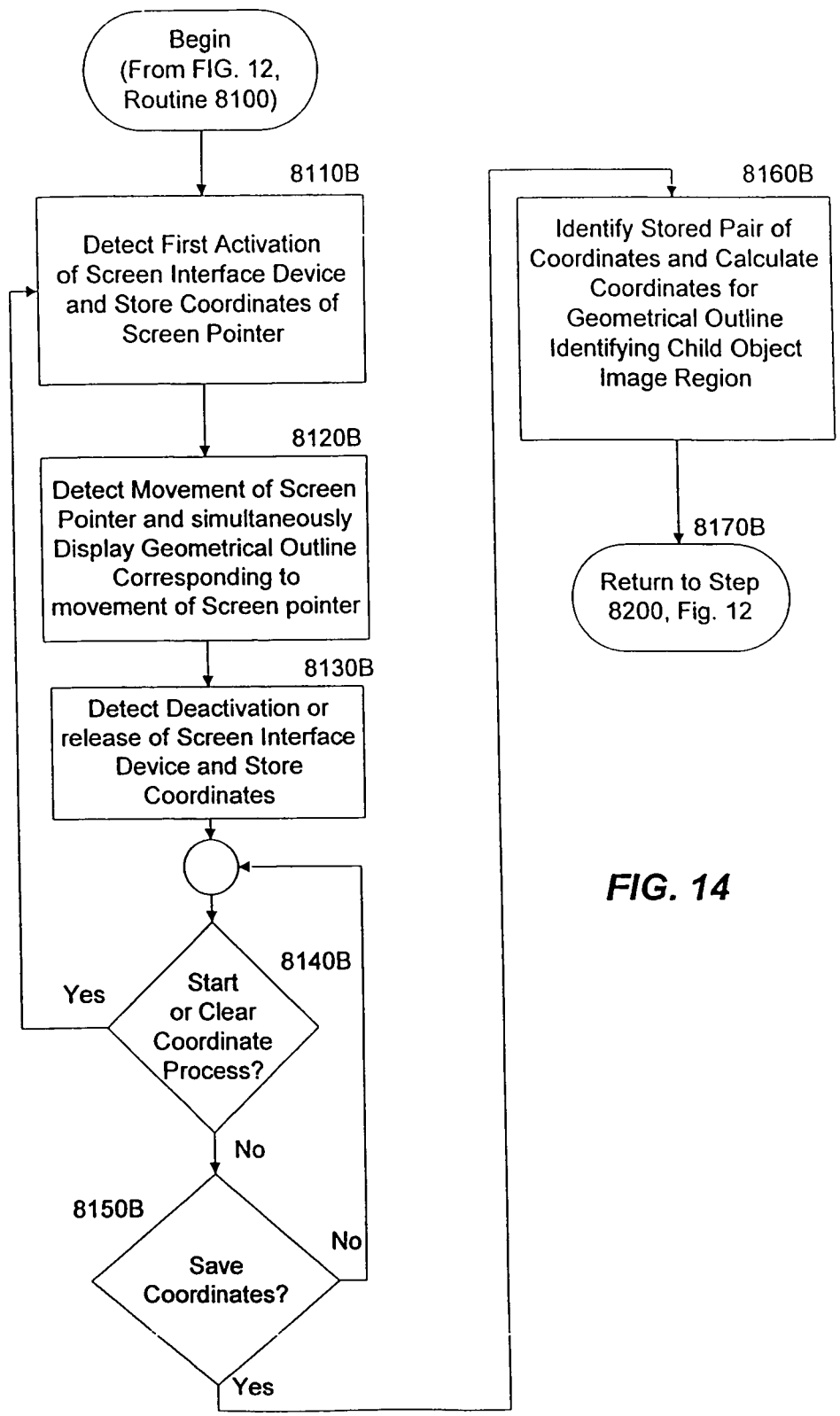
FIG. 14 is a logic flow diagram illustrating a process of a second embodiment for identifying a child object region within a parent object image with a screen interface device.
Figure 15A:
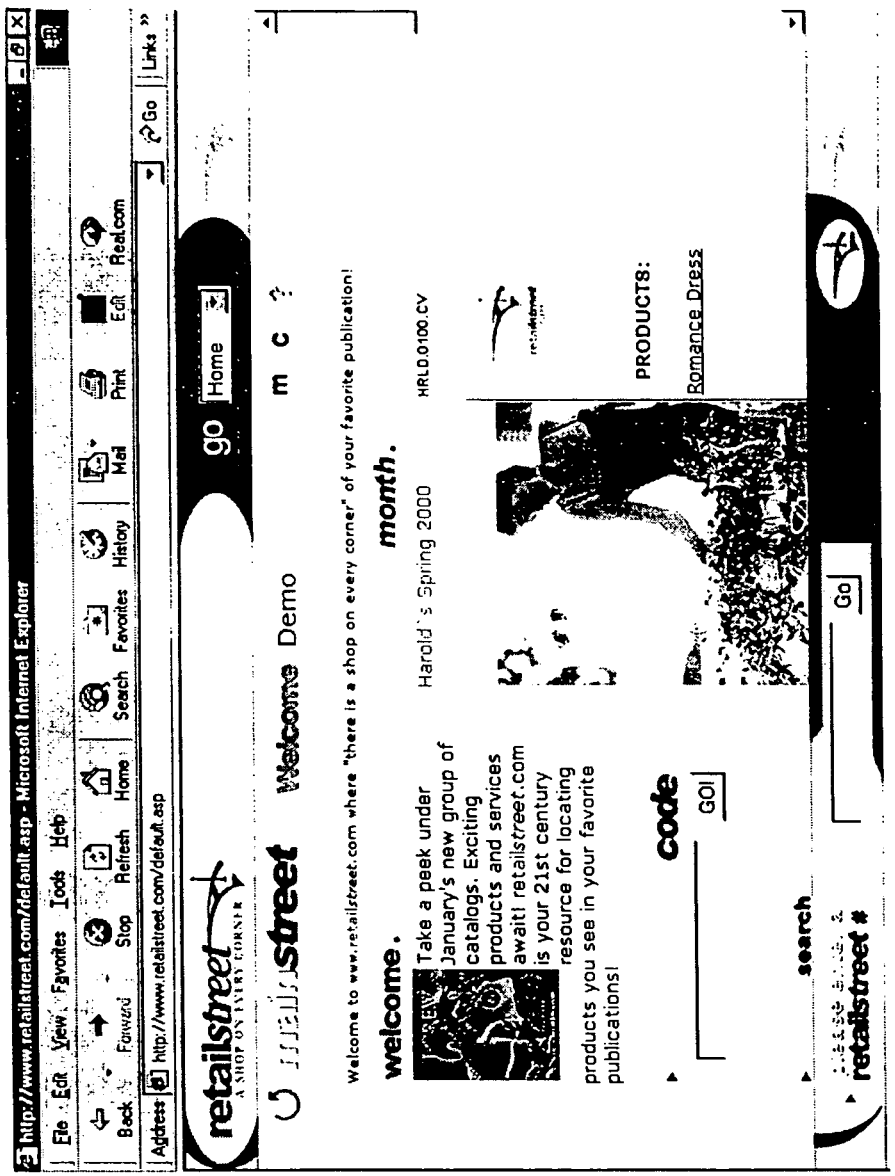
FIG. 15A is a screen shot of a home webpage for accessing interactive electronic representations of visual media objects according to the present invention.
Figure 15B:
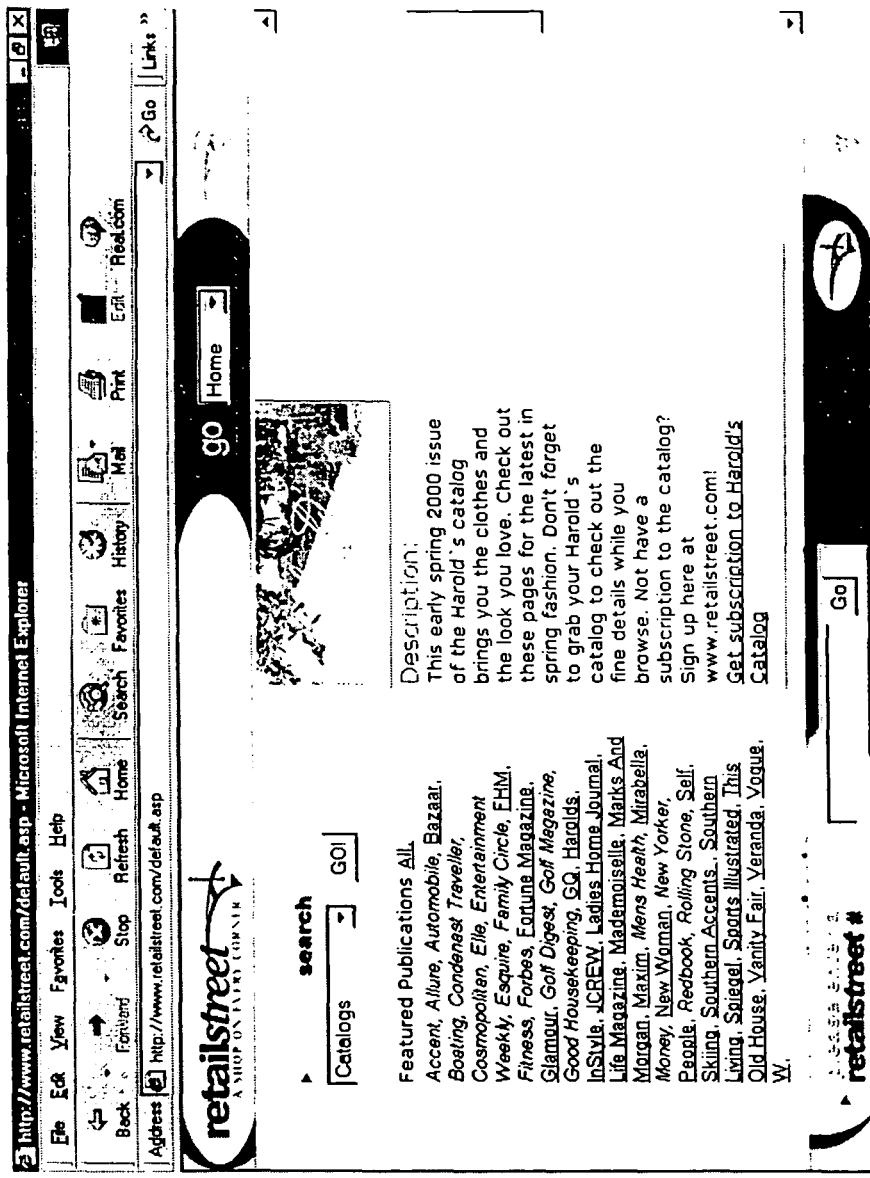
FIG. 15B is a screen shot of a home webpage for accessing interactive electronic representations of visual media objects according to the present invention.
Figure 15C:
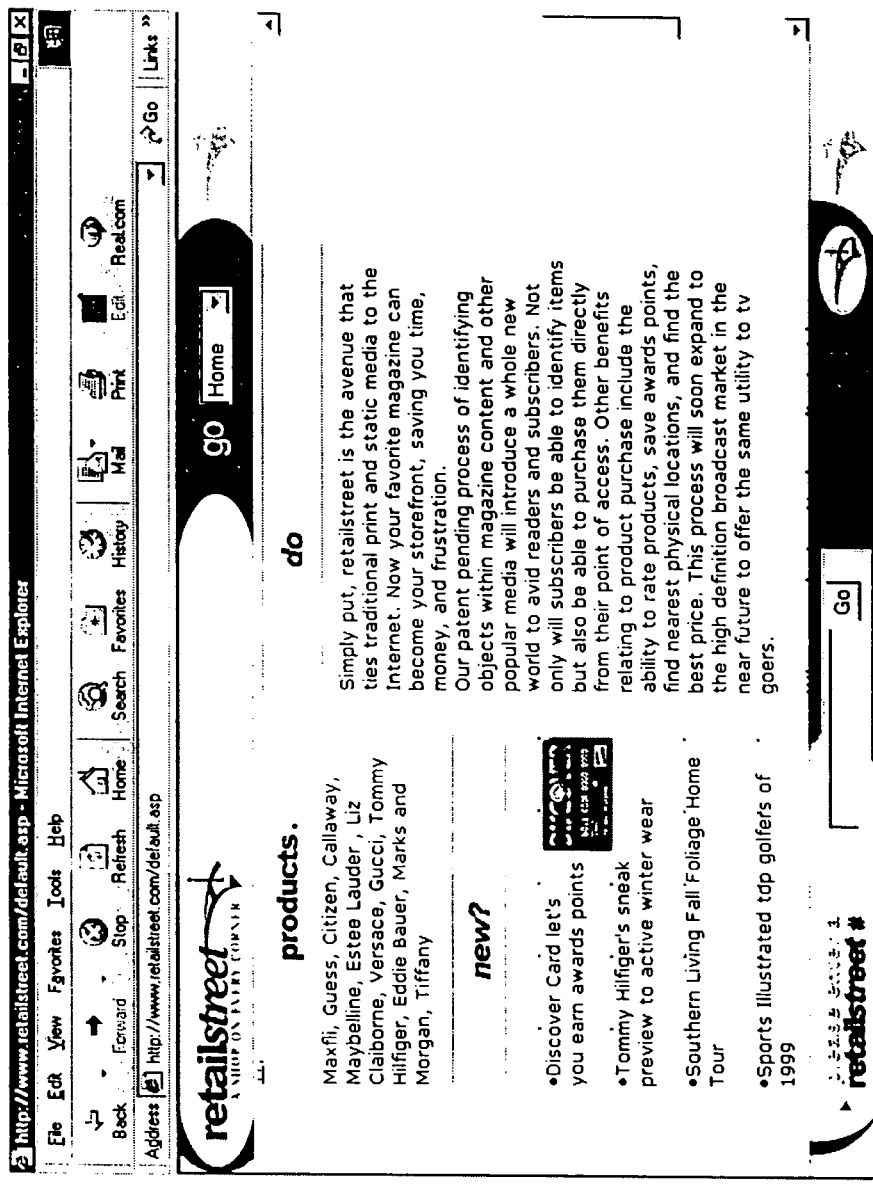
FIG. 15C is a screen shot of a home webpage for accessing interactive electronic representations of visual media objects according to the present invention.
Figure 15D:
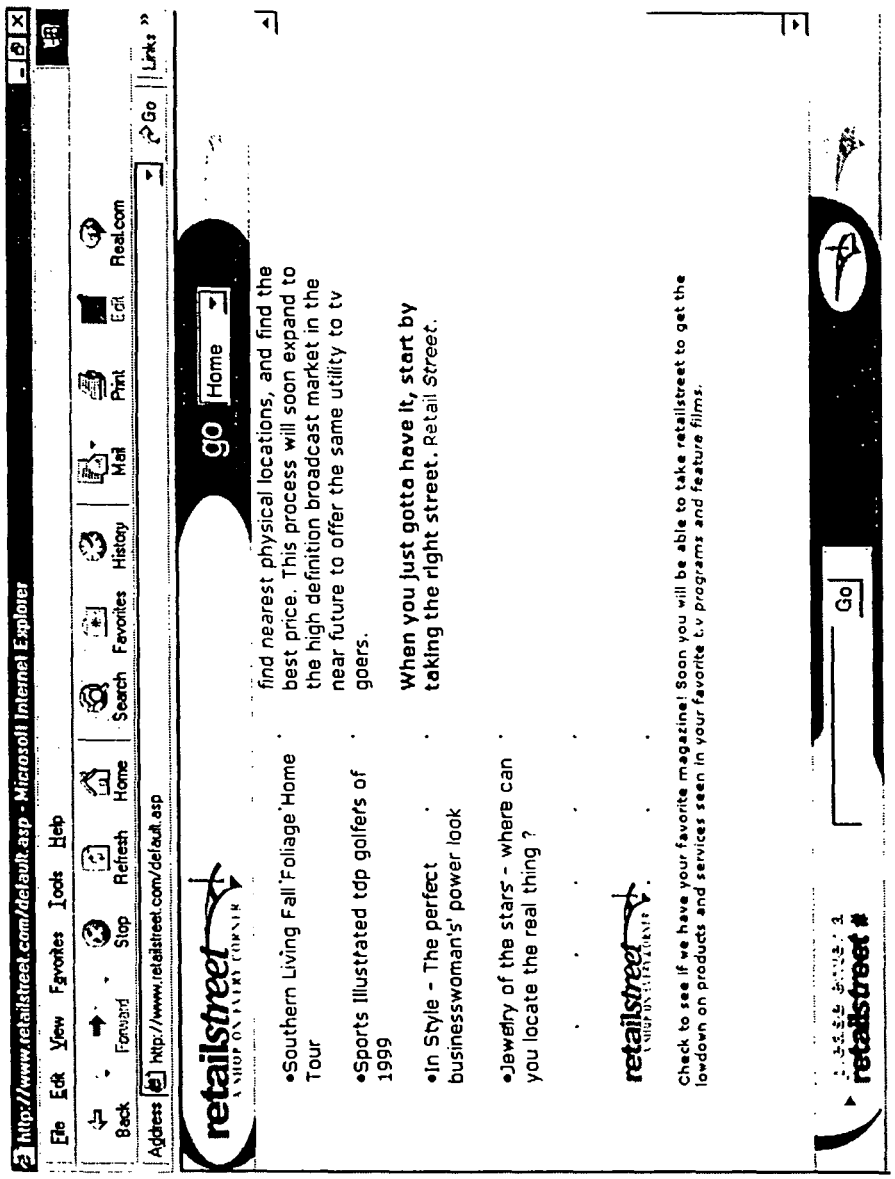
FIG. 15D is a screen shot of a home webpage for accessing interactive electronic representations of visual media objects according to the present invention.
Figure 16A:
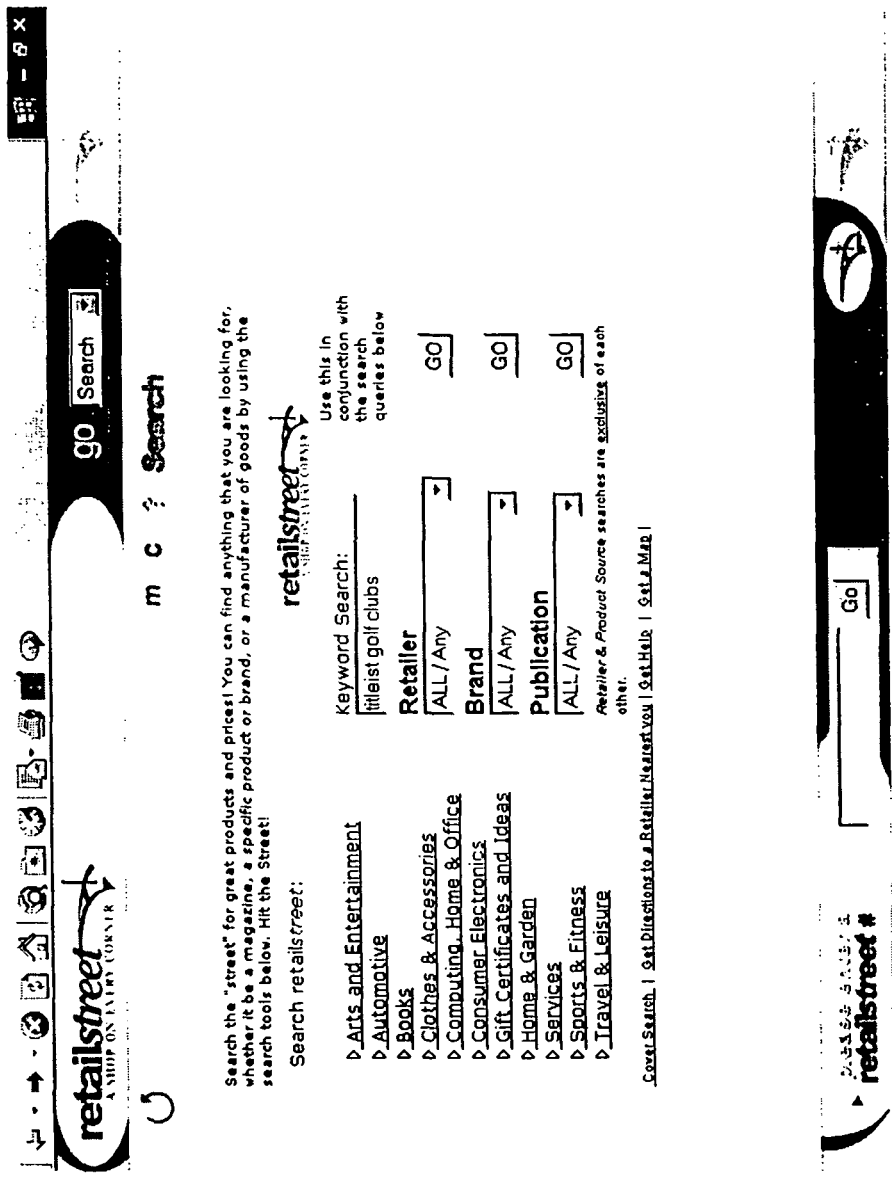
FIG. 16A is a screen shot of a search webpage for searching for and accessing interactive electronic representations of visual media objects according to the present invention.
Figure 16B:
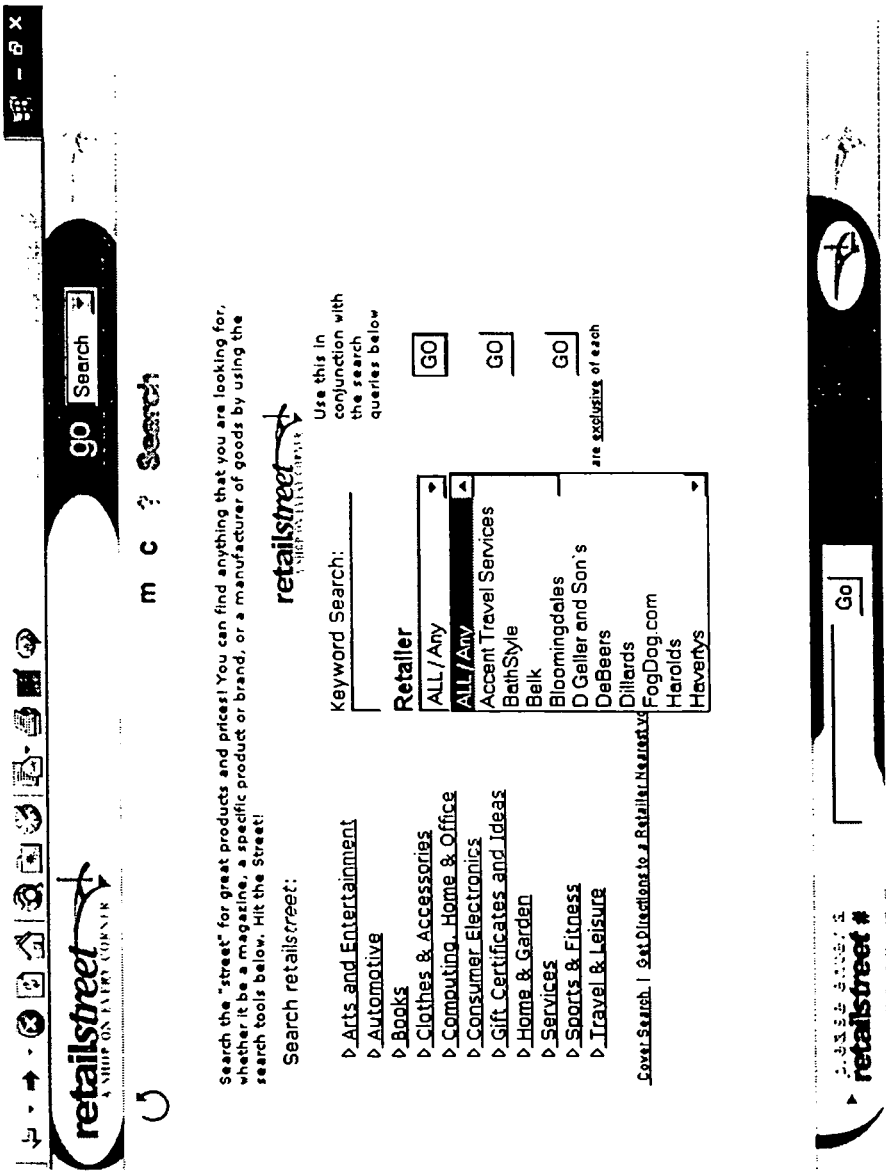
FIG. 16B is a screen shot of a search webpage for searching for and accessing interactive electronic representations of visual media objects according to the present invention.
Figure 16C:
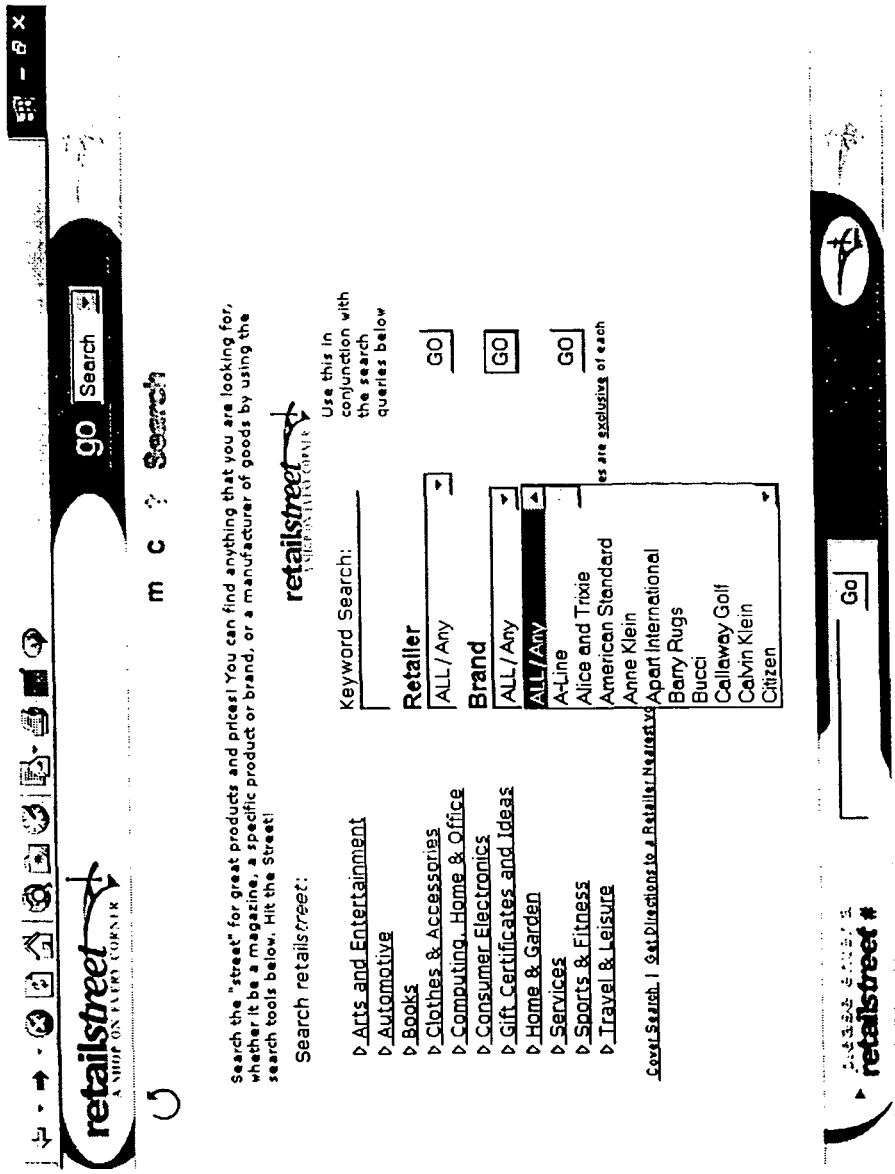
FIG. 16C is a screen shot of a search webpage for searching for and accessing interactive electronic representations of visual media objects according to the present invention.
Figure 16D:
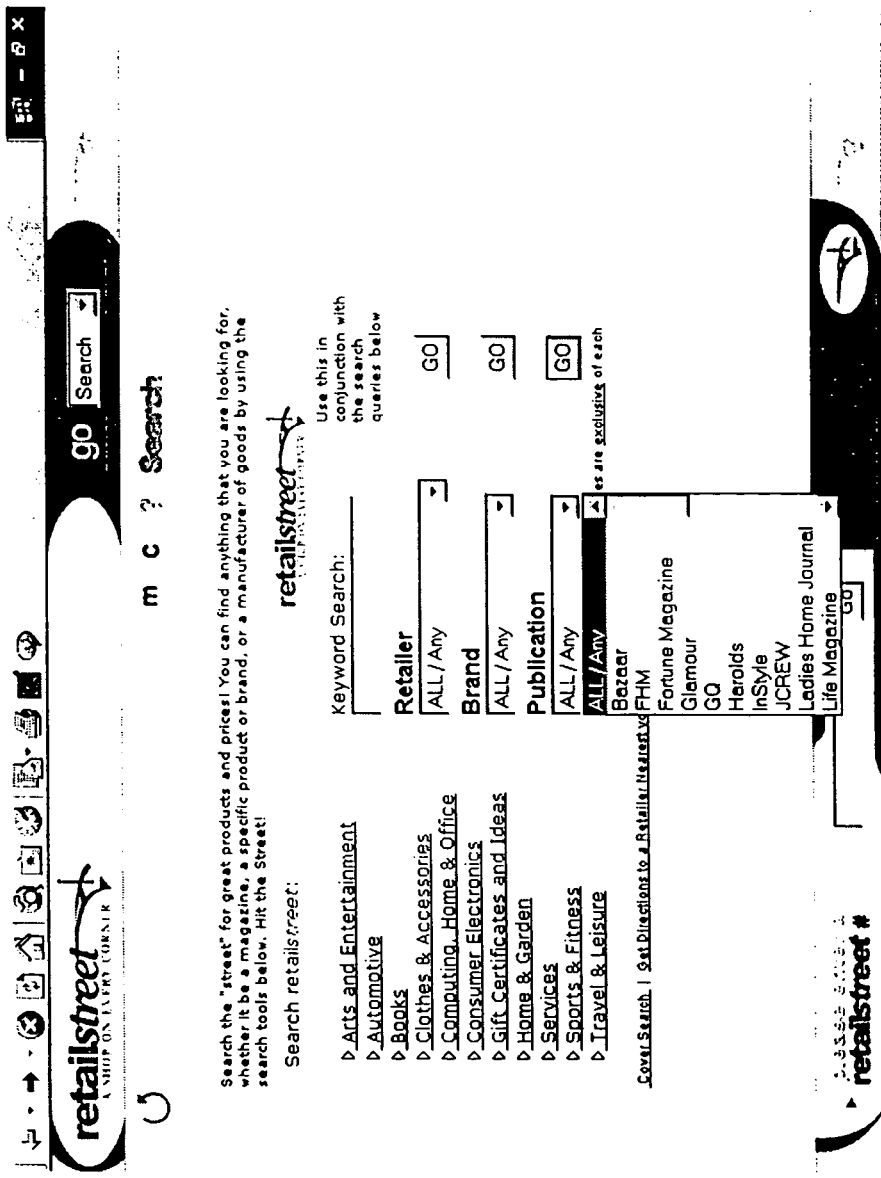
FIG. 16D is a screen shot of a search webpage for searching for and accessing interactive electronic representations of visual media objects according to the present invention.

FIG. 12 is a logic flow diagram illustrating a process for identifying regions within a parent object image corresponding to a child object. FIG. 13 is a logic flow diagram illustrating a process of a first embodiment for identifying a child object region within a parent object image with a screen interface device. FIG. 14 is a logic flow diagram illustrating a process of a second embodiment for identifying a child object region within a parent object image with a screen interface device.

Referring now to FIG. 2, aspects of the present invention will be described. FIG. 2 illustrates two traditional visual media objects that have been associated with unique identifiers. In particular, FIG. 2 shows a magazine 210 that has been turned open to show a left page 202a and a right page 202b. Left page 202a comprises one traditional visual media object and right page 202b comprises a second traditional visual media object. In the illustrative embodiment, magazine pages 202a and 202b are described as illustrative traditional visual media objects. However, visual media objects may also comprise any traditional visual publication, or conventional visual publications such as electronic publications utilizing web pages, or any object that cannot by itself provide access to related electronic information. For instance, other types of traditional visual media objects may include newspaper pages, catalog pages, billboards, pamphlets, mailings, legal, medical, and other documents, or pages of a book, including the book's cover, poster, photograph or any real-life image known or observed by consumers. In addition, in video embodiments of the present invention, traditional visual media objects includes one or more "still" images, particular frames and clips from a video source, such as images and/or or clips from a television program or broadcast, motion picture, video cassette and disc, and the like. In video embodiments, the "still" frame or image, or the video clips taken from the video source, is a visual media object analogous to the magazine page or the real-life image to be reflected as an interactive electronic representation.

The traditional or conventional media object also includes a series of images, such as a clip or scene of a video source, the IER of the object may be a replication of some or all of the video source media object, i.e., a portion of or the entire broadcast, program, motion picture, etc.

Other types of conventional visual media objects may include, but are not limited to, electronic images (including video) or text (or both) retrieved from any type of storage medium (volatile and non-volatile—RAM, DRAM, ROM, EEPROM, magnetic storage, CD-ROM, DVD-ROM, etc.) that can be displayed on display devices such as computer screens, television screens, any type of CRT devices, electronic billboards, hand held wireless devices, personal digital assistants, etc. Other conventional visual media objects can include any electronic images or text (or both) provided on personal computer screen savers, images displayed on web pages, any type of multi-media application, and other like electronic or digital visual media objects. The reader will appreciate that this list is intended to be illustrative rather than exhaustive and that visual media objects may comprise additional types of visible objects.

Left page 202a comprises a plurality of objects, such a graphic object 206a and text object 208a. Likewise, right page 202b comprises a plurality of objects, including graphic object 206b and text object 208b. Left page 202a has also been imprinted with an associated unique identification tag 204a. Similarly, right page 202b has been imprinted with an associated unique identification tag 204b. As will be described in more detail below, unique identification tags 204a and 204b are utilized to create an association between the visual media object, such as left page 202a, and a related interactive electronic representation of the visual media object. Accordingly, as the key purpose of the identification tags is creating association of the visual media object with the IER of the object in some manner that allows the user to gain further information, it will be appreciated that "imprinting" of print media pages or video-source images is not required, but other methods of "associating" the tags with a particular visual media object may include adjacent use of the tag, the tag appearing on the package of an image source, the tag being conveyed before, during or after a television broadcast or program or motion picture, showing the tag provided in related advertising, and any other means of conveying the tag to be "associated" with the visual media object to direct the viewer to obtain further information regarding the object via an electronic interface, such as to a computer network or computer storage medium.

In the illustrative embodiment, unique identification tags 204a and 204b have been shown as a sequence of unique numbers and letters. Unique identification tags 204a and 204b may also comprise information that conveys the specific publication, region, issue, date, or page number of the associated visual media object. Unique identification tags 204a and 204b may also comprise information indicating that objects shown within the visual media object, or "child" objects, are eligible for special promotions or discounts. In alternative embodiments, the unique identification tags may themselves comprise a WWW address that provides a direct link to the IER of the objects. In still other embodiments, the unique tags may comprise a WWW address to an indirect web page where the user is redirected or has the ability to access the IER of the object from the intermediary web page. Moreover, unique identification tags 204a and 204b may be shown adjacent to a well-known logo or symbol that a reader may associate with a WWW address. Alternatively, the WWW address may be shown adjacent to the unique identification tag. In other embodiments, the WWW address may be communicated in related advertising, provided before, during or after a program or motion picture (or provided as a general WWW address to the television broadcast network or video/motion picture production company website), and any other "associative" embodiments that indicate to a viewer of the media object where to obtain additional information regarding the object on a computer network. As will be described in more detail below, the WWW address may be used by the reader or viewer to access the interactive electronic representation corresponding to the visual media object.

Referring now to FIG. 3A, additional aspects of the present invention will be described. FIG. 3A is a display screen of a standard WWW browser program being used to access a web site for displaying an interactive electronic representation of a corresponding traditional visual media object that embodies aspects of the present invention. WWW browser 112 is a standard WWW browser, such as Microsoft Corporation's Internet Explorer or Netscape Corporation's Netscape Navigator. WWW browser 112 provides functionality for receiving and displaying HTML documents, including active server pages, executing Javascript scripts and Java applications. WWW browser 112 also provides user interface features for navigating to and between WWW sites, such as the illustrative RETAILSTREET.COM WWW site 302. It will be appreciated that the Retailstreet.com site 302 is described herein for descriptional purposes only and does not necessarily reflect an actual accessible website outside of this description. It will be further appreciated that access to an actual website is not necessary to the understanding of how to practice the embodiments of the invention as described herein. The functionality and operation of WWW browser 112 is well known to those skilled in the art.

The RETAILSTREET.COM WWW site 302 embodies aspects of the present invention, and provides functionality for retrieving IERs associated with all types of visual media objects, both traditional and conventional. In an embodiment of the present invention, a user visits the RETAILSTREET.COM WWW site 302, or any other affiliated website, utilizing WWW browser 112. The user then provides a unique identification tag 204a corresponding to a traditional or conventional visual media object in a user interface window, such as "2255-EFGH." Alternatively, the unique identification tag 204a can be automatically loaded from another web page when the user "clicks on" a conventional visual media object, such as a digital image. At the RETAILSTREET.COM site, the user may also provide a member number 304 which, as described in further detail below, may be associated with a user profile and utilized to track demographic information, such as the user's browsing and purchasing habits. The user may select user interface button 308 to obtain a member number 304. The user may then be prompted for personal information, including name, address, telephone number, age, sex, buying preferences, etc., from which a user profile may be created. The user profile may then be stored in a database for retrieval at a future time when the user again visits the RETAILSTREET.COM WWW site 302. The user may then select the "GO!" user interface button 306, to submit the unique identification tag 204a and the user's optional member number 304 to the WWW server.

In alternative embodiments, unique identification tag may embodied within a bar code or any identifiable encoded graphic, which is capable of being identified by a scanning device or any identification device attached to a computer, that may be automatically passed to the RETAILSTREET.COM Internet site or other affiliated Internet sites or any Internet site utilizing technology of the present invention.

In further embodiments where the unique identification tag 204a is a web address directly linked to the interactive electronic representation (or a site containing the IER) of a visual media object, it will be appreciated that login input or separate tag entries are not required as illustrated in FIG. 3A, but rather the web address tag enables the user to find the IER.

Figure 3B:
FIG. 3B is a display screen of a software application program for displaying an interactive electronic representation of a corresponding traditional visual media object that embodies aspects of the present invention.

Referring now to FIG. 3B, WWW browser 112 is shown displaying an interactive electronic representation 310 ("IER") of corresponding traditional visual media object 202a. The IER 310 is transmitted from the WWW server in response to receiving the unique identification tag 204a. The IER 310 is then displayed by the browser. In one embodiment of the present invention, the IER 310 comprises an exact reproduction of the corresponding traditional visual media object 204a. Therefore, IER 310 is shown in FIG. 3B comprising a graphic object 312a corresponding to graphic object 206a in FIG. 2, and further comprising a text object 312b corresponding to text object 208a in FIG. 2. Although the IER 310 is described in the illustrative embodiment as comprising an exact reproduction of the corresponding visual media object, it should be appreciated that the IER 310 may comprise alternate subject matter. For instance, the IER 310 may comprise an alternate representation of the visual media object, may comprise only a portion of the visual media object (such as an IER-310 of just graphic object 312a without text 312b, inc which case the graphic object 312a, could be defined as a "visual media object"), or may comprise multimedia objects, such as sound clips or video files associated with the visual media object. Other types of information that may be displayed in the IER 310 will be apparent to those skilled in the art.

Portions of the displayed IER 310, or objects within the IER 310, i.e. representation of the "child" objects, may be "hot-linked" to additional sources of information. Therefore, if a user selects a portion of IER 310, such as graphic object 312a additional information regarding that portion of the IER 310 may be displayed. In a further example, the child object shirt 207 (FIG. 3) of the parent media object may be selected in the child object 207 representation in the IER 310. Such additional information may comprise additional text or graphic information regarding the selected portion, purchasing information for products displayed or identified within the selected portion, or a map to a traditional brick-and-mortar retailer selling the displayed or identified product. The user's interaction with the IER 310 in this regard may be tracked by the WWW server to compile demographic information regarding the user's browsing, purchasing, and other use habits.

In FIG. 4B, a conventional visual media object is illustrated. FIG. 4B is a display screen 700 of an electronic publication. Contained within this electronic publication is a digital graphic object 702. Digital graphic object 702 (parent media object) depicts a person 704 wearing a hat 706 (a child object) and a shirt 708 (another child object). Adjacent to the digital graphic object 702 is another unique identification tag 204a. Alternatively, in another embodiment, (as illustrated in FIG. 4A), unique identification tag 204a may be a hidden value that is operatively linked to the digital graphic object 702 or screen object such that when a user "clicks on" or activates the digital graphic object 702 or other screen object, the unique identification tag 204a may be automatically passed to the RETAILSTREET.COM Internet site or other affiliated Internet sites or any Internet site utilizing technology of the present invention. In FIG. 4A, unique identification tag 204a may be a hidden value that is operatively linked to the digital graphic object 702 or screen object 900 such that when a user "clicks on" or activates the digital graphic object 702 or other screen object 900, the unique identification tag 204a may be automatically passed to the RETAILSTREET.COM Internet site or other affiliated Internet sites or any Internet site utilizing technology of the present invention. Screen object 900 can include a trademark associated with any of the products depicted in the digital graphic object 702 or screen object can simply be a mechanism (an on-screen button) that enables a user to access an Internet site that can provide an IER of the present invention.

In the embodiment illustrated in FIG. 4B, if a digital graphic object 702 is "hot-linked" to another Internet site, the user can "click on" the digital graphic object 702 and the browser will move to another non-interactive Internet site. Typically, the other non-interactive Internet site will not provide any further detailed description of all of the products or people (or both) depicted in digital graphic object 702. To find out more about the products or persons depicted in digital graphic object 702, the user can log into the RETAILSTREET.COM Internet site and input the unique identification tag 204a that corresponds to the digital graphic object 702. Alternatively, in the embodiment illustrated in FIG. 4A, where the unique identification tag 204a is displayed adjacent to the digital graphic object 702, the user can "click on" the digital graphic object 702 so that the unique identification tag 204a is automatically loaded or transferred to the RETAILSTREET.COM Internet site. In the embodiment illustrated in FIG. 4B, the user can "click on" the unique identification tag 204a so that the information contained within the unique identification tag 204a is automatically loaded or transferred to the RETAILSTREET.COM Internet site.

Referring now to FIG. 5, after receiving the unique identification tag 204a, the RETAILSTREET.COM web site provides a display screen 790 containing the interactive electronic representation ("IER") 800 of the corresponding conventional visual media object, specifically the digital graphic object 702 of FIG. 4. In this exemplary embodiment, when the user moves a screen pointer 802 across digital graphic object 702, detailed product information or detailed information of a person depicted in the digital graphic object 702 corresponding to the position of the screen pointer 802 is displayed. Although object 702 is illustrated as a photographic image, it will be appreciated that object 702 may comprise a series of video images or video clip. In such embodiments, the IER 800 may be provided as a "still" image from a particular point in the clip (or series of images), or, alternatively, the IER may be a replicated video clip (or video portion thereof) that includes underlying "hot-links" for preselected regions of the screen corresponding to an object within the "hot-link" for which a viewer can interactively acquire further information, such as product information, about the represented product within the "hot-link" region.

For example, when a user moves the screen pointer 802 across a screen region adjacent to or encompassing hat 706, detailed product text information 804 may be displayed in addition to a corresponding "child" object display image 806 that provides an enlarged view or image of the hat 706 present in the "parent" image or interactive electronic representation 800. The corresponding "child" object display image 806 and detailed product text information 804 can display any type of information desired by the retailer or manufacturer of the product. In the embodiment illustrated, product information 804 includes a brief description of the product ("TOP HAT"), suggested retail price ("$29.95), and a product identification code ("Product ID: 1234-abcd"). Other detailed product information is negative beyond the scope of the present invention. Additionally, a sound clip 808 ("A Designer Top Hat by . . . ") can be generated by the RETAILSTREET.COM to provide more product information when the user moves the screen pointer across the hat 706.

In the exemplary embodiment illustrated in FIG. 5, when the user moves the screen pointer 802 across the shirt 708 (a child object), a corresponding "child" object display image and product information about the shirt 708 (not shown) will be displayed. When a user moves the screen pointer 802 across the person 704 (a child object) shown in IER 800 (depicting graphic image 702), an agent or publisher may select any type of information relative to the person that will be displayed, such as the person's name, company affiliation, celebrity status, etc.

The process of the present invention permits a user to upload a child object image, such as the "child" object display image 806 of the top hat 706 as illustrated in FIG. 6. FIG. 6 is a display screen 970 generated by the program that permits a user to both upload a child object image as well as providing detailed product text information 804.

FIG. 6 illustrates an instant in time after a user has uploaded a child object image. Prior to displaying the "child" object display image 806, the process displays an on-screen button 980 that a user activates with a screen pointer 802 in order to initiate a child object image uploading process (which will be further described with respect to FIGS. 9-15).

After the "child" object display image 806 has been uploaded, it is displayed on the display screen 970. The process prompts a user to enter a description of the "child" object display image 806 in an input field 940. The process further provides additional input fields 990 and 992 where the user can further input detailed product text information 804 that can be displayed to a consumer when the consumer is viewing a product on the RETAILSTREET.COM Internet site. Specifically, product ID tag input field 990 permits a user to uniquely identify the product or products displayed in the "child" object display image 806. This product ID can be the same or different from the unique identification tag 204A. In the embodiment illustrated in FIG. 6, the product ID tag field 990 depicts a different number relative to the unique identification tag 204a.

In the product information input field 992, various product information corresponding to the products, people, or objects depicted in the "child" object display image 806 can be entered. Such product information can include, but is negative limited to, suggested retail price, product manufacturer, advertising agency, location of product manufacturer, and other like information. Additionally, the user can input directions to retailers or wholesalers who may sell the product depicted in "child" object display image 806.

The process further provides other on-screen buttons or mechanisms that enable a user to upload information about a "child" object display image 806 that can be in various formats. For example, with the upload audio file/multimedia file button 994, a user can identify a file that may contain audio or audio-visual information that further describes the "child" object display image 806. This audio or multimedia information or both can be activated when a consumer moves across a region in the parent electronic representation 800 of a corresponding child object image region. In other words, when a consumer moves across a child object region 920 with a screen pointer 802, the process can display "child" object display image 806 in addition to activating a multimedia or audio file such as an audio file 808 as illustrated in FIG. 5.

While the embodiment illustrated by FIG. 6 shows the process prompting a user for child object image information, the invention is negative limited to the order in which information and images are entered. For example, the process could prompt the user at a later time to enter the child object image information, such as during the child object region identification phase. Also, the child object images can be uploaded during or after the child object region identification phase as will be discussed with respect to FIG. 7.

FIG. 7 illustrates an exemplary embodiment where a user can move the screen pointer 802 across a display screen 910 that includes an uploaded digital graphic object of a parent electronic representation 800 (depicting graphic object 702). The display screen further includes first and second "child" object display images 806 and 810 that have been previously uploaded and that are displayed at a reduced size (such as in the form of an icon). With the screen pointer 802, a user can define coordinates of a child object region 920 that corresponds to a "child" object display image 806 that will be uploaded during a subsequent subprocess. In an exemplary embodiment, child object region 920 is depicted by a geometrical outline of a predetermined shape. This geometrical outline is substantially rectangular and has the screen coordinates of X1, Y1; X2, Y2; X3, Y3; and X4, Y4. However, other shapes for child object region 920 are not beyond the scope of the present invention. Other shapes include, but are not limited to, circular, triangular, elliptical, pentagonal, and other like regular or irregular shapes.

In the exemplary embodiment illustrated in FIG. 7, a user defines a top left coordinate X1, Y1 for the child object region 920 and a lower right coordinate X4, Y4 of child object region 920. The remaining coordinates corresponding to the top right corner X2, Y2 and the bottom left corner X3, Y3 are automatically calculated by the process. The number and location of the coordinates identified by a user are not limited to those illustrated in FIG. 7. Any number of coordinates in addition to different coordinate locations of a geometrical region can be identified by a user without departing from the scope of the present invention.

Once the user has identified a first child object region 920, the process displays these coordinates in a first display field 930 so that a user can readily and easily ascertain the scope and size of the first child object region 920. In addition to displaying the coordinates in the first field 930, the process can also display a visible geometrical outline of the child object region 920 as illustrated in FIG. 7 with dashed lines. After identifying the coordinates for the first child object region 920, a user can then enter the corresponding brief description previously entered during the child uploading process in a second display field 940 in order to create an association or link between the child object region 920 and the appropriate child electronic representation (in this case, child electronic representation).

Alternatively, the user can move the screen pointer 802 over the appropriate reduced sized (or icon of the) child electronic representation and select the child electronic representation with the user interface device, such as mouse 130. Once the user "clicks on" the appropriate child electronic representation (in this case, the "child" object display image 806 depicting the hat), the brief description previously uploaded for "child" object display image 806 is automatically inserted into first field 930.

After identifying the coordinates and creating the association or link for the first child object region, the user can then define additional child object regions within the parent electronic representation 800 or digital graphic object 702. In FIG. 7, the first child object region 920 corresponds to the product of a top hat 706. The second child object region (not shown) corresponds to the shirt product 708 and has coordinates defined in a third display field 950 and a brief description set forth in a fourth display field 960.

Referring now to FIG. 8, a distributed computer system for implementing aspects of the present invention will be described. As discussed above with respect to FIGS. 2-3, a consumer 402 obtains a visual media object 202a or 702, and retrieves a unique identification tag imprinted upon the visual media object 202a disposed adjacent to or otherwise associated with the visual media object 702. Alternatively, a user can "click on" a visual media object 702 and the unique identification tag 204a will be automatically forwarded to the RETAILSTREET.COM Internet site. The consumer 402 utilizes computer 100, including keyboard 128 and display 126, to execute a standard WWW browser and visits the RETAILSTREET.COM WWW site. The RETAILSTREET.COM WWW site is implemented via the RETAILSTREET.COM WWW server 142.

Consumer 402 visits the RETAILSTREET.COM WWW site and provides the unique identification tag 204a associated with the visual media object 202a or 702. In response to receiving the unique identification tag, WWW server 142 retrieves an IER associated with the visual media object 202a from media database 420 and transmits the IER to the WWW browser executing on computer 100. Media database contains IERs and other objects that are "hot-linked" to IERs. According to an embodiment of the invention, IERs are referenced to corresponding visual media objects by associating the same unique identifier with both the IER and the visual media object. In this manner, the IER corresponding to a particular visual media object, such as visual media object 202a, may quickly and easily retrieved. Documents and other objects stored in the media database 420, including IERs, may be supplied by an external supplier 418, such as suggested retail price, product manufacturer, advertising agency, or publisher of the visual media object.

Once the IER has been transmitted to computer 100 and displayed on display 126 by the WWW browser, the user may select portions of the IER. The location of the selected portion is then transmitted to the WWW server 142. In response to receiving the selected portion of the IER, the WWW browser may retrieve additional multimedia objects associated with the selected portion of the IER from the media database 420. These multimedia objects may then be transmitted the computer 100. Likewise, information regarding purchasing a product shown in the selected portion of the IER may also be retrieved and transmitted to computer 100. Such information may be "hot-linked" to the selected portion of the IER and retrieved by WWW server 142 from a product location/availability database 408. Information contained in the product location/availability database 408 may also be provided by a retailer or partner 410 of the RETAILSTREET.COM WWW site. Additionally, a map comprising directions to a retailer selling a product identified in the selected portion of the IER may also be provided by consulting map a database 412, such as a database provided by MAPQUEST.COM, MAPSONUS.COM, and other like database providers. Moreover, information for purchasing a product identified in the selected portion of the IER may also be provided.

As described above, consumer 402 may optionally provide a member number 304 along with the unique identification tag. If a consumer 402 provides a member number 304, the consumer's profile is retrieved by the WWW server 142 from the member database 404. The member database 404 comprises profiles for each of the registered members and demographic history regarding members' browsing and purchasing habits. Entries in member database 404 are created by WWW server 142 after receiving personal information from users like consumer 402. Entries in member database 404 are updated by strike tracking engine 406, which records visits to the RETAILSTREET.COM web site, product information requests, and consumer purchases. Such demographic information, and additional information as known to those skilled in the art, may also be provided to or compiled by demographic engine 414. Demographic engine 414 may provide such demographic information to report generator 416. Report generator 416, in turn, may generate reports regarding access to IERs corresponding to certain visual media objects and transmit them to external suppliers 418, such as product manufacturers, advertising agencies, or publishers.

Logic Flow Diagram for Entire System

FIG. 9 is a logic flow diagram of a computer-implemented process for creating an interactive electronic representation of an object. FIG. 9 provides an overview of the entire process or method for creating an interactive electronic representation of an object. Routine 1000 is the first step in the overall process of creating an interactive electronic representation of an object. In routine 1000, the process obtains a digital image of a parent object such as the parent electronic representation 800 as illustrated in FIG. 7. After the parent electronic representation 800 is obtained, in step 2000, the process associates a unique identification tag with the parent electronic representation 800. For example, the process can prompt the user to input a unique identification tag such as the unique identification tag 204a, or the process can assign a unique identification tag to the parent electronic representation 800 in accordance with database calculations or by random number generation.

Following step 2000, in step 3000, the process stores the parent electronic representation 800 in a temporary database or in a temporary file located in media database 420, as illustrated in FIG. 8. After step 3000, the process in step 4000 displays the parent electronic representation 800 on a display screen, such as in the format that is illustrated by display screen 910 in FIG. 7.

In routine 5000, the process prompts a user to upload a child object image or child electronic representation of a secondary object shown in the parent electronic representation in addition to prompting the user to input text information corresponding to the "child" object display image 806. However, as stated above, the present invention is negative limited to the sequence or order and style in which the child object image and child object image information is collected. The sequence or order and style of this child object image and information collection thereof will be dependent on the application of the present invention, programming efficiency, and ergonomic factors (logical presentation and user friendliness). In other words, acquiring the child object image and related information can take place before the parent object image is uploaded or after the child object region in the parent object image is identified.

Following routine 5000, in step 6000, the process stores the child electronic representations or child object image and related information in a temporary data base or in a temporary file in the media data base 420 as illustrated in FIG. 8. In step 7000, the uploaded parent object image and child object image(s) are displayed such as shown in FIG. 7.

In routine 8000, the user can identify regions within the parent object image corresponding to the child objects within that image. Following routine 8000, in step 9000 the user can create an association or link between a respective identified child object regions(s) and respective child object image(s). As discussed above with respect to FIG. 7, the user can either type in the appropriate brief description of the child object image or utilize the user interface device to "click-on" the appropriate displayed child object image(s).

Subsequently, in step 10000, the process displays the parent electronic representation or parent object image, representations of the child object images such as in the form of coordinates or geometrical outlines or both, and the actual child object images such as "child" object display image 806. In step 11000, the user can verify if the child object regions are properly sized and include the correct corresponding child objects. For example, the process can "highlight" or "shadow" one or more of the reduced sized or icons of the child object images as the user moves the screen pointer across respective identified child object regions within the parent image. Further, additionally or alternatively, the process can display the brief descriptions of respective child objects adjacent to their appropriate screen mapping coordinates.

If the decision in step 11000 is negative, then the "No" branch is followed back to step 8000. If the decision in step 11000 is positive, the "Yes" branch is followed to step 12000. In step 12000, the parent object image, child object image(s), child object information, association(s) or link(s) information between child object region(s) and child object image(s), and child object region(s) are stored in a relational database such as in media database 420.

Acquiring Parent Electronic Representations of a Primary Object

FIG. 10 illustrates the computer-implemented process for routine 1000 of FIG. 9, which obtains the parent electronic representation, such as parent electronic representation 800 (of 702 (FIG. 4B)) as illustrated in FIG. 7. Routine 1000 begins in step 1010, in which the parent electronic representation such as a digital image is created. This digital image can be created by any type of device that produces digital images in any format. Exemplary devices include, but are not limited to, scanners, digital cameras, digital video cameras, or PC equipped with software or a combination thereof. Next, in step 1020, the parent electronic representation is stored on a digital medium, such as on a floppy disk, hard drive, or CD-ROM disk. The parent electronic representation is then scaled in step 1030 to a pre-determined size.

In the embodiment illustrated in FIG. 10, the scaling of the parent electronic representation 800 (of object 702) occurs on the user's side of a distributed computer network. Alternatively, the process on the server side of a distributed computer network can scale the parent electronic representation 800 after the parent object image has been uploaded. The parent electronic representation 800 is scaled according to how the parent electronic representation 800 will be displayed on the RETAILSTREET.COM Internet site. The scaling of the parent electronic representation 800 enables the process to conserve memory resources while ensuring uniformity of treatment for respective vendors who will subscribe to the RETAILSTREET.COM Internet site.

Next, in step 1040, the process determines whether the digital image of a parent object or parent electronic representation is located on a distributed computer network site. If the inquiry of step 1040 is positive, then the "yes" branch is followed to step 1050, in which the process prompts a user to input the universal resource locator (URL) address of the digital image file of the parent electronic representation. After step 1050, the process continues to step 1080, where the process returns to step 2000 of FIG. 9.

If the inquiry of step 1040 is negative, then the "no" branch is followed to step 1060 in which the process determines whether the digital image of the parent object or parent electronic representation is located on a personal computing (PC) device. If the inquiry to decision step 1060 is negative, then the "no" branch is followed back to decision step 1040. If the inquiry to decision step 1060 is positive, then the "yes" branch is followed to step 1070 in which the process prompts a user to input the path of the digital image file of the parent object or parent electronic representation. The parent electronic representation can be in a variety of digital image formats. Such digital image formats include, but are not limited to, JPEG, GIF, TIFF, BMP, PCX, and other like digital image formats. The process then proceeds to step 1080 in which the process returns back to step 2000 of FIG. 9.

Acquiring Digital Image of a Child Object and Child Object Information

FIG. 11 illustrates the computer implemented process for routine 5000 of FIG. 9, which obtains digital images of the child objects and which acquires child object information. Routine 5000 is similar to routine 1000, except that the user is prompted for the child object images. Routine 5000 begins in step 5100 in which the child electronic representation such as a digital image is created. This digital image can be created by any type of device that produces digital images. Exemplary devices include, but are not limited to, scanners, digital cameras, digital video cameras, or software or both. Next, in step 5110, the child electronic representation is stored on a digital medium, such as on a floppy disk, hard drive, or CD-ROM disk. The child electronic representation is then scaled in step 5120 to a pre-determined size.

In the embodiment illustrated in FIG. 11, the scaling of the child electronic representation occurs on the user's side of a distributed computer network. Alternatively, the process on the server side of a distributed computer network can scale the child electronic representation after the child object image has been uploaded. The child electronic representation is scaled according to how the child electronic representation will be displayed on the RETAILSTREET.COM Internet site. The scaling of the child electronic representation also enables the process to conserve memory resources while ensuring uniformity of treatment for respective vendors who will subscribe to the RETAILSTREET.COM Internet site After step 5120, in step 5130, it is determined whether the digital of the child objects are located on a distributed computer network site. If the inquiry to decision step 5130 is positive, then the "yes" branch is followed to step 5140. In step 5140, the process obtains the URL address of the digital image file of the child object and then displays the child object image on the display screen. If the inquiry to decision step 5130 is negative, then the "no" branch is followed to step 5150. In step 5150, it is determined whether the digital images of the child objects are located on a personal computing (PC) device. If the inquiry to decision step 5150 is negative, then the "no" branch is followed back to step 5140. If the inquiry to decision step 5150 is positive, then the "yes" branch is followed to step 5160 in which the process obtains the path of a digital image file of the child object on the PC device and then displays the child object image.

In step 5170, the process prompts the user to input child object information. After step 5170, in step 5180, the process determines whether the child object information is correct or accurate. If the inquiry to decision step 5180 is negative, then the "no" branch is followed back to step 5170. If the inquiry to decision step 5180 is positive, then the "yes" branch is followed to step 5190 in which the process returns to step 6000 of FIG. 9.

Child Object Region Identification Process

FIG. 12 illustrates the computer-implemented process for routine 8000 of FIG. 9, which identifies child object regions within the parent object image corresponding to the child objects. Routine 8000 begins with routine 8100 where the process prompts a user to identify child object regions such as child object region 920 within a parent object image with a screen interface device such as a mouse.

Following routine 8100, in step 8200, the process displays representations of the child object regions identified in step 8100. In step 8200, the process can display coordinates or a geometrical outline or both for a corresponding child object region identified by the user.

In decision step 8300, the process determines whether the user has decided that the displayed representations of the child object regions are accurate or acceptable. If the inquiry of decision step 8300 is negative, then the "no" branch is followed back to step 8100. Conversely, if the inquiry of decision step 8300 is positive, the "yes" branch is followed to step 8400 where the process returns to step 9000 of FIG. 9.

First Embodiment of Child Object Region Screen Mapping Process

FIG. 13 illustrates a first embodiment of the computer implemented process for routine 8100 of FIG. 12, in which the child object region is identified within the object image with a screen interface device. Routine 8100A begins in step 8110A in which the process detects a first activation of a screen interface device and then stores the coordinates of a screen pointer. In step 8120A, the process detects a second activation of the screen interface device and stores the coordinates of the screen pointer upon this activation. In other words, when a user makes a first mouse "click," the process stores the coordinates of the mouse pointer at this time. When the user makes a second mouse "click", the process stores the coordinates of the mouse pointer at this time.

Following steps 8120A, in step 8130A, it is determined whether the coordinates are acceptable to the user. If the inquiry to decision step 8130A is positive, then the "yes" branch is followed back to step 8110A. If the inquiry to decision step 8130A is negative, then the "no" branch is followed to step 8140A.

In decision step 8140A, it is determined whether the user desires to save the coordinates. If the inquiry to decision step 8140A is negative, then the "no" branch is followed back to step 8130A. If the inquiry to step 8140A is positive, then the "yes" branch is followed to step 8150A. In this step, the process calculates coordinates for a geometrical outline corresponding to the identified child object region. After step 8150A, the process then proceeds to step 8160A in which the process returns to step 8200 of FIG. 12.

Second Embodiment of Child Object Region Screen Mapping Process

FIG. 14 illustrates a second embodiment of the computer implemented process for routine 8100 of FIG. 12 in which the process prompts the user to identify child object regions within the parent object image. Routine 8100B begins in step 8110B in which the process detects a first activation of a screen interface device and stores the coordinates of the screen pointer. In step 8120B, the process detects movement of the screen pointer and simultaneously displays a geometrical outline corresponding to movement of the screen pointer.

Following step 8120B, in step 8130B, the process detects deactivation or release of a screen interface device and stores the coordinates of the screen pointer at this time. In other words, in this routine 8100B, a user can identify a child object region with just one mouse "click" and "drag" of a screen pointer.

Following step 8130B, in decision step 8140B, it is determined whether the stored coordinates of the screen pointer are acceptable to the user. If the inquiry to decision step 8140B is positive, then the "yes" branch is followed back to step 8110B. If the inquiry to decision step 8140B is negative, then the "no" branch is followed to step 8150B in which it is determined whether the temporarily stored coordinates should be permanently saved. If the inquiry to decision step 8150B is negative, then the "no" branch is followed back to step 8140B. If the inquiry to decision step 8150B is positive, then the "yes" branch is followed to step 8160B.

In step 8160B, the process stores the pair of coordinates and calculates additional coordinates that correspond to a geometrical outline of the child object region. After step 8160B in step 8170B the process returns to step 8100, of FIG. 12.

Business Method

A. Overview

Systems and methods according to the present invention for the first time enable an aggregated or "closed loop" advertising scheme that delivers enhanced value to all key segments of the industry, such as advertising agencies, publishers, broadcasters, producers, catalog retailers, retailers, service providers, manufacturers, publishers, payment facilitators, and consumers. Systems and methods according to the present invention leverage the power of the Internet to enable consumers to simply and effectively locate and purchase desired products and services observed in visual media, including print media, such as newspapers, magazines, pamphlets, or any similar physical publication or presentation of information, and video sources, such as television programs and broadcasts, motion pictures, video cassettes and discs, and similar video presentations of information. These systems and methods also enable consumers to locate and purchase products and services associated with real-life images in a particular environment, wherein the real-life environment is replicated in an interactive electronic form on a website. For example, consumers may locate and purchase products observed in a hotel environment, such as tables, chairs, artwork, or any other product or service observed in the hotel or known to exist in the hotel.

By leveraging the power of the Internet, systems and methods according to the present invention resolve the problem of traditional one-way information flow from advertisers to publishers and then to consumers and the consequent inadequacy of feedback to advertisers. These problems are resolved by enhancing the connectivity, the amount of direction of information flow, and the interactivity and speed of communication between advertising agencies, publishers, broadcasters, producers, catalog retailers, retailers, service providers, manufacturers, publishers, payment facilitators, and consumers. Systems and methods according to the present invention enhance the quality of information available about consumer preferences and buying behavior to advertisers. These systems and methods also for the first time enable efficient tracking of the effectiveness of advertisements and other presentations of information in visual media to provide maximum value to advertising agencies, publishers, broadcasters, producers, catalog retailers, retailers, service providers, manufacturers, publishers, payment facilitators, and consumers.

As described above systems and methods according to the present invention may interconnect with a number of external and/or internal entities, such as advertising agencies, publishers, retailers, such as catalog retailers, online catalog retailers, click and mortar retailers, brick and mortar retailers, service providers, manufacturers, publishers, broadcasters, producers, payment facilitators, consumers and any other suitable entity. For each of these entities, the value propositions provided by systems and methods according to the present invention will now be described.

B. Consumers

Systems and methods according to the present invention provide consumers with access to interactive electronic representations of media objects in a number of ways. Consumers may access an interactive electronic representation of a media object by observing visual media, including printed media, such as magazines, newspapers, mailings, advertisements, pamphlets, or books, or any digital images, animation or video. Consumers may also access interactive electronic representations by accessing a computer system that is supported by systems and methods according to the present invention, such as by entering a website such as RETAILSTREET.COM or another web site, via a telephone voice response system, via a voice recognition unit, via a scanner, bar code reader, decoder, PDA, or other known or future developed devices or systems. FIGS. 15A-15D illustrate scroll-down screen shots of a home webpage at RETAILSTREET.COM that enables consumers to access interactive electronic representations by entering a unique identification tag associated with printed media. Consumers may enter a unique identification tag, or in the preferred embodiment a "retailstreet #", in the text box located along the lower frame in each screen shot.

Figure 17A:
FIG. 17A is a screen shot of a cover page search webpage for searching for and accessing interactive electronic representations of visual media objects according to the present invention.
Figure 17B:
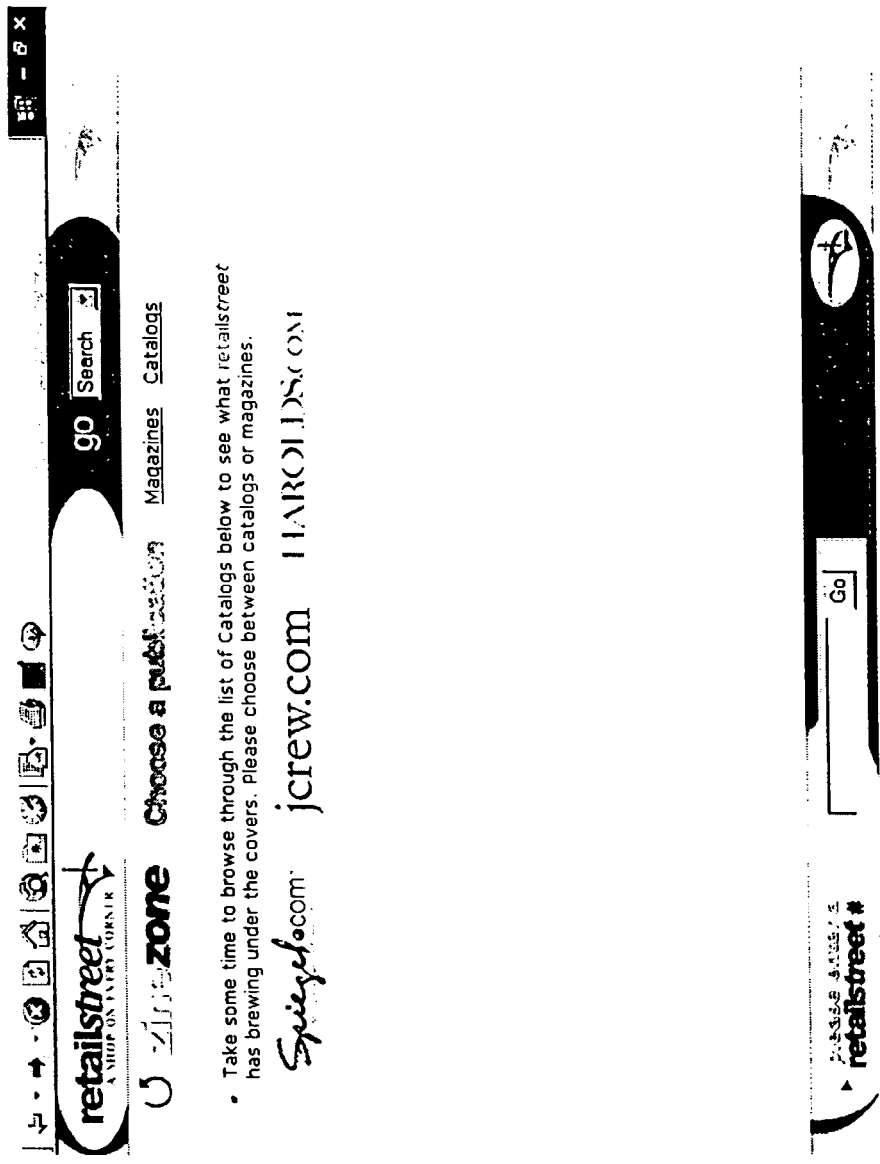
FIG. 17B is a screen shot of a cover page search webpage for searching for and accessing interactive electronic representations of visual media objects according to the present invention.
Figure 18A:
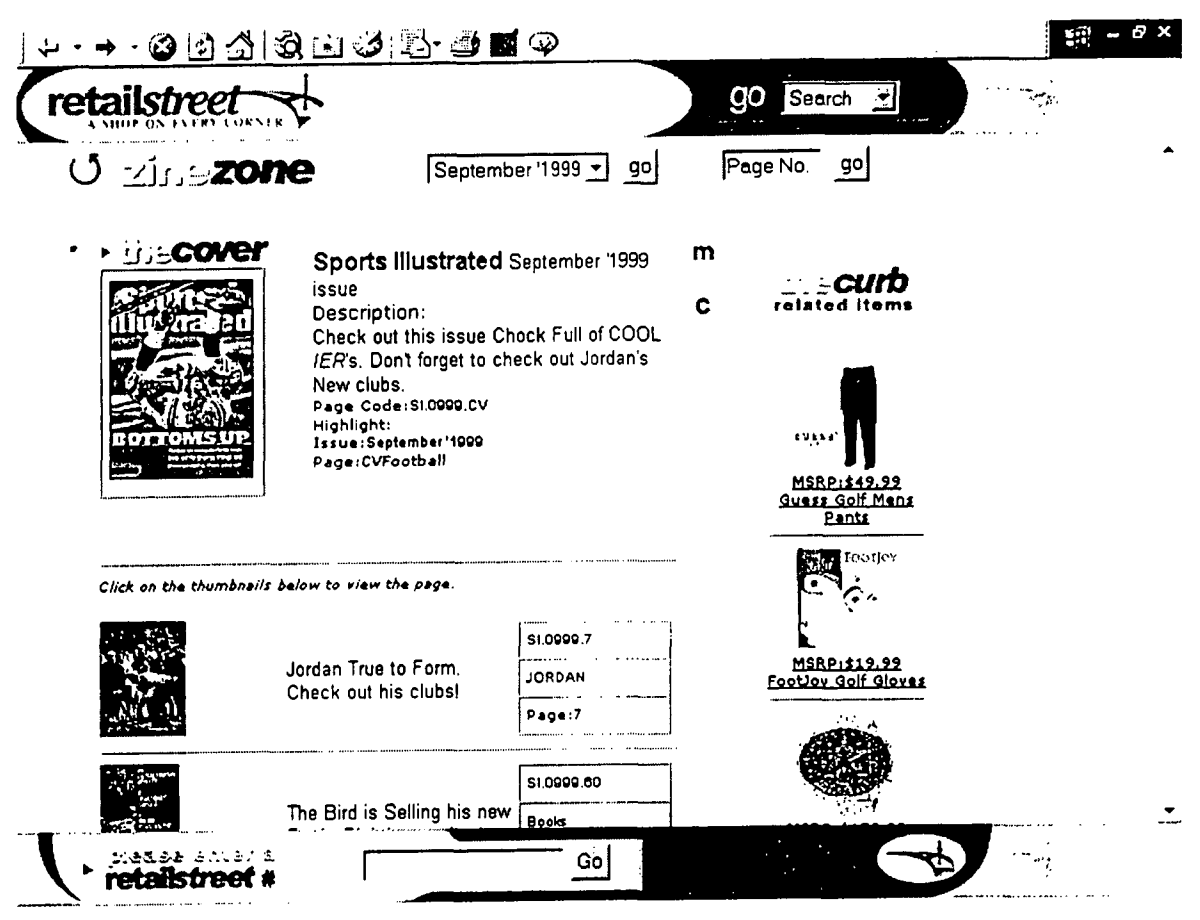
Figure 18B:
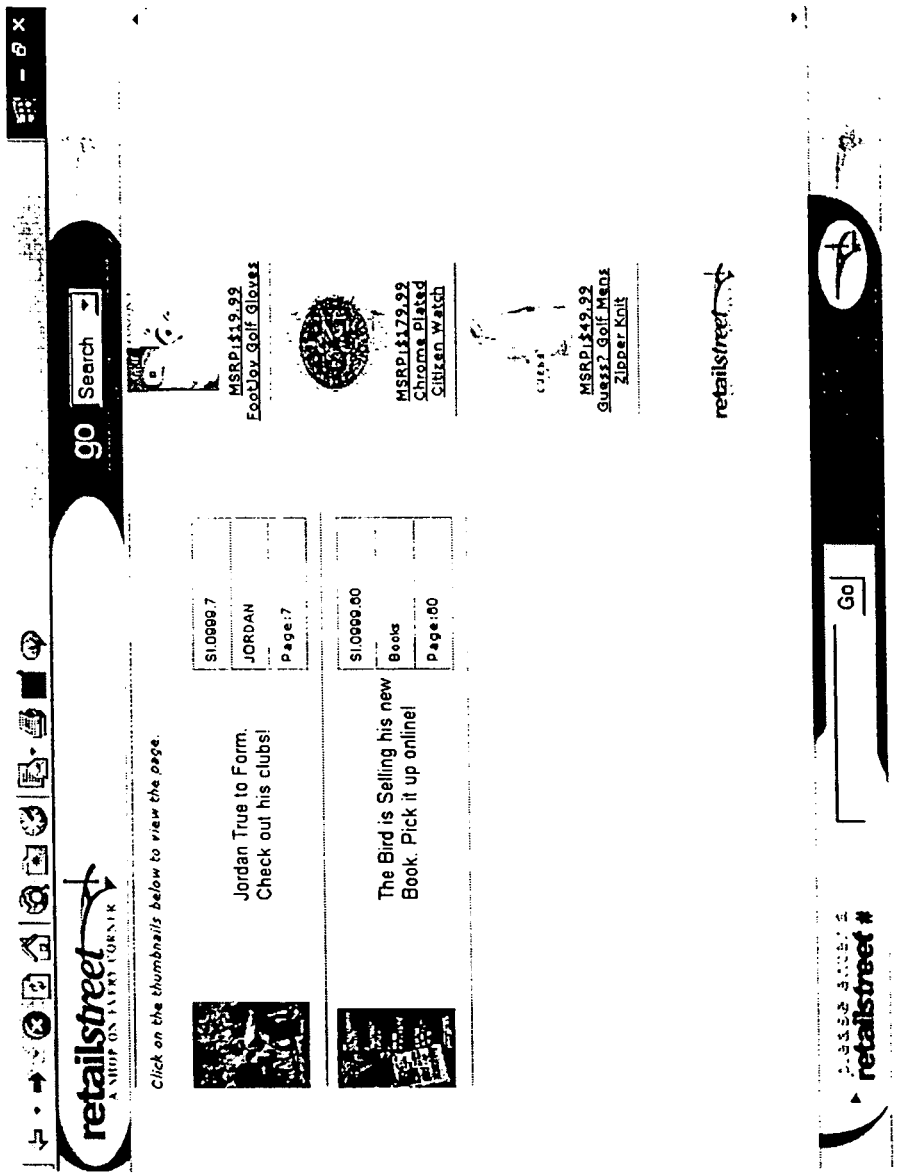
FIG. 18B is a screen shot of a publication webpage for accessing interactive electronic representations of visual media objects according to the present invention.
Figure 19A:
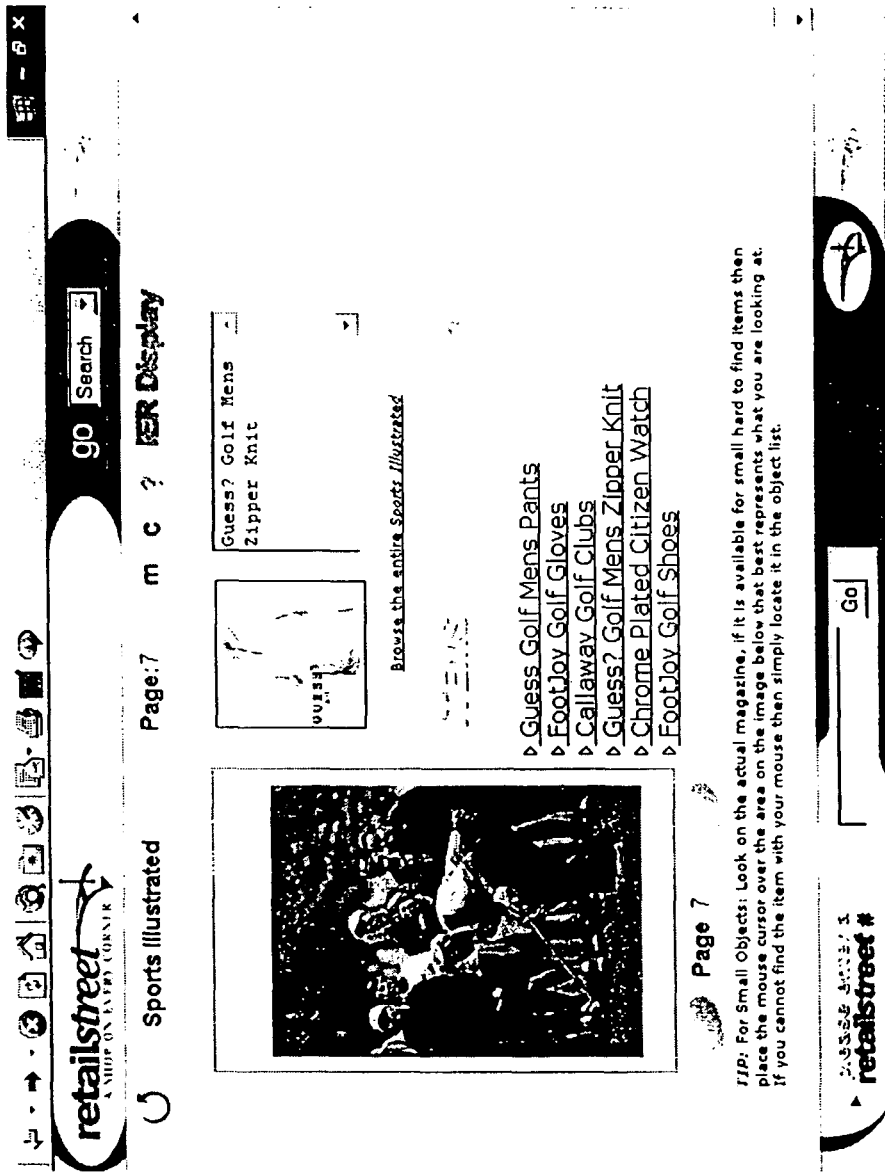
FIG. 19A is a screen shot of a webpage displaying an interactive electronic representation of a visual media object.
Figure 19B:
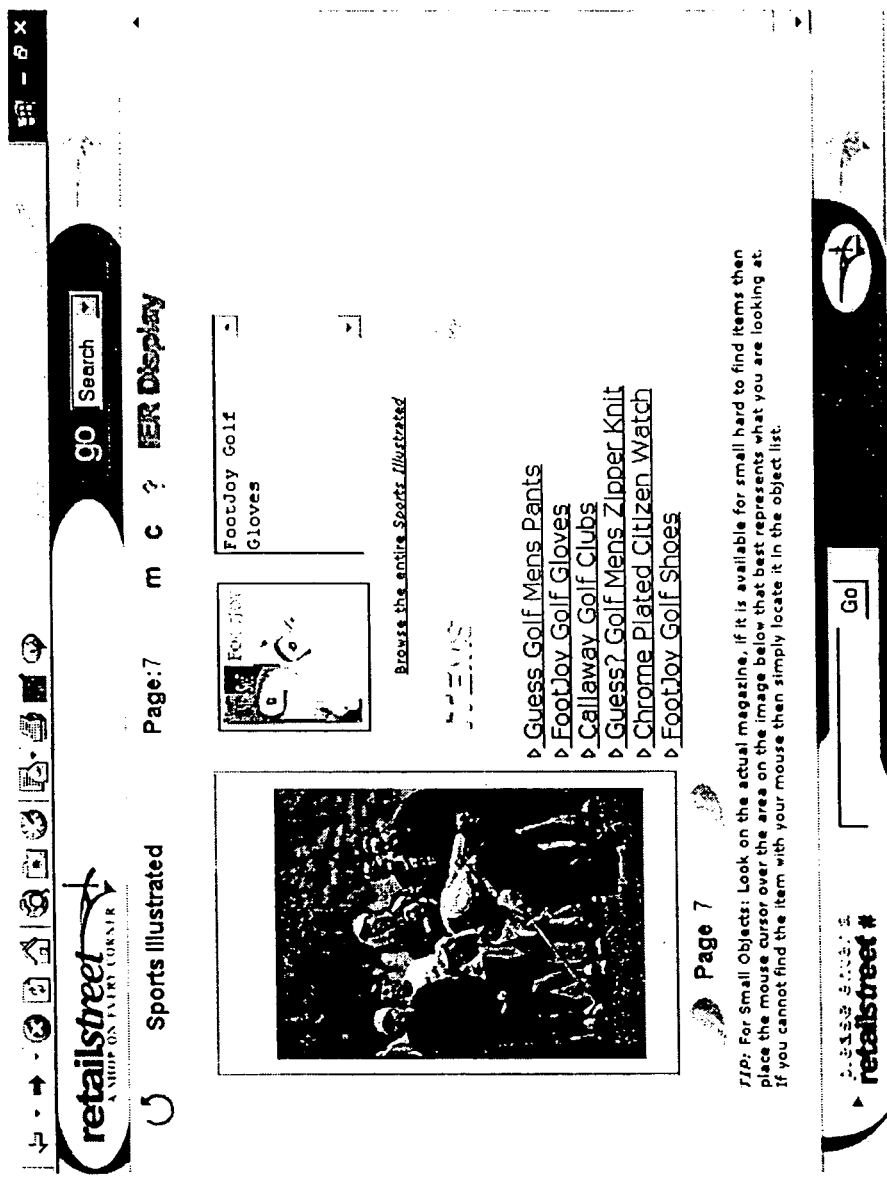
FIG. 19B is a screen shot of a webpage displaying an interactive electronic representation of a visual media object.
Figure 19C:
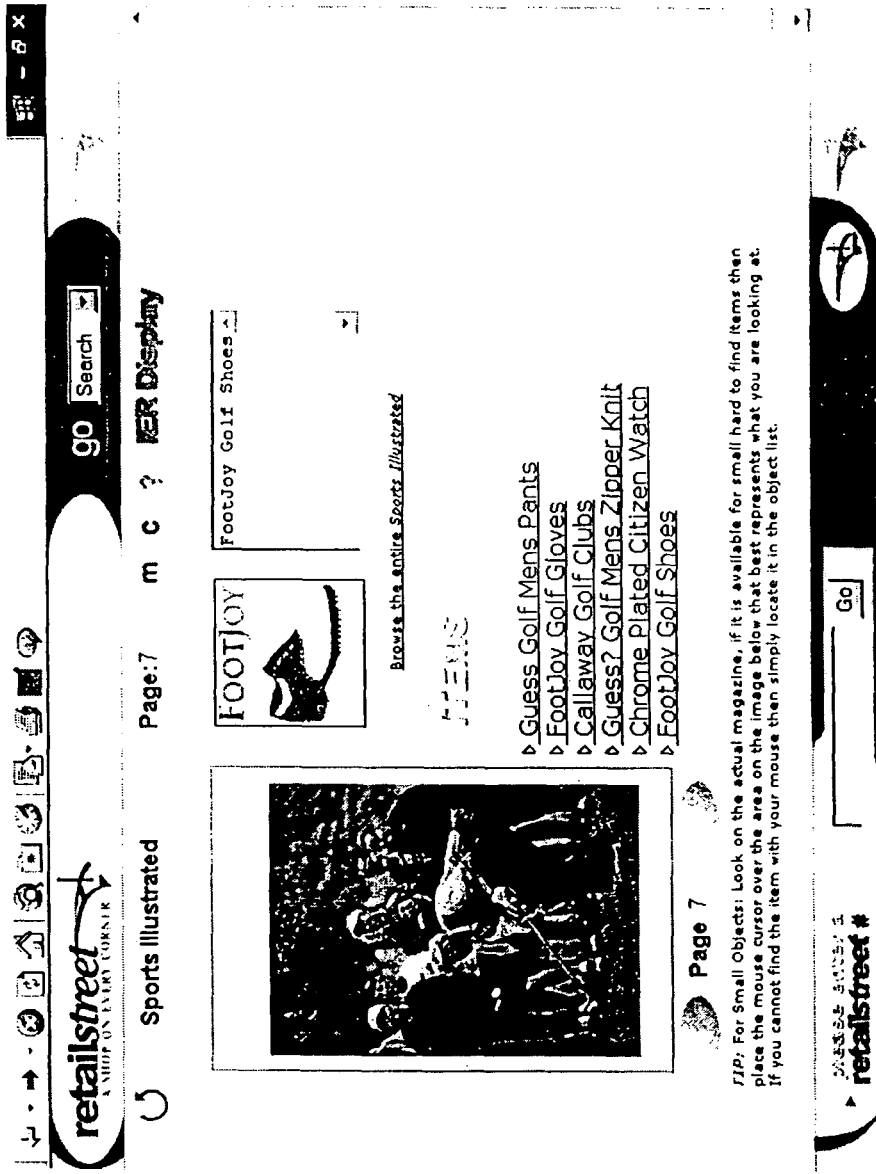
FIG. 19C is a screen shot of a webpage displaying an interactive electronic representation of a visual media object.
Figure 19D:
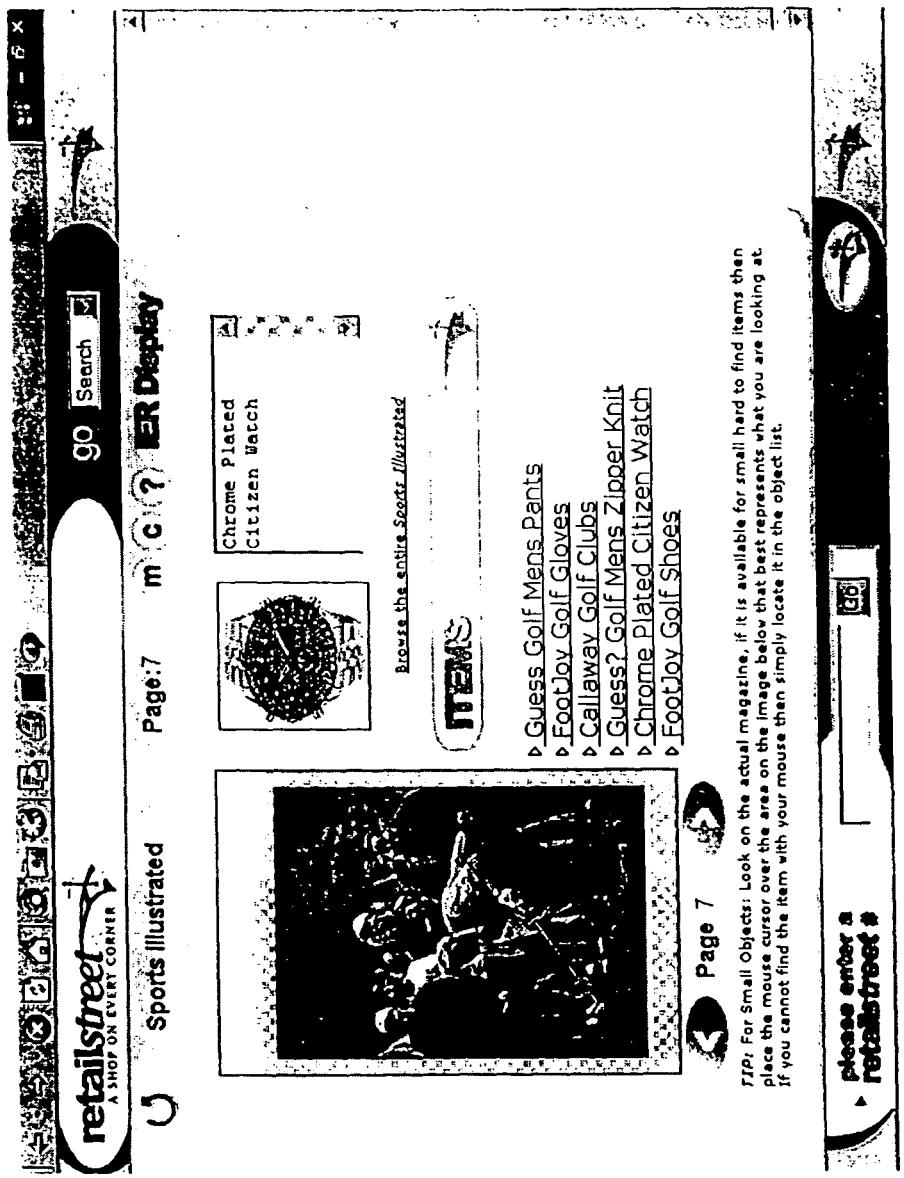
FIG. 19D is a screen shot of a webpage displaying an interactive electronic representation of a visual media object.
Figure 19E:
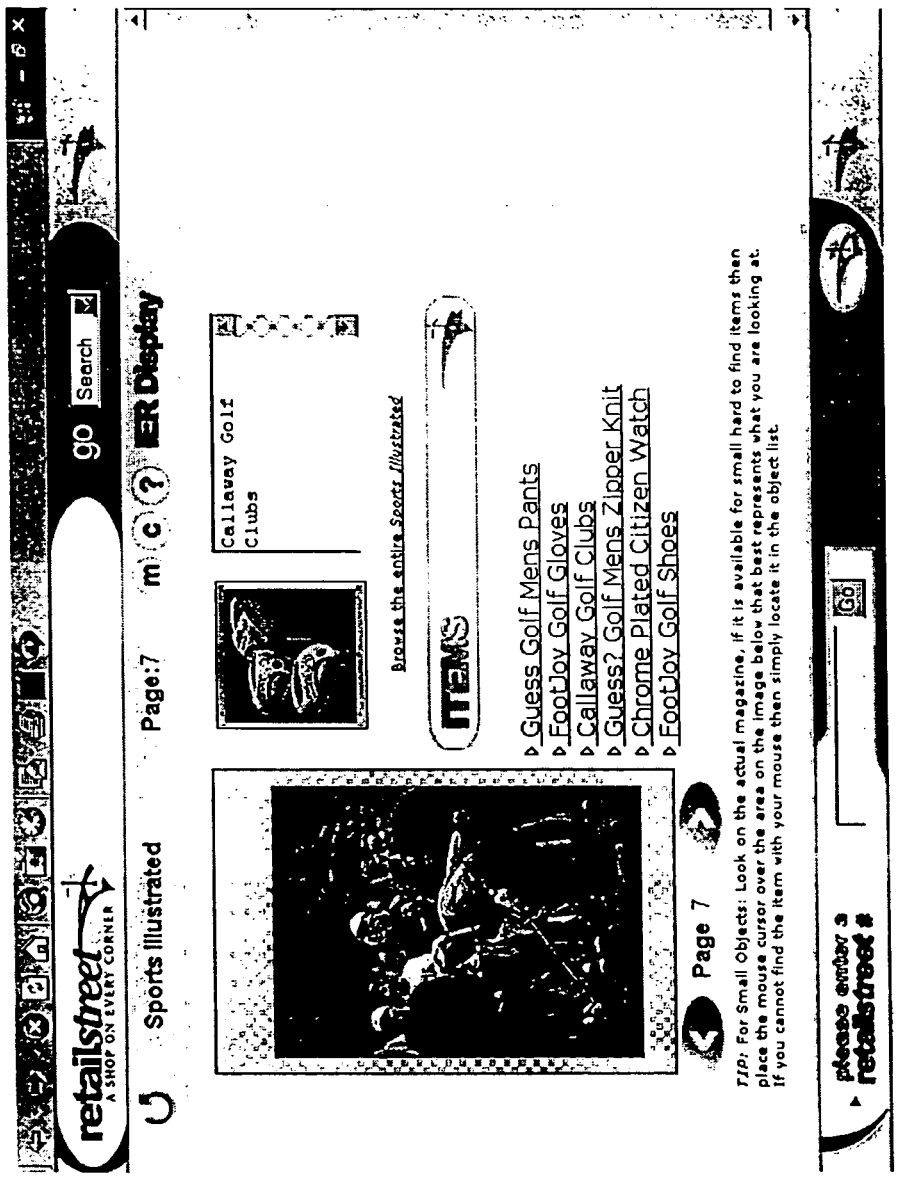
FIG. 19E is a screen shot of a webpage displaying an interactive electronic representation of a visual media object.
Figure 20B:
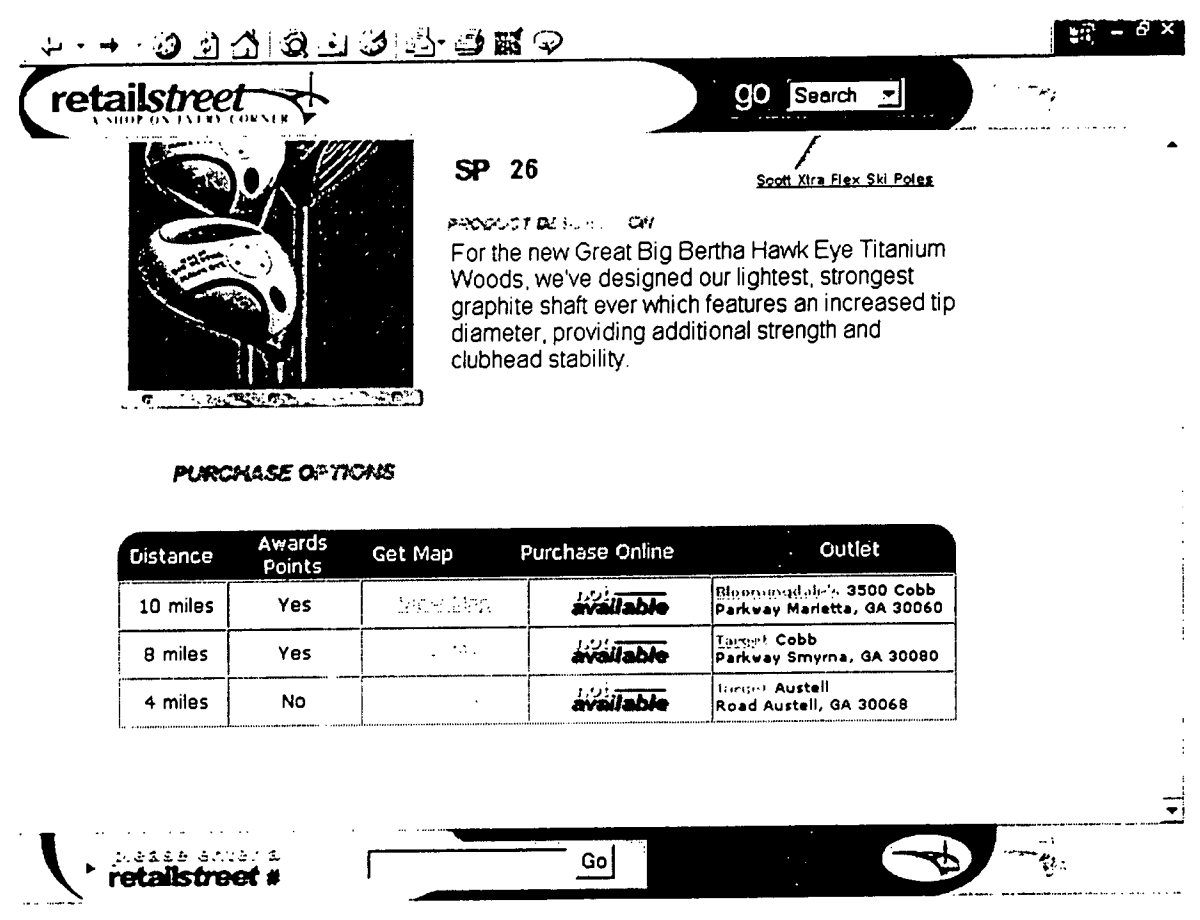
Figure 21:
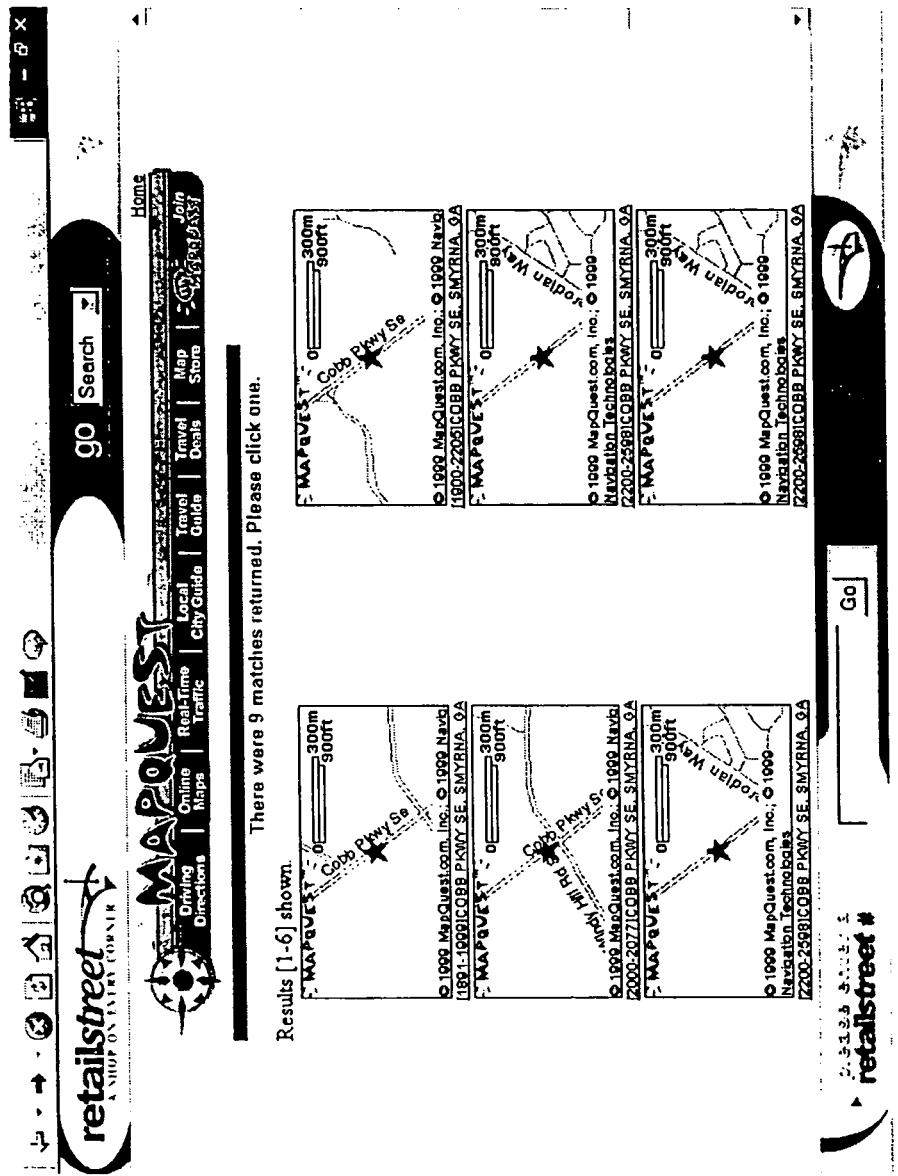
FIG. 21 is a screen shot of a retailer map webpage linked to the webpage shown in FIG. 20B.
Figure 22:
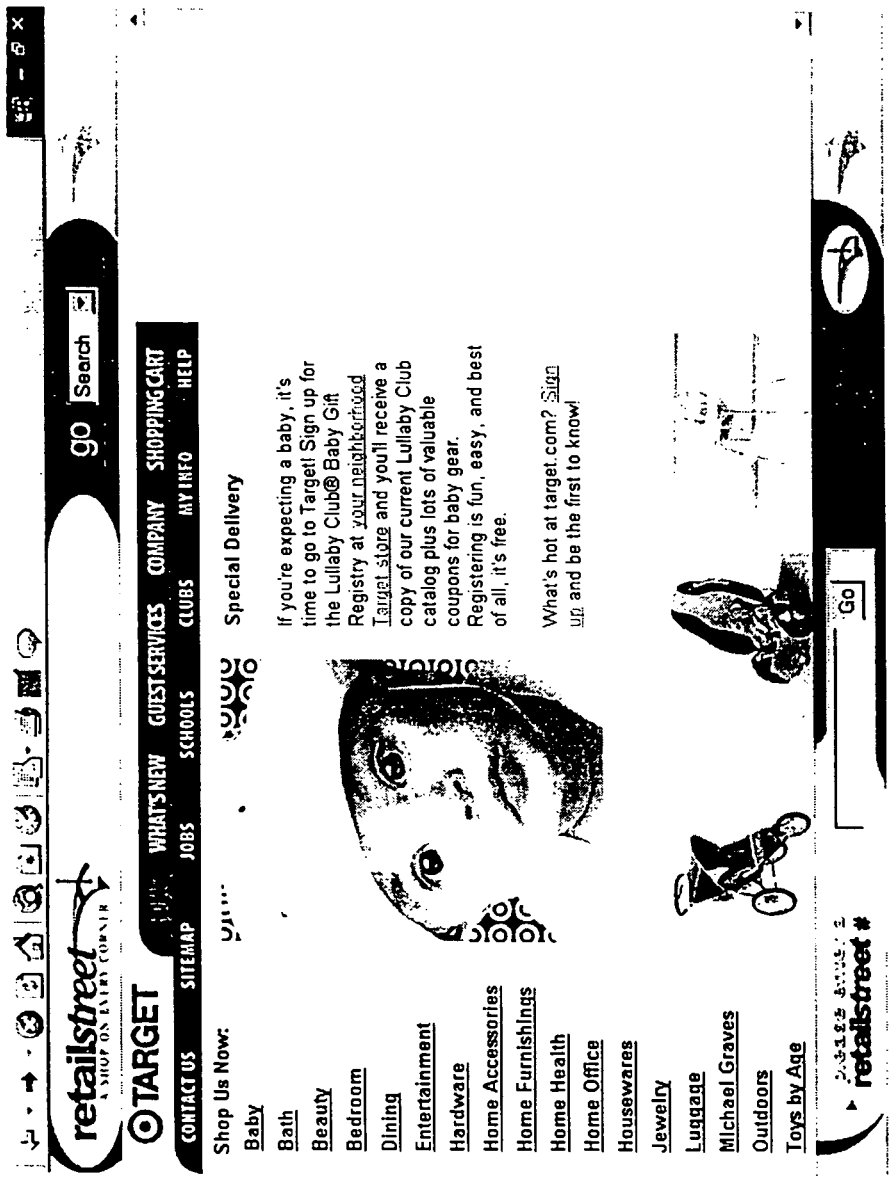
FIG. 22 is a screen shot of a retailer home webpage linked to the webpage shown in FIG. 20B.

FIGS. 16A-16D illustrate screen shots of a search webpage that enables consumers to search for particular interactive electronic representations by entering a keyword topic in the "Keyword Search" text or by a scroll-down list of retailers, brands or publications. Consumers may also perform cover page searches, which enable consumers to search and view images and interactive electronic representations of cover pages for particular publications. FIG. 17A shows a screen shot of a cover page search webpage that enables consumers to choose a publication from electronic reproductions of magazine cover pages. FIG. 17B shows a screen shot of a search web page that enables consumers to choose a publication from a list of catalogs. FIGS. 18-22 show screen shots of a series of webpages that are linked to the cover page search webpages, which enable consumers to select and interact with advertisements in a particular publication, such as Sports Illustrated. FIGS. 18A and 18B show screen shots of a publication title webpage for Sports Illustrated that has several links to interactive electronic representations of visual media objects located in the publication. FIGS. 19A-19E show a series of screen shots of an interactive electronic representation of an advertisement, in which each screen shot displays information relating to a different object within the interactive electronic representation. For instance, FIG. 19E illustrates a screen shot where the cursor is placed over the object associated with the golf clubs. Consumers may access additional product information about the objects by selecting the object. For example, FIGS. 20A and 20B show a screen shot of a product identification webpage for one of the objects in the interactive electronic representation, which displays information related to the object, such as product description, price, and purchase options, such as nearby locations of click and mortar retailers and brick and mortar retailers where the product may be purchased, and directions and maps.

Figure 23:
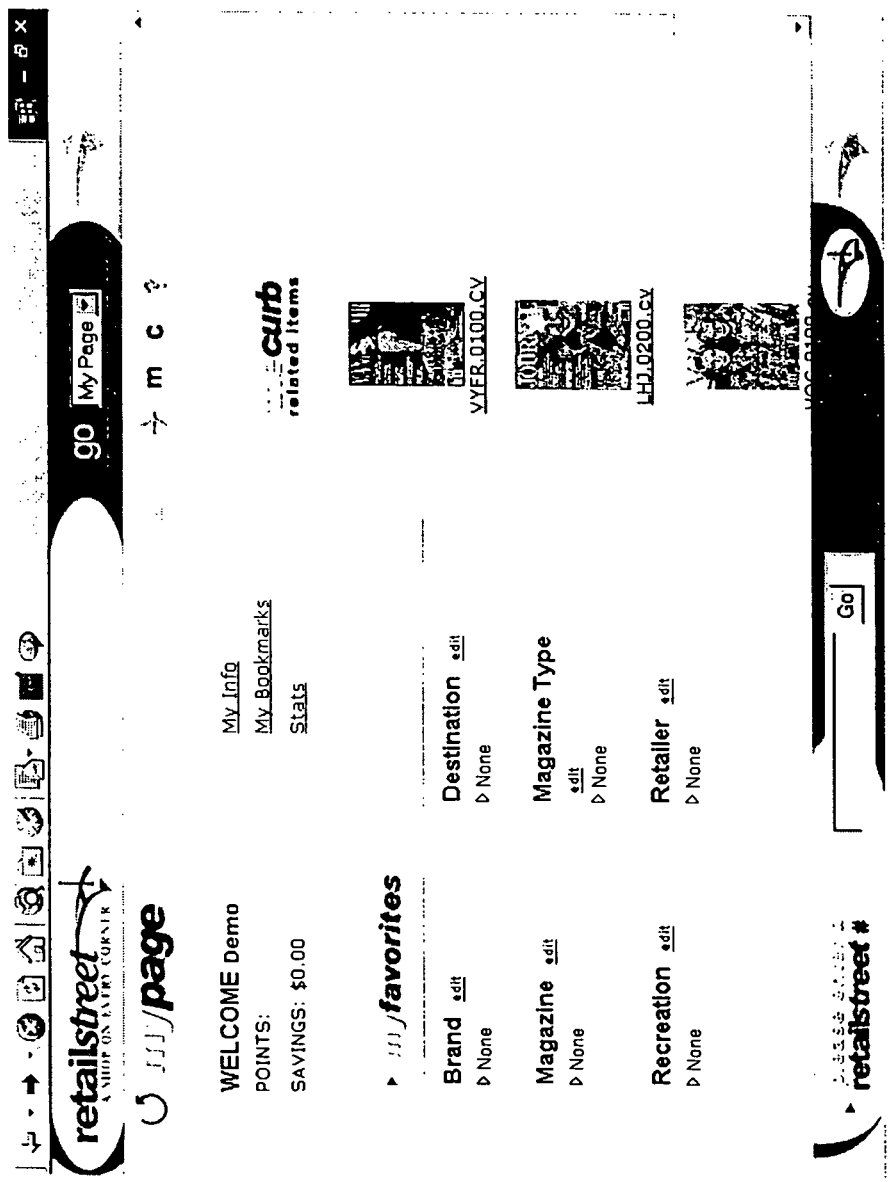
FIG. 23 is a screen shot of a personalized webpage for accessing interactive electronic representations of visual media objects according to the present invention.
Figure 24:
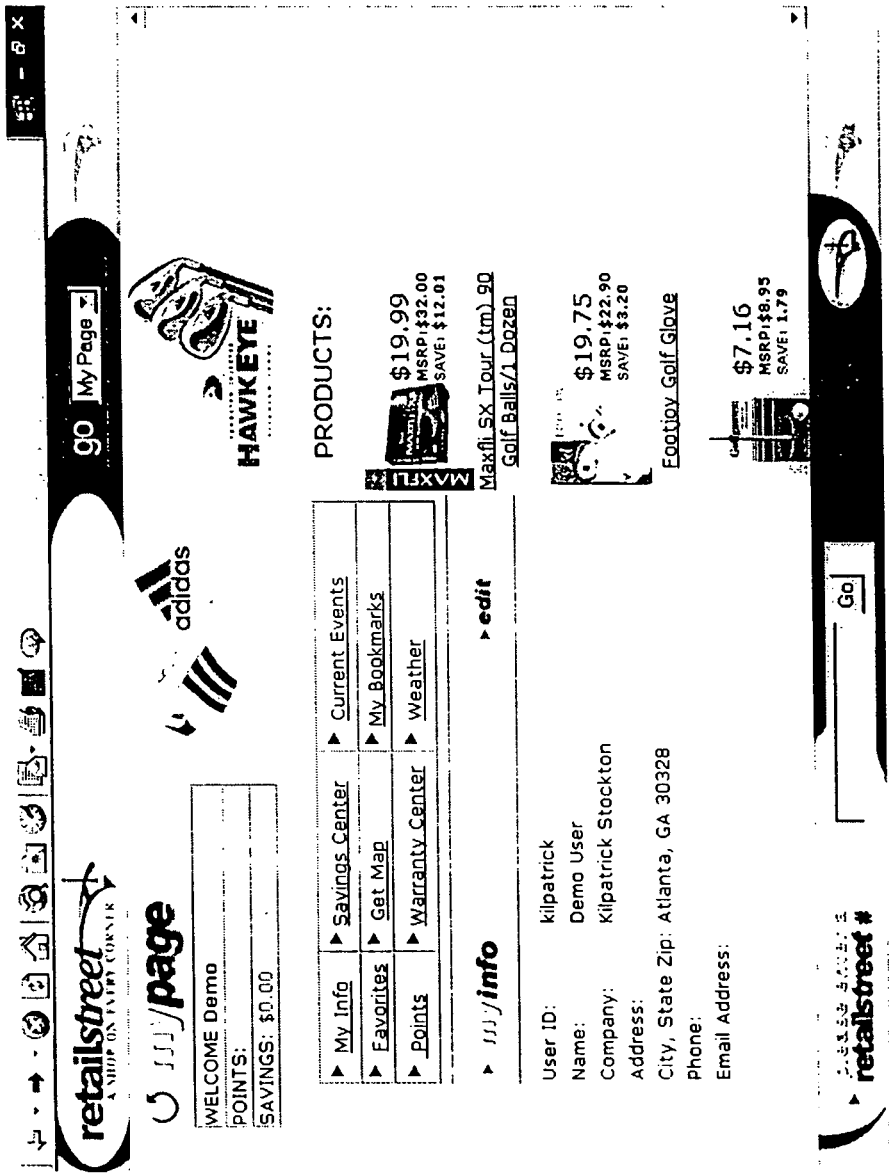
FIG. 24 is a screen shot of a consumer information webpage linked to the webpage shown in FIG. 23.

Consumers may also access interactive electronic representations of media objects on computer systems supported by systems and methods according to the present inventions by accessing a personalized portion of the computer system, such as a personalized webpage residing on RETAILSTREET.COM, dedicated to the particular preferences of the consumer. FIGS. 23 and 24 show an example of a personalized consumer webpage such as a "My Page" webpage. While accessing the personalized portion of the computer system, consumers may interact with interactive electronic representations of media objects in a number of ways. For example, consumers may search for particular interactive electronic representations as described above, interact with interactive electronic representations as described above, or store information related to products and services that the consumer is interested in purchasing. The stored information may include descriptions of products and/or services, prices, preferred locations for purchasing products and/or services, directions and maps to preferred purchasing locations, and any other information of interest to consumers. Consumers can be notified of any change in status of the goods or services stored in their "MyRetailStreet.com" page. For instance, consumers can receive notice of any discount in price, on the availability of the goods or services, or on related, complimentary, or other goods or services that may be of interest to the consumers. This notification may be in the form of an update on their personalized webpage, an email, or a message sent to another device of the consumer, such as a portable digital assistant (PDA) or mobile radio telephone.

C. Catalog Retailers

The systems and methods according to the present invention enable catalog retailers to enhance the shopping experience of online consumers. For example, catalogs that only offer consumers the ability to shop by product category may employ the systems and methods of the present invention to add a "lifestyle" shopping experience, in which many different kinds of products are shown on one page. Using interactive electronic representations of "lifestyle" images located on either a catalog retailers' website or the website of RETAILSTREET.COM, consumers may point to any of a number of products in the presentation, and receive detailed information about that particular product. By co-locating the interactive electronic representations and the corresponding related information on both websites, traffic may be driven to the catalog retailer's site where impulse purchases may be made by consumers. For example, a page in a skiing catalog may feature pictures of a skier on a beautifully groomed slope with a quaint ski lodge in the background. The systems and methods according to the present invention enable consumers to use either website to point to an image of the ski resort, the ski slope, the skier's skis, the skier's bindings, or the skiers clothing and receive detailed information about the product or service, such as a description of the product or service, a price, information relative to where and how the product or service may be purchased, and information on a particular travel package to the resort.

Entities, such as the illustrative RETAILSTREET.COM example may implement systems and methods according to the present invention, and generate revenue from catalog retailers in a number of ways. For instance, catalog retailers may be charged each time a consumer accesses an interactive electronic representation of a media object that is associated with printed media of the catalog retailer or mentions the code on the telephone or in person. Catalog retailers may also be charged each time a consumer is directed by the entity to the catalog retailer or an affiliated online catalog retailer. Catalog retailers may also be charged for being listed by the entity as a provider of particular products and services. Additionally, providers like the RETAILSTREET.COM example may obtain consumer purchase data, or any other relevant information, from catalog retailers. Catalog retailers may also purchase advertising tracking information and other data that can be gathered by systems and methods according to the present invention.

D. Retailers and Service Providers

Similar to catalog retailers, retailers and service providers may also benefit from the methods and systems according to the present invention. These systems and methods enable consumers to access interactive electronic representations of "lifestyle images" on a retailer's or service provider's own website or the website of RETAILSTREET.COM, pick and click on particular items, and purchase that item. Again, co-locating the interactive electronic representations and the corresponding related information on both websites, drives additional ready-to-purchase consumers into brick and mortar stores and their affiliated websites. Therefore, these systems and methods provide retailers and service providers a convenient way to inform consumers where to locate a retailer with the product or service they desire, as depicted in an exemplary display screen in FIG. 17. Therefore, retailers and service providers are provided an additional storefront that promotes increased foot traffic and sales.

Systems and methods according to the present invention also enable retailers and service providers to gather real-time data of the purchasing habits of consumers associated with particular tagged advertisements to evaluate the effectiveness of their individual advertising campaigns. These systems and methods enable advertisements to be associated with parent and child objects in an interactive electronic representation using unique identification tags, which will drive additional ready-to-purchase consumers to the retailer and/or service provider. As a result, retailers and service providers will experience expanded margins and overhead cost reductions, thus eliminating second-guessing the needs and wants of the customer base.

Systems and methods according to the present invention also enable retailers and service providers to offer a variety of consumer incentives that may also drive additional purchases. Retailers and service providers may enable consumers to collect awards points based on product purchases, which may be used for savings on future purchases. These systems and methods also enable retailers and service providers to actively promote ecommerce fulfillment options. In addition, retailers and service providers may offer discounts to consumers for purchases made on the website of RETAILSTREET.COM, as well as purchases at click and mortar retailers/service providers, brick and mortar retailers/service providers, or telephone sales.

Systems and methods according to the present invention also enable retailers and service providers to communicate with consumers, such as by standard electronic mail, by exchanging electronic messages on a mail inbox located on a consumer's personalized webpage, or by any other suitable method of communication whether or not electronic. Retailers and service providers may use such channels to provide interested consumers with information related to discounts and special product and/or service offerings, including those related to products and/or services stored on a consumer's personalized webpage, retailers and service providers near the consumer where products and/or services may be purchased, directions and maps to retailers and service providers, and any other information of interest to consumers.

Entities, such as RETAILSTREET.COM that implement systems and methods according to the present invention, may generate revenue from retailers and service providers in any of the following ways. Retailers and service providers may be charged each time a consumer accesses an interactive electronic representation of a media object that is associated with the retailer or service provider. They may also be charged each time a consumer is directed by the entity to a brick and mortar or click and mortar retailer or service provider. Retailers and service providers may also be charged for being listed by the entity as a provider of particular products and services. Retailers and service providers may also purchase advertising tracking information and other data that can be gathered by systems and methods according to the present invention. In addition, RETAILSTREET.COM may obtain consumer purchase data, or any other relevant information, from retailers and service providers.

E. Manufacturers

Manufacturers may use the aggregated advertising scheme enabled by systems and methods according to the present invention to gather real-time data of the purchasing habits of consumers associated with a particular tagged advertisements to evaluate the effectiveness of their individual advertising campaigns. As a result, manufacturers may increase image awareness, as well as ensure that their advertising campaigns are placed with the proper publishers and in the proper locations to maximize consumer purchases. Manufacturers can easily and quickly monitor the effectiveness of advertisements and available incentives in order to adjust production levels to meet demand, thus reducing overhead and inventory costs. Manufacturers are also able to maximize their advertising investment in ways that were previously unavailable.

Entities, such as RETAILSTREET.COM that implement systems and methods according to the present invention, may generate revenue from manufacturers in any of the following ways. Manufacturers may be charged each time a consumer accesses an interactive electronic representation of a media object that is associated with the manufacturer. They may also be charged each time a consumer is directed by the entity to a brick and mortar or click and mortar retailer or service provider, which is associated with the manufacturer. Manufacturers may also purchase advertising tracking information and other data that can be gathered by systems and methods according to the present invention. In addition, RETAILSTREET.COM may obtain consumer purchase data, or any other relevant information, from manufacturers. Manufacturers may also communicate directly with the consumers, such as via their "MyPages." Manufacturers may notify the consumers of any change in the status of goods or services detected as being of interest to them, such as a change in price or availability. The manufacturers may also notify the consumers of related goods or services or may gather other data of interest from the consumers, such as feedback.

F. Advertising Agencies

Advertising agencies may also use the aggregated advertising scheme enabled by systems and methods according to the present invention to improve advertisement effectiveness, enhance demographic information, and increase revenue from add-on sales. Advertising agencies may enhance demographic information by tracking the time an interested consumer enters a tagged advertisement to the ultimate time of purchase. At no other time has the advertising industry had the opportunity to specifically measure customer profiles from the point of interest to the point of purchase.

Advertising agencies may also employ these systems and methods to deliver additional value to their clients by cross-comparing advertising success from one printed medium to another or within one printed medium, such as a magazine. For example, advertising agencies now have the ability to evaluate the effects of even the smallest changes in an advertisement. Advertising agencies will now be able to evaluate whether a specific facial expression in an advertisement creates more interest than an alternative expression and how this varies across different demographic groups. Furthermore, advertising agencies will now be able to extract maximum value from advertisement effectiveness analyses.

Systems and methods according to the present invention also enable advertising agencies to apply historical advertisement data to new campaigns. Advertising agencies may show clients the duration of a campaign's success. For example, magazines on coffee tables from the previous year still hold their advertisement value to consumers as a resource to find products and services.

The aggregated advertising scheme enabled by systems and methods according to the present invention allows advertisers to sell each image in an advertisement to consumers. Therefore, each advertisement may represent more than one revenue stream. For example, an Apple Computer advertisement (in print or video media) may feature a college student wearing Levi's jeans, a Gap T-shirt, a Tag-Heuer watch, and Nike running shoes. Using systems and methods according to the present invention, all of the products shown in the advertisement are for sale. This enables multiple clients to share costs associated with advertising. Information gathered by these systems and methods may be used to calculate the proportional share of advertising rates that each advertiser may pay. A secondary market may also be formed through the ancillary products featured in the advertisement thereby adding new clients and increasing the relationship with existing clients. Smaller businesses may also leverage the advertising strength and image of large clients, adding to the profitability potential of advertising agencies and making client advertisement dollars more effective thereby enhancing customer retention.

In the preferred embodiment of the present invention, entities, such as RETAILSTREET.COM, that implement these systems and methods do not generate significant revenue from advertising agencies. Instead, advertising agencies include a unique identification tag along with their advertisements. Advertising agencies, however, may be charged by the entity a licensing fee for including the unique identification tag, or any related marks owned by the entity, on their advertisements. In other embodiments, advertising agencies may be charged each time a consumer accesses an interactive electronic representation of a media object that is associated with the advertising agency or each time a consumer is directed by the entity to a brick and mortar or click and mortar retailer or service provider, which is associated with the advertising agency. Advertising agencies may also purchase advertising tracking information that is gathered by systems and methods according to the present invention.

Systems and methods according to the present invention may also facilitate advantageous contractual relationships between advertising agencies and publishers. For example, the advertising tracking information gathered by systems and methods according to the present invention may be used to more accurately determine the price of advertisements based on a multitude of different factors, such as variations in the advertisement, the location of the advertisement in different publications, the positioning of the advertisement in different locations within a specific publication, and any other factor relevant to targeting advertisements. In addition, RETAILSTREET.COM may obtain consumer purchase data, or any other relevant information, from advertising agencies.

G. Publishers

Publishers may also use the aggregated advertising scheme enabled by systems and methods according to the present invention to offer interactive content, improve advertisement placement, provide accurate readership demographics, and target content to the appropriate audience, all of which may lead to competitive advantages and increased advertisement rates. Using these systems and methods, publishers may gather buying cycle data relating to specific readers. For instance, each time a reader enters a unique identification tag from a specific advertisement in a specific media, the publisher may be informed. Consequently, the publisher may maximize relationships with advertising agencies by evaluating specific analyses of the best advertisement placement for a particular advertisement.

Publishers may increase existing relationships with readers by providing interactivity, which brings additional value to the reading experience and may translate into additional sales. For example, the demographics of Atlanta vary greatly from North Atlanta to South Atlanta. These systems and methods enable a national magazine to change the advertisement content of its magazine to suit the differences between these areas, or even the particular needs of a specific household. In short, every inch of a publisher's media will now have a definable value that can be specifically determined for those advertising agencies wishing to place advertisements in their magazine.

In the preferred embodiment of systems and methods according to the present invention, entities, such as RETAILSTREET.COM, that implement these systems and methods do not generate significant revenue from publishers. Instead, publishers include a unique identification tag along with the published advertisements. Publishers, however, may be charged by the entity a licensing fee for being enabled to publish advertisements containing the unique identification tag, or any related marks owned by the entity. Publishers may also be charged each time a consumer performs a cover page search or a key word search relating to the publication. In other embodiments, publishers may be charged each time a consumer accesses an interactive electronic representation of a media object originating from one of their publications or each time a consumer is directed by the entity to a brick and mortar or click and mortar retailer or service provider, which is associated with the publication. Publishers may also purchase advertising tracking information that is gathered by systems and methods according to the present invention. In addition, RETAILSTREET.COM may obtain consumer purchase data, or any other relevant information, from publishers.

As described above, systems and methods according to the present invention may also facilitate advantageous contractual relationships between advertising agencies and publishers. For example, the advertising tracking information gathered by systems and methods according to the present invention may be used to more accurately determine the price of advertisements based on a multitude of different factors, such as variations in the advertisement, the location of the advertisement in different publications, the positioning of the advertisement in different locations within a specific publication, and any other factor relevant to targeting advertisements. As with the manufacturers, the publishers may also have an avenue to communicate with the consumers. The publishers may obtain valuable feedback from the consumers and may offer member only information.

H. Payment Facilitators

The aggregation advertising scheme enabled by systems and methods according to the present invention provides consumers the ability to pay for goods and services using payment facilitators, such as American Express, Discover, Visa, Checkfree, eWallet, or any similar entity or network that facilitates online credit-based transactions or direct electronic funds transfers. This provides consumers the comfort and ease of using a familiar card. In addition, this provides advertising agencies, publishers, retailers, and manufacturers with valuable real-time data relating to the point of sale, which may be employed by data tracking functionality.

Affiliation Programs

An entity operating the server 142, such as Retailstreet.com, preferably has arrangements with third parties in order to capture point of sale data. According to one aspect, this third party has a number of members or customers and the third party has access to purchase data associated with those members or customers. The third party entity may be a payment facilitator, such as American Express, Discover, Visa, Check Free, EWallet, or private label credit cards, such as Macy's, Nordstroms, Sears, Target, or J. Crew. As a payment facilitator, these third parties would have data on the customers, the goods or services purchased, location of purchase, date of purchase, and purchase price. As another option, the third party entity may be a membership group, such as AAA, AARP, or a member of a Retailstreet.com club or other such purchasing club. Other third party entities include retailers, either on-line, in store, or catalog retailers, some examples of which include J. Crew, Harrods, Macy's, Target, etc. The third party entities are not limited to these examples but instead encompass any entity having a relationship with the consumer or retailer such that it has access to the point of sale data.

According to a preferred embodiment, the third entity solicits their members or customers to join the Retailstreet.com program. For instance, the third party entity may send out a permission form with a billing statement or other mailing to their members or customers. The individual then has the opportunity to sign up for the Retailstreet.com club and these approval forms are then forwarded to Retailstreet.com. Retailstreet.com receives these forms, enters the customer information into their database, and provides the members or customers of the third party entity with log-in information, such as a log-in name and password.

An advantage of having a payment facilitator as the third party entity is that the third party entity may enjoy the benefit of being the preferred or default payment provider for purchases occurring after one of their customers views of an IER. For instance, when an individual either at the Retailstreet.com site or at another on-line site decides to purchase an item, the host site will list the third party payment facilitator as the default method of payment. In this case, the visitor to the site need not enter all of the credit card information and other sensitive financial data but instead may only need to enter a password, such as during log-in. With this arrangement, the payment facilitators, such as American Express, enjoy the benefit of being a default payment provider for transactions conducted through the Retailstreet.com program and Retailstreet.com enjoys the benefit of having an increased customer base.

Third party entities other than a payment facilitator, such as a group or membership, can have access to the point of sale data in a variety of ways. For instance, for AARP, the consumers may show their membership cards in order to obtain a discount at the point of purchase. The retailer then notes the third party entity, such as AARP, whereby the point of sale data is tied to that third party entity. The third party entity preferably obtains the point of sale data, or at least parts of it, from the retailers and can forward this data to Retailstreet.com or the other entity operating the systems and methods according to the invention. Thus, significantly, the capture of the point of sale data does not require a payment facilitator but can be completed in any suitable manner. The consumer, for instance, can pay cash for the item and by the retailer tracking the membership of the consumer to a group, Retailstreet.com can obtain the data from that group. The group may comprise existing groups, such as AAA or AARP, or may comprise newly formed groups centered around the Retailstreet.com site. For a group membership around the Retailstreet.com site, each member may be issued a Retailstreet.com card which can be used at the point of sale. In addition to the payment facilitators and groups, the point of sale can probably most easily be obtained from the retailers themselves. Thus, Retailstreet.com can partner with Macy's or Target and acquire the point of sale data directly from the retailers.

In many circumstances, it may be desirable to provide the consumer with an incentive to sign-up with Retailstreet.com or to alter their spending habits so that the point of sale data can be relayed back to Retailstreet.com. One manner in providing an incentive is to give the consumer a discount on goods or services that have been viewed by that consumer on-line. The consumer may view the goods or services at the Retailstreet.com site or at another web site having access to the IERs. In either event, prior to the completion of a sale, the retailer performs a query to determine whether the consumer qualifies for the discount. The consumer may qualify for the discount only for goods or services that were viewed previously by the consumer or, alternatively, may receive a discount for any goods or services purchased. The retailer can perform this query in a number of ways, including contacting Retailstreet.com directly. As another example, if the consumer saw the IER at a retailer's website such as Macy's, then Macy's may perform a query within its own system to determine whether the customer viewed the IER on their own site.

Another manner of providing consumers with an incentive to use the Retailstreet.com systems and methods is by providing points or awards for each purchase. As with discounts provided with the use of the IERs or with Retailstreet.com, the consumer may receive points only for those goods or services that were viewed as IERs or on any other qualifying goods or services. These points may be accumulated and exchanged for free goods or services, discount off goods or services or other rewards. The consumer may therefore have the proper incentive to use the Retailstreet.com card or otherwise alter their spending habits so that they receive these points or awards.

Alternate Embodiments of the Invention

The systems and methods according to the present invention may be implemented using interactive electronic representations of a variety of different media objects, including traditional visual media, conventional visual media, animated media, streaming video or other types of video, and any other type of visible media. As described in the foregoing description IERs of video sources may include particular "still" images or frames from the video source, as well as dynamic clips of the video itself with underlying "hot-links" for objects in the IER. Additionally, a hybrid "clip to image" IER presentation may be provided, wherein a clip from a television program or motion picture is replicated and may "freeze" into a desired "still" image to serve as the IER. Such "freeze" frame image IER may be predetermined by the provider of the IER presentation, or may be accomplished through a user "pausing" interface wherein the user may "pause" the video clip at a desired frame, wherein the "paused" frame becomes the IER with underlying "hot-links" for regions of the screen that include objects for which additional electronic information may be interactively obtained by the viewer.

Additionally, while in the preferred embodiments the electronic representation is interactive, many aspects of the invention can employ non-interactive electronic representations. Furthermore, the functionality described above relating to maneuvering a screen pointer across an interactive electronic representation of a media object, as well as the relationship between parent objects and child objects in the interactive electronic representation, applies to a variety of different media objects, including traditional visual media, conventional visual media, animated media, streaming video or other types of video, and any other type of media.

While the present invention is employed in a sales advertising or product placement environments as set forth in the illustrative embodiments, the invention is not limited to this application and can be used in other areas that require additional interactive information to be displayed relative to a parent electronic representation.

For example, the present invention may be employed in an educational environment to provide a learning tool. Specifically, the parent electronic representation may contain a plurality of secondary objects that warrant further explanation. In the medical field, the parent electronic representation could be an overview of the entire anatomy of the human body while the child electronic representations could illustrate specific parts of the human body such as the heart, lungs, brain, etc. The text information relative to the child electronic representations could provide additional information about the respective body portion. The audio or multimedia information relative to the child electronic representations could provide further detailed medical information for the respective body portion such a sounds of a healthy heart, healthy lungs, etc.

Similar to the medical field implementation, the interactive electronic representation creation process could be employed in an engineering environment where a parent electronic representation contains an overview of electrical engineering diagram for a whole room or building. Each child electronic representation could then illustrate specific diagrams or magnified views for parts of a room or rooms of the building.

Another implementation of the present invention could include parent electronic representations of business charts or graphs for multiple products. Each child electronic representation could then depict a specific business product such as stocks or a mutual fund and their respective business logos or trade names and links to their Internet sites.

A further implementation could include the parent electronic representation depicting a crowd of people such as in an old high school or secondary school class picture. The child electronic representations could then depict individual current portraits or photographs of each individual shown in the class picture. The related child electronic representation text information could then provide the names, current addresses, and phone numbers of respective individuals. Such an application would be well suited for high school or college Internet sites where alumni of the institutions desire to contact fellow alumni.

In view of the foregoing, it will be appreciated that the present invention provides a method and system for creating an interactive electronic representation of a corresponding visual media object. It should be understood that the foregoing relates only to illustrative embodiments of the present invention, and that numerous changes may be made therein without departing from the spirit and scope of the invention as defined by the following claims.

What is claimed is:

1. A method for providing to a user an interactive and electronic replication of at least a portion of a corresponding physical publication page, comprising:
   associating a page number of a physical publication page with an interactive and electronic replication of at least a portion of a physical publication page;
   the physical publication page having at least two different products appearing on the physical publication page;
   the page number appearing on the physical publication page along with the at least two different products;
   the page number and the two different products being visible on the physical publication page;
   receiving by a host computer comprising at least one computer processor an input representing the page number;
   providing from the host computer the interactive and electronic replication of the at least a portion of the physical publication page in response to receiving the input representing the page number;
   the interactive and electronic replication of the at least a portion of the physical publication page including duplications of the appearances of the at least two different products;
   the duplications of the appearances of the at least two different products being exact reproductions of the appearances of the at least two different products contained within the physical publication page;
   the interactive and electronic replication enabling the user to obtain additional information on the at least two different products contained within the interactive and electronic replication; and
   wherein the user is able to see the interactive and electronic replication and the at least two different products in the physical publication page and can obtain the additional information on the at least two different products contained within the interactive and electronic replication of the at least a portion of the physical publication page by receiving the interactive and electronic replication.

2. The method of claim 1, wherein the additional information about the first product includes the location of an online retailer determined by the host computer from consulting a product availability database, wherein the database is stored on a non-transitory storage medium communicatively coupled to the host computer.

3. The method of claim 1, further comprising collecting by the host computer user purchase information comprising payment and delivery information from a purchase request for a product of the at least two different products.

4. The method of claim 3, further comprising sending by the host computer to an online retailer collected user purchase information for a product of the at least two different products.

5. The method of claim 1, further comprising processing by the host computer a user's online purchase request of a product of the at least two different products received in response to a user's interaction with the interactive and electronic replication.

6. The method of claim 1, further comprising storing a user profile and information obtained from the user's interaction with the interactive and electronic replication on a non-transitory storage medium.

7. The method of claim 1, wherein an internet address is visible with the page number on the publication page and the input representing the page number is made to the host computer through a website accessed at the internet address.

8. The method of claim 1, wherein the additional information for the first product of the at least two different products includes display of an additional graphic object associated with the first product.

9. The method of claim 1, wherein the additional information for the first product of the at least two different products includes presentation of a multimedia object associated with the first product.

10. The method of claim 1, wherein the additional information for the first product of the at least two different products includes display of text associated with the first product.

11. The method of claim 1, further comprising receiving by the host computer the user's interaction with a plurality of interactive and electronic replications from a plurality of portions of a plurality of physical publication pages from different physical publications.

12. The method of claim 11, wherein said plurality of physical publication pages include pages from different publications of different publishers.

13. The method of claim 1, wherein
   the interactive and electronic replication includes a first selectable portion corresponding with duplication of the appearance of a first product of the at least two different products and wherein selection of the first selectable portion provides additional product information about the first product and enables a user to initiate an online purchase of the first product; and
   wherein the interactive and electronic replication includes a second selectable portion corresponding with duplication of the appearance of a second product of the at least two different products and wherein selection of the second selectable portion provides additional product information about the second product and enables a user to initiate online purchase of the second product.

14. A method for displaying to a user an interactive and electronic replication of a corresponding physical publication page, comprising:
   creating, by a host computer comprising at least one computer processor, an association between a page number imprinted on a physical publication page and an interactive and electronic replication of at least a portion of the physical publication page;

the physical publication page having an image with at least two different products appearing on the physical publication page and forming part of the image;

the page number appearing on the physical publication page along with the image having the at least two different products;

the page number and the image with the two different products being visible to the user on the physical publication page;

receiving an input representing the page number at a web server executed by the host computer; and providing, from the host computer an interactive and electronic replication of the at least a portion of the physical publication page in response to receiving the input representing the page number;

the interactive and electronic replication having a duplicate image of the image in the physical publication page;

the duplicate image being an exact reproduction of the image contained within the publication page;

the interactive and electronic replication enabling the user to obtain additional information on the at least two different products contained within the duplicate image; and wherein the user is able to see the image of the at least two different products in the physical publication page and can obtain the additional information on the at least two different products contained within the interactive and electronic replication of the at least a portion of the physical publication page by receiving the interactive and electronic replication.

15. A system for providing an electronic and interactive replication of product images appearing in a corresponding physical publication page comprising:

a host computer comprising at least one computer processor that associates a page number of a physical publication page with an electronic and interactive replication of at least a portion of the physical publication page, wherein the physical publication page has at least two different products appearing on the physical publication page with the page number, wherein the electronic and interactive replication comprises exact duplications of the appearances of the at least two different products, wherein the electronic and interactive replication includes a first selectable portion corresponding with duplication of the appearance of a first product of the at least two different products and wherein selection of the first selectable portion provides additional product information about the first product and enables a user to initiate an online purchase of the first product, and wherein the electronic and interactive replication includes a second selectable portion corresponding with duplication of the appearance of a second product of the at least two different products and wherein selection of the second selectable portion provides additional product information about the second product and enables a user to initiate online purchase of the second product; and a web server application executed by the host computer that provides the electronic and interactive representation to a computing device of a user and in response to receiving input representing the page number.

16. The system of claim 15, wherein the computing device of a user is a mobile computing device.

17. A non-transitory computer-readable medium having instructions stored thereon which when executed cause a data processing system to perform the following:

associate a page number of a physical publication page with an interactive and electronic replication of at least a portion of the physical publication page;

wherein the physical publication page has at least two different products appearing on the physical publication page;

wherein the page number appears on the physical publication page along with the at least two different products; and wherein the page number and the two different products are visible on the physical publication page;

process a received input representing the page number; and provide the interactive and electronic replication of the at least a portion of the publication page in response to receiving the input representing page number;

wherein the interactive and electronic replication of the at least a portion of the physical publication page includes duplications of the appearances of the at least two different products;

wherein the duplications of the appearances of the at least two different products being exact reproductions of the appearances of the at least two different products contained within the physical publication page;

wherein the interactive and electronic replication enables the user to obtain additional information beyond information from the physical publication page on the at least two different products contained within the interactive and electronic replication; and wherein a user is able to see the interactive and electronic replication and at least two different products in the physical publication page and can obtain the additional information on the at least two different products contained within the interactive and electronic replication of the at least a portion of the physical publication page by receiving the interactive and electronic replication.

18. The non-transitory computer-readable medium of claim 17, further comprising instructions that provide the location of an online retailer as part of the additional information about the first product.

19. The non-transitory computer-readable medium of claim 17, further comprising instructions that collect user purchase information comprising payment and delivery information from a purchase request for a product of the at least two different products.

20. The non-transitory computer-readable medium of claim 17, further comprising instructions that process a user's online purchase request of a product of the at least two different products received in response to a user's interaction with the interactive and electronic replication.

21. The non-transitory computer-readable medium of claim 19, further comprising instructions that send collected user purchase information for a product of the at least two different products to an online retailer.

* * * * *